(12) United States Patent
Satterfield et al.

(10) Patent No.: US 10,482,429 B2
(45) Date of Patent: *Nov. 19, 2019

(54) AUTOMATIC GROUPING OF ELECTRONIC MAIL

(75) Inventors: Jesse Clay Satterfield, Seattle, WA (US); Jensen M. Harris, Kirkland, WA (US); Martijn E. Van Tilburg, Seattle, WA (US); William R. Avery, Redmond, WA (US); Bruce D. Wiedemann, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/437,031

(22) Filed: Apr. 2, 2012

(65) Prior Publication Data

US 2012/0215866 A1      Aug. 23, 2012

Related U.S. Application Data

(63) Continuation of application No. 12/753,923, filed on Apr. 5, 2010, now Pat. No. 8,150,930, which is a
(Continued)

(51) Int. Cl.
*G06Q 10/10*     (2012.01)
*G06F 3/0481*    (2013.01)
*H04L 12/58*     (2006.01)

(52) U.S. Cl.
CPC ......... *G06Q 10/107* (2013.01); *G06F 3/0481* (2013.01); *H04L 51/22* (2013.01)

(58) Field of Classification Search
CPC .. H04L 12/2495; H04L 12/58–12/5895; H04L 51/22; H04L 51/24; G06Q 10/10; G06Q 10/107; G06F 3/0481
(Continued)

(56) References Cited

U.S. PATENT DOCUMENTS 3,946,911 A      3/1976   Morane et al.
4,815,029 A      3/1989   Barker et al.
(Continued)

FOREIGN PATENT DOCUMENTS

AU    2005203411       3/2006
AU    2006284908 B2    3/2011
(Continued)

OTHER PUBLICATIONS

US 9,658,743 B2, 05/2017, Satterfield et al. (withdrawn)
(Continued)

*Primary Examiner* — Patrice L Winder

(57) ABSTRACT

Automatic sorting and grouping of electronic mail items in an electronic mail system is provided. An automatic mail grouping property may be selected for electronic mail received, sent or stored in a variety of storage folders. For a given mail location (e.g., received mail, sent mail, or a given mail storage folder), a selected automatic grouping property causes mail to be displayed to a user in one or more categories that make location of specific mail items easier and more efficient. Visible dividers with optional headings may be provided between mail categories to quickly draw a user's attention to a given mail category and to separate large numbers of mail into logical groupings that make location of specific mail items more manageable.

21 Claims, 15 Drawing Sheets

Related U.S. Application Data continuation of application No. 10/848,774, filed on May 19, 2004, now Pat. No. 7,707,255.

(60) Provisional application No. 60/484,437, filed on Jul. 1, 2003.

(58) Field of Classification Search
USPC .......................................................... 709/206
See application file for complete search history.

(56) References Cited

U.S. PATENT DOCUMENTS

| | | | |
|---|---|---|---|
| 4,823,283 A | 4/1989 | Diehm et al. ................. 715/825 |
| 5,023,907 A | 6/1991 | Johnson et al. | |
| 5,057,836 A | 10/1991 | Inaba | |
| 5,129,057 A | 7/1992 | Strope et al. | |
| 5,134,915 A | 8/1992 | Fukano et al. | |
| 5,155,806 A | 10/1992 | Hoeber et al. ................. 715/711 |
| 5,204,897 A | 4/1993 | Wyman | |
| 5,220,675 A | 6/1993 | Padawer et al. | |
| 5,243,697 A | 9/1993 | Hoeber et al. | |
| 5,247,438 A | 9/1993 | Subas et al. .................... 700/90 |
| 5,305,435 A | 4/1994 | Bronson | |
| 5,307,086 A | 4/1994 | Griffin et al. | |
| 5,323,314 A | 6/1994 | Baber et al. ..................... 705/8 |
| 5,377,354 A | 12/1994 | Scannell et al. .............. 718/103 |
| 5,412,772 A | 5/1995 | Monson | |
| 5,414,809 A | 5/1995 | Hogan et al. | |
| 5,457,476 A | 10/1995 | Jenson | |
| 5,461,708 A | 10/1995 | Kahn | |
| 5,475,805 A | 12/1995 | Murata | |
| 5,480,894 A | 1/1996 | Hider et al. | |
| 5,486,595 A | 1/1996 | Heavner | |
| 5,500,936 A | 3/1996 | Allen et al. ..................... 395/156 |
| 5,502,805 A | 3/1996 | Anderson et al. | |
| 5,519,606 A | 5/1996 | Frid-Nielsen et al. ............. 705/9 |
| 5,533,184 A | 7/1996 | Malcolm | |
| 5,559,817 A | 9/1996 | Derkits, Jr. et al. | |
| 5,559,875 A | 9/1996 | Bieselin et al. | |
| 5,559,944 A | 9/1996 | Ono .............................. 715/841 |
| 5,570,109 A | 10/1996 | Jenson ........................... 715/823 |
| 5,581,677 A | 12/1996 | Myers et al. | |
| 5,588,107 A | 12/1996 | Bowden et al. ................ 715/828 |
| 5,592,602 A | 1/1997 | Edmunds | |
| 5,596,694 A | 1/1997 | Capps ............................ 345/473 |
| 5,598,557 A | 1/1997 | Doner et al. | |
| 5,625,783 A | 4/1997 | Ezekiel et al. ................. 395/352 |
| 5,634,100 A | 5/1997 | Capps ............................... 705/9 |
| 5,634,128 A | 5/1997 | Messina ........................ 710/200 |
| 5,638,504 A | 6/1997 | Scott et al. .................... 715/202 |
| 5,644,737 A | 7/1997 | Tuniman et al. .............. 715/810 |
| 5,659,693 A | 8/1997 | Hansen et al. | |
| 5,664,127 A | 9/1997 | Anderson et al. ............. 715/209 |
| 5,664,208 A | 9/1997 | Pavley et al. .................. 715/209 |
| 5,671,412 A | 9/1997 | Christiano | |
| 5,673,403 A | 9/1997 | Brown et al. | |
| 5,694,610 A | 12/1997 | Habib et al. | |
| 5,721,847 A | 2/1998 | Johnson ........................ 715/786 |
| 5,734,915 A | 3/1998 | Roewer ......................... 395/773 |
| 5,751,373 A | 5/1998 | Ohyama et al. | |
| 5,760,768 A | 6/1998 | Gram ............................ 345/333 |
| 5,760,773 A | 6/1998 | Berman et al. ............... 715/808 |
| 5,761,646 A | 6/1998 | Frid-Nielsen et al. ............ 705/9 |
| 5,764,960 A | 6/1998 | Albert | |
| 5,778,402 A | 7/1998 | Gipson .......................... 715/201 |
| 5,778,404 A | 7/1998 | Capps et al. .................. 715/531 |
| 5,787,295 A | 7/1998 | Nakao | |
| 5,793,365 A | 8/1998 | Tang et al. | |
| 5,796,393 A | 8/1998 | MacNaughton et al. | |
| 5,805,167 A | 9/1998 | Van Cruyningen ........... 715/808 |
| 5,812,132 A | 9/1998 | Goldstein | |
| 5,821,936 A | 10/1998 | Shaffer et al. ................ 715/810 |
| 5,828,367 A | 10/1998 | Kuga | |
| 5,828,376 A | 10/1998 | Solimene et al. ............. 715/821 |
| 5,838,321 A | 11/1998 | Wolf ............................. 345/343 |
| 5,842,009 A | 11/1998 | Borovoy et al. .................. 707/1 |
| 5,844,558 A | 12/1998 | Kumar et al. ................. 345/339 |
| 5,844,572 A | 12/1998 | Schott .......................... 345/440 |
| 5,844,588 A | 12/1998 | Anderson | |
| 5,850,561 A | 12/1998 | Church | |
| 5,851,644 A | 12/1998 | McArdle et al. | |
| 5,855,006 A | 12/1998 | Huemoeller et al. ............. 705/9 |
| 5,864,848 A | 1/1999 | Horvitz et al. | |
| 5,872,973 A | 2/1999 | Mitchell et al. | |
| 5,873,108 A | 2/1999 | Goyal et al. | |
| 5,874,953 A | 2/1999 | Webster et al. | |
| 5,874,956 A | 2/1999 | Webster et al. | |
| 5,884,572 A | 3/1999 | Kawaguchi | |
| 5,885,006 A | 3/1999 | Sheedy ......................... 384/192 |
| 5,893,073 A | 4/1999 | Kasso et al. | |
| 5,893,125 A | 4/1999 | Shostak ........................ 715/206 |
| 5,895,476 A | 4/1999 | Orr et al. | |
| 5,898,436 A | 4/1999 | Stewart et al. ................ 345/354 |
| 5,899,979 A | 5/1999 | Miller et al. ....................... 705/9 |
| 5,903,902 A | 5/1999 | Orr et al. | |
| 5,905,863 A | 5/1999 | Knowles et al. .............. 709/206 |
| 5,910,895 A | 6/1999 | Proskauer et al. | |
| 5,914,714 A | 6/1999 | Brown | |
| 5,917,489 A | 6/1999 | Thurlow et al. | |
| 5,924,089 A | 7/1999 | Mocek et al. | |
| 5,926,806 A | 7/1999 | Marshall et al. .................. 707/3 |
| 5,936,625 A | 8/1999 | Kahl et al. ..................... 715/775 |
| 5,937,160 A | 8/1999 | Davis et al. | |
| 5,940,078 A | 8/1999 | Nagarajayya et al. ........ 345/346 |
| 5,940,847 A | 8/1999 | Fein et al. ..................... 707/540 |
| 5,943,051 A | 8/1999 | Onda et al. .................... 715/786 |
| 5,956,737 A | 9/1999 | King et al. | |
| 5,960,406 A | 9/1999 | Rasansky et al. ................. 705/9 |
| 5,963,938 A | 10/1999 | Wilson | |
| 5,970,466 A | 10/1999 | Detjen et al. ...................... 705/8 |
| 5,999,173 A | 12/1999 | Ubillos | |
| 5,999,938 A | 12/1999 | Bliss et al. .................... 707/102 |
| 6,002,395 A | 12/1999 | Wagner et al. | |
| 6,008,806 A | 12/1999 | Nakajima et al. ............ 345/335 |
| 6,012,075 A | 1/2000 | Fein et al. ..................... 707/540 |
| 6,016,478 A | 1/2000 | Zhang et al. | |
| 6,018,343 A | 1/2000 | Wang et al. ................... 345/356 |
| 6,034,683 A | 3/2000 | Mansour et al. .............. 715/764 |
| 6,038,395 A | 3/2000 | Chow et al. | |
| 6,038,542 A | 3/2000 | Ruckdashel | |
| 6,043,816 A | 3/2000 | Williams et al. ............. 345/340 |
| 6,057,836 A | 5/2000 | Kavalam et al. | |
| 6,065,026 A | 5/2000 | Cornelia et al. | |
| 6,067,087 A | 5/2000 | Krauss et al. ................. 715/762 |
| 6,067,551 A | 5/2000 | Brown et al. | |
| 6,072,492 A | 6/2000 | Schagen et al. .............. 715/733 |
| 6,073,110 A | 6/2000 | Rhodes et al. | |
| 6,073,142 A | 6/2000 | Geiger et al. | |
| 6,085,206 A | 7/2000 | Domini et al. | |
| 6,088,707 A | 7/2000 | Bates et al. | |
| 6,092,103 A * | 7/2000 | Pritsch .......................... 709/206 |
| 6,101,480 A | 8/2000 | Conmy et al. ..................... 705/9 |
| 6,107,869 A | 8/2000 | Horiguchi et al. | |
| 6,115,777 A | 9/2000 | Zahir et al. | |
| 6,122,075 A | 9/2000 | Yamada et al. | |
| 6,133,915 A | 10/2000 | Arcuri et al. ................. 715/779 |
| 6,137,488 A | 10/2000 | Kraft | |
| 6,154,740 A * | 11/2000 | Shah ..................... G06F 3/0482 |
| 6,154,755 A | 11/2000 | Dellert et al. | |
| 6,160,554 A | 12/2000 | Krause | |
| 6,175,363 B1 | 1/2001 | Williams et al. ............. 345/334 |
| 6,188,401 B1 | 2/2001 | Peyer | |
| 6,188,403 B1 | 2/2001 | Sacerdoti et al. ............. 715/764 |
| 6,189,024 B1 | 2/2001 | Bauersfeld et al. | |
| 6,189,146 B1 | 2/2001 | Misra et al. | |
| 6,192,381 B1 | 2/2001 | Stiegemeier et al. ......... 715/210 |
| 6,195,094 B1 | 2/2001 | Celebiler | |
| 6,199,102 B1 | 3/2001 | Cobb | |
| 6,211,879 B1 | 4/2001 | Soohoo | |
| 6,216,122 B1 | 4/2001 | Elson .................................. 707/5 |
| 6,219,670 B1 | 4/2001 | Mocek et al. ................. 707/102 |
| 6,222,540 B1 | 4/2001 | Sacerdoti ...................... 345/581 |
| 6,230,173 B1 | 5/2001 | Ferrel et al. | |
| 6,230,309 B1 | 5/2001 | Turner et al. | |

(56) References Cited

U.S. PATENT DOCUMENTS

| | | | |
|---|---|---|---|
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | |
| 6,272,488 B1 | 8/2001 | Chang et al. | |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,311,194 B1 | 10/2001 | Sheth et al. | |
| 6,311,195 B1 | 10/2001 | Hachiya et al. | |
| 6,313,854 B1 | 11/2001 | Gibson | |
| 6,323,883 B1 | 11/2001 | Minoura et al. | 715/784 |
| 6,326,962 B1 | 12/2001 | Szabo | |
| 6,327,046 B1 | 12/2001 | Miyamoto et al. | |
| 6,330,577 B1 | 12/2001 | Kim | |
| 6,330,578 B1 | 12/2001 | Savin et al. | |
| 6,330,589 B1 | 12/2001 | Kennedy | |
| 6,341,277 B1 | 1/2002 | Coden et al. | |
| 6,342,901 B1 | 1/2002 | Adler et al. | |
| 6,353,451 B1 | 3/2002 | Teibel et al. | 715/803 |
| 6,356,893 B1 | 3/2002 | Itakura et al. | |
| 6,359,634 B1 | 3/2002 | Cragun et al. | 715/777 |
| 6,369,840 B1 | 4/2002 | Barnett et al. | |
| 6,373,507 B1 | 4/2002 | Camara et al. | 345/825 |
| 6,374,304 B1 | 4/2002 | Chiashi | |
| 6,381,740 B1 | 4/2002 | Miller et al. | |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | |
| 6,433,801 B1 | 8/2002 | Moon et al. | 345/840 |
| 6,433,831 B1 | 8/2002 | Dinnwiddie et al. | |
| 6,434,598 B1 | 8/2002 | Gish | 709/203 |
| 6,442,527 B1 | 8/2002 | Worthington | |
| 6,446,118 B1 | 9/2002 | Gottlieb | |
| 6,456,304 B1 | 9/2002 | Angiulo et al. | 345/779 |
| 6,457,062 B1 | 9/2002 | Pivowar et al. | |
| 6,459,441 B1 | 10/2002 | Perroux et al. | 345/837 |
| 6,466,236 B1 | 10/2002 | Pivowar et al. | 715/835 |
| 6,466,240 B1 | 10/2002 | Maslov | |
| 6,469,722 B1 | 10/2002 | Kineo et al. | 345/837 |
| 6,469,723 B1 | 10/2002 | Gould | |
| 6,476,828 B1 | 11/2002 | Burkett et al. | |
| 6,480,865 B1 | 11/2002 | Lee et al. | 715/523 |
| 6,483,624 B1 | 11/2002 | Otani et al. | |
| 6,484,180 B1 | 11/2002 | Lyons et al. | |
| 6,493,006 B1 | 12/2002 | Gourdol et al. | 715/825 |
| 6,493,007 B1 | 12/2002 | Pang | |
| 6,493,731 B1 | 12/2002 | Jones et al. | 715/234 |
| 6,507,845 B1 | 1/2003 | Cohen et al. | |
| 6,529,918 B2 | 3/2003 | Takahashi | |
| 6,546,417 B1 | 4/2003 | Baker | 709/206 |
| 6,564,377 B1 | 5/2003 | Jayasimha et al. | |
| 6,567,509 B1 | 5/2003 | Gusler et al. | |
| 6,567,846 B1 | 5/2003 | Garg et al. | |
| 6,570,596 B2 | 5/2003 | Frederiksen | 715/808 |
| 6,570,890 B1 | 5/2003 | Keenan et al. | |
| 6,578,192 B1 | 6/2003 | Boehme et al. | 717/115 |
| 6,583,798 B1 | 6/2003 | Hoek et al. | 345/822 |
| 6,584,501 B1 | 6/2003 | Cartsonis et al. | |
| 6,584,504 B1 | 6/2003 | Choe | |
| 6,587,118 B1 | 7/2003 | Yoneda | |
| 6,603,493 B1 | 8/2003 | Lovell et al. | |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,624,831 B1 | 9/2003 | Shahine et al. | |
| 6,633,867 B1 | 10/2003 | Kraft et al. | |
| 6,635,089 B1 | 10/2003 | Burkett et al. | 715/513 |
| 6,639,611 B1 | 10/2003 | Leduc | |
| 6,654,791 B1 | 11/2003 | Bates et al. | |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/234 |
| 6,701,513 B1 | 3/2004 | Bailey | |
| 6,707,454 B1 | 3/2004 | Barg | |
| 6,707,476 B1 | 3/2004 | Hochstedler | |
| 6,708,205 B2 | 3/2004 | Sheldon et al. | 709/206 |
| 6,721,402 B2 | 4/2004 | Usami | |
| 6,725,228 B1 * | 4/2004 | Clark | G06Q 10/107 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,753,887 B2 | 6/2004 | Carolan et al. | |
| 6,778,990 B2 | 8/2004 | Garcia et al. | |
| 6,785,866 B1 | 8/2004 | Lewis et al. | |
| 6,785,868 B1 | 8/2004 | Raff | 715/530 |
| 6,789,107 B1 | 9/2004 | Bates et al. | |
| 6,799,095 B1 | 9/2004 | Owen et al. | |
| 6,816,904 B1 | 11/2004 | Ludwig et al. | |
| 6,825,859 B1 | 11/2004 | Severenuk et al. | 345/764 |
| 6,826,727 B1 | 11/2004 | Mohr et al. | |
| 6,826,729 B1 | 11/2004 | Giesen et al. | 715/837 |
| 6,832,244 B1 | 12/2004 | Raghunandan | |
| 6,847,989 B1 | 1/2005 | Chastain et al. | |
| 6,850,255 B2 | 2/2005 | Muschetto | 715/788 |
| 6,857,103 B1 | 2/2005 | Wason | |
| 6,871,195 B2 | 3/2005 | Ryan et al. | 706/46 |
| 6,882,353 B2 | 4/2005 | Nettles et al. | |
| 6,882,354 B1 | 4/2005 | Nielson | 715/784 |
| 6,892,193 B2 | 5/2005 | Bolle et al. | |
| 6,892,196 B1 | 5/2005 | Hughes | |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,907,423 B2 | 6/2005 | Weil et al. | |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | |
| 6,928,610 B2 | 8/2005 | Brintzenhofe et al. | |
| 6,928,613 B1 | 8/2005 | Ishii | |
| 6,931,623 B2 | 8/2005 | Vermeire et al. | |
| 6,934,740 B1 | 8/2005 | Lawande et al. | |
| 6,941,304 B2 | 9/2005 | Gainey et al. | |
| 6,956,429 B1 | 10/2005 | Elbanhawy | |
| 6,964,025 B2 | 11/2005 | Angiulo et al. | 715/838 |
| 6,981,209 B1 | 12/2005 | Parikh et al. | |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | 717/109 |
| 6,993,711 B1 | 1/2006 | Tanaka et al. | |
| 7,016,864 B1 | 3/2006 | Notz et al. | |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,039,863 B1 | 5/2006 | Caro et al. | |
| 7,044,363 B2 | 5/2006 | Silverbrook et al. | |
| 7,046,848 B1 | 5/2006 | Olcott | 382/176 |
| 7,051,276 B1 | 5/2006 | Mogilevsky et al. | |
| 7,069,538 B1 | 6/2006 | Renshaw | |
| 7,085,757 B2 | 8/2006 | Dettinger | |
| 7,085,999 B2 | 8/2006 | Maeda et al. | |
| 7,086,006 B2 | 8/2006 | Subramanian et al. | |
| 7,093,162 B2 | 8/2006 | Barga et al. | |
| 7,096,218 B2 | 8/2006 | Schirmer et al. | |
| 7,103,849 B2 | 9/2006 | Aikawa | |
| 7,107,525 B2 | 9/2006 | Purvis | |
| 7,107,544 B1 * | 9/2006 | Luke | 715/752 |
| 7,110,936 B2 | 9/2006 | Hiew et al. | 703/22 |
| 7,111,238 B1 | 9/2006 | Kuppusamy et al. | |
| 7,113,941 B2 | 9/2006 | Arend | |
| 7,117,370 B2 | 10/2006 | Khan et al. | |
| 7,117,436 B1 | 10/2006 | O'Rourke et al. | |
| 7,120,868 B2 | 10/2006 | Salesin et al. | |

(56) References Cited

U.S. PATENT DOCUMENTS

| | | | |
|---|---|---|---|
| 7,134,095 B1 | 11/2006 | Smith et al. | |
| 7,149,983 B1 | 12/2006 | Robertson et al. | |
| 7,152,207 B1 | 12/2006 | Underwood et al. | 715/526 |
| 7,174,361 B1 | 2/2007 | Paas | |
| 7,181,697 B2 | 2/2007 | Tai et al. | |
| 7,188,073 B1 | 3/2007 | Tam et al. | 705/9 |
| 7,188,158 B1 | 3/2007 | Stanton et al. | |
| 7,188,317 B1 | 3/2007 | Hazel | 715/804 |
| 7,200,636 B2 | 4/2007 | Harding | |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,216,302 B2 | 5/2007 | Rodden et al. | |
| 7,218,976 B2 | 5/2007 | Minagawa | |
| 7,219,305 B2 | 5/2007 | Jennings | 715/761 |
| 7,225,244 B2 | 5/2007 | Reynolds et al. | |
| 7,234,132 B2 | 6/2007 | Lam | |
| 7,240,323 B1 | 7/2007 | Desai et al. | |
| 7,246,311 B2 | 7/2007 | Bargeron et al. | |
| 7,249,325 B1 | 7/2007 | Donaldson | 715/777 |
| 7,251,610 B2 | 7/2007 | Alban et al. | |
| 7,251,640 B2 | 7/2007 | Baumard | |
| 7,263,668 B1 | 8/2007 | Lentz | |
| 7,272,789 B2 | 9/2007 | O'Brien | |
| 7,277,572 B2 | 10/2007 | MacInnes et al. | |
| 7,281,245 B2 | 10/2007 | Reynar et al. | |
| 7,287,233 B2 | 10/2007 | Arend | |
| 7,290,033 B1 | 10/2007 | Goldman et al. | |
| 7,296,241 B2 | 11/2007 | Oshiro et al. | |
| 7,318,203 B2 | 1/2008 | Purves et al. | |
| 7,325,204 B2 | 1/2008 | Rogers | 715/792 |
| 7,328,409 B2 | 2/2008 | Awada et al. | |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,537 B2 | 4/2008 | Reynar et al. | |
| 7,356,772 B2 | 4/2008 | Brownholtz et al. | |
| 7,360,174 B2 | 4/2008 | Grossman et al. | 715/854 |
| 7,362,311 B2 | 4/2008 | Filner et al. | |
| 7,370,282 B2 | 5/2008 | Cary | |
| 7,380,236 B2 | 5/2008 | Hawley | |
| 7,386,535 B1 | 6/2008 | Kalucha et al. | |
| 7,386,835 B1 | 6/2008 | Desai et al. | 717/117 |
| 7,392,249 B1 | 6/2008 | Harris et al. | 707/5 |
| 7,395,221 B2 | 7/2008 | Doss et al. | |
| 7,395,500 B2 | 7/2008 | Whittle et al. | |
| 7,395,540 B2 | 7/2008 | Rogers | |
| 7,421,660 B2 | 9/2008 | Charmock et al. | |
| 7,421,690 B2 * | 9/2008 | Forstall et al. | 718/100 |
| 7,426,713 B2 | 9/2008 | Duggan et al. | 717/100 |
| 7,461,077 B1 | 12/2008 | Greenwood | |
| 7,464,343 B2 | 12/2008 | Shaw et al. | |
| 7,469,385 B2 | 12/2008 | Harper et al. | |
| 7,472,117 B2 | 12/2008 | Dettinger et al. | |
| 7,472,374 B1 | 12/2008 | Dillman et al. | |
| 7,484,213 B2 | 1/2009 | Mathew et al. | |
| 7,499,907 B2 | 3/2009 | Brown et al. | |
| 7,505,954 B2 | 3/2009 | Heidloff et al. | 707/1 |
| 7,509,328 B2 | 3/2009 | Weiss et al. | |
| 7,516,186 B1 | 4/2009 | Borghetti et al. | |
| 7,530,029 B2 | 5/2009 | Satterfield et al. | 715/779 |
| 7,555,707 B1 | 6/2009 | Labarge et al. | |
| 7,565,403 B2 | 7/2009 | Horvitz et al. | |
| 7,567,964 B2 | 7/2009 | Brice et al. | 707/9 |
| 7,584,253 B2 | 9/2009 | Curbow et al. | |
| 7,610,575 B2 | 10/2009 | Sproule | |
| 7,627,561 B2 | 12/2009 | Pell et al. | |
| 7,632,311 B2 | 12/2009 | Seedhom et al. | |
| 7,640,506 B2 | 12/2009 | Pratley et al. | |
| 7,661,075 B2 | 2/2010 | Landesmaki | |
| 7,664,821 B1 | 2/2010 | Ancin et al. | 709/206 |
| 7,676,767 B2 | 3/2010 | Hofmeister et al. | |
| 7,681,149 B2 | 3/2010 | Landesmaki | |
| 7,685,116 B2 | 3/2010 | Pell et al. | |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | |
| 7,716,593 B2 | 5/2010 | Durazo et al. | 715/752 |
| 7,739,259 B2 | 6/2010 | Hartwell et al. | |
| 7,747,966 B2 | 6/2010 | Leukart et al. | |
| 7,769,698 B2 | 8/2010 | Matic | |
| 7,779,386 B2 | 8/2010 | Seitz et al. | |
| 7,788,598 B2 | 8/2010 | Bansal et al. | |
| 7,802,199 B2 | 9/2010 | Shneerson et al. | |
| 7,827,546 B1 | 11/2010 | Jones et al. | |
| 7,831,902 B2 | 11/2010 | Sourov et al. | 715/220 |
| 7,853,877 B2 | 12/2010 | Giesen et al. | |
| 7,856,596 B2 | 12/2010 | Crider et al. | |
| 7,860,901 B2 | 12/2010 | Cheng et al. | |
| 7,865,868 B2 | 1/2011 | Falzon Schaw et al. | |
| 7,870,465 B2 | 1/2011 | VerSteeg | |
| 7,886,290 B2 | 2/2011 | Dhanjal et al. | |
| 7,895,531 B2 | 2/2011 | Radtke et al. | |
| 7,908,580 B2 | 3/2011 | Stubbs et al. | |
| 7,925,621 B2 | 4/2011 | Sikchi et al. | |
| 7,949,963 B1 | 5/2011 | Pham et al. | |
| 8,046,683 B2 | 10/2011 | Larcheveque et al. | |
| 8,117,542 B2 | 2/2012 | Radtke et al. | 715/708 |
| 8,146,016 B2 | 3/2012 | Himberger et al. | 715/825 |
| 8,150,930 B2 | 4/2012 | Satterfield et al. | 709/206 |
| 8,171,417 B2 | 5/2012 | Bamford et al. | |
| 8,201,103 B2 | 6/2012 | Dukhon et al. | |
| 8,239,882 B2 | 8/2012 | Dhanjal et al. | |
| 8,243,017 B2 | 8/2012 | Brodersen et al. | |
| 8,255,828 B2 | 8/2012 | Harris et al. | |
| 8,285,806 B2 | 10/2012 | Yu | |
| 8,302,014 B2 | 10/2012 | Lezama Guadarrama et al. | |
| 8,402,096 B2 | 3/2013 | Affronti et al. | |
| 8,479,122 B2 | 7/2013 | Hotelling et al. | |
| 8,484,578 B2 | 7/2013 | Dukhon et al. | |
| 8,605,090 B2 | 12/2013 | Garg et al. | |
| 8,627,222 B2 | 1/2014 | Hartwell et al. | |
| 8,627,562 B2 | 1/2014 | Sutter et al. | |
| 8,638,333 B2 | 1/2014 | Garg et al. | |
| 8,689,137 B2 | 4/2014 | McCormack et al. | |
| 8,749,122 B2 | 6/2014 | Aratake | |
| 8,762,880 B2 | 6/2014 | Dukhon et al. | |
| 8,799,353 B2 | 8/2014 | Larsson et al. | |
| 8,799,808 B2 | 8/2014 | Satterfield et al. | |
| 8,839,139 B2 | 9/2014 | Leukart et al. | |
| 8,904,287 B2 | 12/2014 | Kumar et al. | |
| 9,015,621 B2 | 4/2015 | Dean et al. | |
| 9,015,624 B2 | 4/2015 | Radtke et al. | |
| 9,046,983 B2 | 6/2015 | Zhao et al. | |
| 9,098,473 B2 | 8/2015 | Dukhon et al. | |
| 9,098,837 B2 | 8/2015 | Hill et al. | |
| 9,182,885 B2 | 11/2015 | Ruscher et al. | |
| 9,223,477 B2 | 12/2015 | Harris et al. | |
| 9,304,658 B2 | 4/2016 | Mercer | |
| 9,542,667 B2 | 1/2017 | Taboada et al. | |
| 9,588,781 B2 | 3/2017 | Larson | |
| 9,665,850 B2 | 5/2017 | Mccann | |
| 9,690,448 B2 | 6/2017 | Satterfield et al. | |
| 9,727,989 B2 | 8/2017 | Garg et al. | |
| 9,762,637 B2 | 9/2017 | Bullotta et al. | |
| 2001/0014900 A1 | 8/2001 | Brauer et al. | |
| 2001/0032220 A1 | 10/2001 | Ven Hoff | |
| 2001/0034762 A1 | 10/2001 | Jacobs et al. | |
| 2001/0035882 A1 | 11/2001 | Stoakley et al. | |
| 2001/0038395 A1 | 11/2001 | Holtzblatt et al. | |
| 2001/0040627 A1 | 11/2001 | Obradovich | |
| 2001/0044736 A1 | 11/2001 | Jacobs et al. | |
| 2001/0044741 A1 | 11/2001 | Jacobs et al. | |
| 2001/0049677 A1 | 12/2001 | Talib et al. | |
| 2002/0004734 A1 | 1/2002 | Nishizawa | |
| 2002/0007380 A1 | 1/2002 | Bauchot et al. | 707/530 |
| 2002/0013562 A1 | 1/2002 | Mizutani | |
| 2002/0023134 A1 * | 2/2002 | Roskowski | H04L 51/04 709/206 |
| 2002/0024638 A1 | 2/2002 | Hidari et al. | |
| 2002/0029247 A1 | 3/2002 | Kawamoto | |
| 2002/0036662 A1 | 3/2002 | Gauthier et al. | |
| 2002/0037754 A1 | 3/2002 | Hama et al. | 455/566 |

(56) References Cited

U.S. PATENT DOCUMENTS

| | | | |
|---|---|---|---|
| 2002/0052721 A1 | 5/2002 | Ruff et al. .................. 703/1 |
| 2002/0052880 A1 | 5/2002 | Fruensgaard et al. |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. ............... 345/810 |
| 2002/0073091 A1 | 6/2002 | Jain et al. |
| 2002/0073156 A1* | 6/2002 | Newman ...................... 709/206 |
| 2002/0075330 A1 | 6/2002 | Rosenzweig et al. ........ 345/854 |
| 2002/0078143 A1 | 6/2002 | DeBoor et al. ............... 709/203 |
| 2002/0083054 A1 | 6/2002 | Peltonen et al. |
| 2002/0083097 A1 | 6/2002 | Warrington |
| 2002/0089543 A1 | 7/2002 | Ostergaard et al. |
| 2002/0091697 A1 | 7/2002 | Huang et al. |
| 2002/0091739 A1 | 7/2002 | Ferlitsch ...................... 707/526 |
| 2002/0097266 A1 | 7/2002 | Hachiya et al. |
| 2002/0099775 A1 | 7/2002 | Gupta et al. |
| 2002/0116208 A1 | 8/2002 | Chirnomas |
| 2002/0116508 A1 | 8/2002 | Khan et al. |
| 2002/0120695 A1* | 8/2002 | Engstrom ............ G06Q 10/107 709/206 |
| 2002/0120702 A1* | 8/2002 | Schiavone ........... G06Q 10/107 709/207 |
| 2002/0122071 A1 | 9/2002 | Camara et al. ............... 715/810 |
| 2002/0123984 A1 | 9/2002 | Prakash |
| 2002/0123991 A1 | 9/2002 | Asami |
| 2002/0125942 A1 | 9/2002 | Dunnebacke et al. |
| 2002/0129052 A1 | 9/2002 | Glazer et al. |
| 2002/0133557 A1 | 9/2002 | Winarski ...................... 709/207 |
| 2002/0135621 A1 | 9/2002 | Angiulo et al. ............... 345/838 |
| 2002/0140731 A1 | 10/2002 | Subramaniam et al. ..... 345/762 |
| 2002/0140733 A1 | 10/2002 | Edlund et al. |
| 2002/0140740 A1 | 10/2002 | Chen ............................ 715/810 |
| 2002/0149623 A1 | 10/2002 | West et al. .................... 345/765 |
| 2002/0149629 A1 | 10/2002 | Craycroft et al. ............ 345/861 |
| 2002/0154178 A1 | 10/2002 | Barnett et al. ................ 715/853 |
| 2002/0156815 A1 | 10/2002 | Davia |
| 2002/0158876 A1 | 10/2002 | Janssen |
| 2002/0163538 A1 | 11/2002 | Shteyn ......................... 345/752 |
| 2002/0175938 A1 | 11/2002 | Hackworth |
| 2002/0175955 A1 | 11/2002 | Gourdol et al. .............. 345/821 |
| 2002/0186257 A1 | 12/2002 | Cadiz et al. |
| 2002/0188515 A1 | 12/2002 | Nakata et al. |
| 2002/0188632 A1 | 12/2002 | Su |
| 2002/0196293 A1 | 12/2002 | Suppan et al. ................ 345/853 |
| 2003/0005051 A1 | 1/2003 | Gottlieb |
| 2003/0005056 A1 | 1/2003 | Yamamoto et al. |
| 2003/0009455 A1 | 1/2003 | Carlson et al. ................. 707/6 |
| 2003/0011564 A1 | 1/2003 | Ushino et al. |
| 2003/0011638 A1 | 1/2003 | Chung ......................... 345/808 |
| 2003/0011639 A1 | 1/2003 | Webb ........................... 715/808 |
| 2003/0014421 A1 | 1/2003 | Jung |
| 2003/0014490 A1* | 1/2003 | Bates .................. G06Q 10/107 709/206 |
| 2003/0016248 A1 | 1/2003 | Hayes Ubillos |
| 2003/0020267 A1 | 1/2003 | Scholz |
| 2003/0022700 A1 | 1/2003 | Wang ........................... 455/566 |
| 2003/0025732 A1 | 2/2003 | Prichard ....................... 345/765 |
| 2003/0025737 A1 | 2/2003 | Breinberg |
| 2003/0028560 A1 | 2/2003 | Kudrolli et al. |
| 2003/0035012 A1 | 2/2003 | Kurtenbach et al. |
| 2003/0035917 A1 | 2/2003 | Hyman ......................... 428/67 |
| 2003/0038832 A1 | 2/2003 | Sobol ........................... 715/722 |
| 2003/0043200 A1 | 3/2003 | Faieta et al. |
| 2003/0043211 A1 | 3/2003 | Kremer et al. ............... 715/838 |
| 2003/0046528 A1 | 3/2003 | Haitani et al. |
| 2003/0050986 A1 | 3/2003 | Matthews et al. |
| 2003/0064707 A1 | 4/2003 | Voneyama |
| 2003/0066025 A1 | 4/2003 | Garner et al. ................ 715/500 |
| 2003/0069892 A1* | 4/2003 | Hind et al. ................ 707/103 X |
| 2003/0069900 A1* | 4/2003 | Hind et al. ................... 707/200 |
| 2003/0070143 A1 | 4/2003 | Maslov ........................ 715/513 |
| 2003/0084035 A1 | 5/2003 | Emerick |
| 2003/0093490 A1 | 5/2003 | Yamamoto et al. .......... 709/213 |
| 2003/0097361 A1 | 5/2003 | Huang et al. .................. 707/10 |
| 2003/0097640 A1 | 5/2003 | Abrams et al. ............... 715/530 |
| 2003/0098891 A1 | 5/2003 | Molander ..................... 715/841 |
| 2003/0101065 A1 | 5/2003 | Rohall et al. |
| 2003/0106024 A1 | 6/2003 | Silverbrook et al. |
| 2003/0110191 A1 | 6/2003 | Handsaker et al. .......... 707/503 |
| 2003/0112278 A1 | 6/2003 | Driskell ........................ 715/788 |
| 2003/0128243 A1 | 7/2003 | Okamoto |
| 2003/0132972 A1 | 7/2003 | Pang |
| 2003/0135825 A1 | 7/2003 | Gertner et al. ................ 715/513 |
| 2003/0140009 A1 | 7/2003 | Namba et al. |
| 2003/0154254 A1 | 8/2003 | Awasthi |
| 2003/0156140 A1 | 8/2003 | Watanabe |
| 2003/0160821 A1 | 8/2003 | Yoon ............................ 345/762 |
| 2003/0163455 A1 | 8/2003 | Dettinger et al. ............... 707/3 |
| 2003/0163537 A1 | 8/2003 | Rohall et al. ................. 709/206 |
| 2003/0167310 A1 | 9/2003 | Moody et al. ................ 709/206 |
| 2003/0167315 A1 | 9/2003 | Chowdhry et al. |
| 2003/0169284 A1 | 9/2003 | Dettinger et al. ............ 715/708 |
| 2003/0177190 A1 | 9/2003 | Moody et al. |
| 2003/0184585 A1 | 10/2003 | Lin et al. |
| 2003/0187586 A1 | 10/2003 | Katzenmaier et al. |
| 2003/0187937 A1* | 10/2003 | Yao ........................ H04L 51/12 709/206 |
| 2003/0195937 A1 | 10/2003 | Kircher et al. ............... 709/207 |
| 2003/0200267 A1 | 10/2003 | Garrigues |
| 2003/0206646 A1 | 11/2003 | Brackett ....................... 382/128 |
| 2003/0218611 A1 | 11/2003 | Ben-Tovim et al. ......... 345/440 |
| 2003/0220138 A1 | 11/2003 | Walker et al. |
| 2003/0225823 A1 | 12/2003 | Meeuwissen et al. |
| 2003/0225853 A1 | 12/2003 | Wang et al. |
| 2003/0226106 A1 | 12/2003 | McKellar et al. ............ 715/513 |
| 2003/0227481 A1 | 12/2003 | Arend et al. |
| 2003/0227487 A1 | 12/2003 | Hugh ........................... 715/777 |
| 2003/0229668 A1 | 12/2003 | Malik |
| 2003/0229673 A1 | 12/2003 | Malik |
| 2003/0233419 A1 | 12/2003 | Beringer ...................... 709/206 |
| 2004/0002941 A1 | 1/2004 | Thorne et al. |
| 2004/0003351 A1 | 1/2004 | Sommerer et al. ........... 715/251 |
| 2004/0006570 A1 | 1/2004 | Gelb et al. |
| 2004/0010513 A1 | 1/2004 | Scherr et al. |
| 2004/0010933 A1 | 1/2004 | Mertens et al. |
| 2004/0012633 A1 | 1/2004 | Helt ............................. 715/764 |
| 2004/0021647 A1 | 2/2004 | Marieke |
| 2004/0024824 A1 | 2/2004 | Ferguson et al. |
| 2004/0030993 A1 | 2/2004 | Hong Huey et al. |
| 2004/0044735 A1 | 3/2004 | Hoblit |
| 2004/0056894 A1 | 3/2004 | Zaika et al. .................. 345/762 |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1* | 4/2004 | Kawamura ........... G06F 17/243 715/255 |
| 2004/0088359 A1 | 5/2004 | Simpson |
| 2004/0090315 A1 | 5/2004 | MacKjust et al. ........ 340/426.13 |
| 2004/0093290 A1 | 5/2004 | Doss et al. |
| 2004/0100504 A1 | 5/2004 | Sommer ....................... 345/810 |
| 2004/0100505 A1 | 5/2004 | Cazier .......................... 345/811 |
| 2004/0107197 A1 | 6/2004 | Shen et al. ...................... 707/9 |
| 2004/0109025 A1 | 6/2004 | Hullot et al. ................. 345/764 |
| 2004/0109033 A1 | 6/2004 | Vienneau et al. ............ 345/863 |
| 2004/0117451 A1 | 6/2004 | Chung |
| 2004/0119755 A1 | 6/2004 | Guiborge |
| 2004/0119760 A1 | 6/2004 | Grossman et al. ........... 715/854 |
| 2004/0122789 A1 | 6/2004 | Ostertag et al. |
| 2004/0125142 A1 | 7/2004 | Mock et al. |
| 2004/0128275 A1 | 7/2004 | Moehrle ......................... 707/1 |
| 2004/0133854 A1 | 7/2004 | Black ........................... 715/517 |
| 2004/0135805 A1 | 7/2004 | Gottsacker et al. |
| 2004/0135811 A1 | 7/2004 | Pickering et al. |
| 2004/0139435 A1 | 7/2004 | Cui et al. |
| 2004/0142720 A1 | 7/2004 | Smethers .................... 455/550.1 |
| 2004/0150668 A1 | 8/2004 | Myers et al. |
| 2004/0153373 A1 | 8/2004 | Song et al. |
| 2004/0153968 A1 | 8/2004 | Ching et al. |
| 2004/0153973 A1 | 8/2004 | Horowitz |
| 2004/0164983 A1 | 8/2004 | Khozai ......................... 345/440 |
| 2004/0168153 A1 | 8/2004 | Marvin ......................... 717/120 |
| 2004/0181471 A1 | 9/2004 | Rogers |

(56) References Cited

U.S. PATENT DOCUMENTS

| | | |
|---|---|---|
| 2004/0186775 A1 | 9/2004 | Margiloff et al. ............... 705/14 |
| 2004/0189694 A1 | 9/2004 | Kurtz et al. |
| 2004/0192440 A1 | 9/2004 | Evans et al. |
| 2004/0196309 A1 | 10/2004 | Hawkins et al. |
| 2004/0205536 A1* | 10/2004 | Newman et al. ............... 715/509 |
| 2004/0212640 A1 | 10/2004 | Mann |
| 2004/0215612 A1 | 10/2004 | Brody |
| 2004/0221234 A1 | 11/2004 | Imai ............................... 715/256 |
| 2004/0221309 A1 | 11/2004 | Zaner et al. |
| 2004/0230508 A1 | 11/2004 | Minnis et al. ................... 705/35 |
| 2004/0230906 A1 | 11/2004 | Pik et al. ......................... 715/522 |
| 2004/0233239 A1 | 11/2004 | Lahdesmaki |
| 2004/0236796 A1 | 11/2004 | Bhatt et al. |
| 2004/0239700 A1 | 11/2004 | Bhatt et al. |
| 2004/0240902 A1 | 12/2004 | Dalal et al. |
| 2004/0243938 A1 | 12/2004 | Weise et al. .................... 715/205 |
| 2004/0254928 A1 | 12/2004 | Vronay |
| 2004/0260756 A1 | 12/2004 | Forstall et al. |
| 2004/0261013 A1 | 12/2004 | Wynn et al. |
| 2004/0268231 A1 | 12/2004 | Tunning ......................... 715/513 |
| 2004/0268235 A1 | 12/2004 | Wason |
| 2004/0268270 A1 | 12/2004 | Hill et al. |
| 2005/0004989 A1 | 1/2005 | Satterfield et al. ............ 709/206 |
| 2005/0004990 A1 | 1/2005 | Durazo et al. ................. 709/206 |
| 2005/0005235 A1 | 1/2005 | Satterfield et al. |
| 2005/0005249 A1 | 1/2005 | Hill et al. ....................... 715/963 |
| 2005/0010871 A1 | 1/2005 | Ruthfield et al. .............. 715/712 |
| 2005/0015361 A1 | 1/2005 | Payton et al. |
| 2005/0015364 A1 | 1/2005 | Payton |
| 2005/0021504 A1 | 1/2005 | Atchison ........................... 707/3 |
| 2005/0021521 A1 | 1/2005 | Wycoff |
| 2005/0022116 A1 | 1/2005 | Bowman et al. ............... 715/513 |
| 2005/0027779 A1 | 2/2005 | Schinner |
| 2005/0033614 A1 | 2/2005 | Lettovsky et al. |
| 2005/0033811 A1 | 2/2005 | Bhogal et al. |
| 2005/0039142 A1 | 2/2005 | Jalon et al. .................... 715/823 |
| 2005/0043015 A1 | 2/2005 | Muramatsu |
| 2005/0044500 A1 | 2/2005 | Orimoto et al. ............... 715/706 |
| 2005/0055449 A1 | 3/2005 | Rappold, III .................. 709/228 |
| 2005/0057584 A1 | 3/2005 | Gruen et al. ................... 715/752 |
| 2005/0060337 A1 | 3/2005 | Chou et al. |
| 2005/0065966 A1 | 3/2005 | Diab |
| 2005/0071242 A1 | 3/2005 | Allen et al. |
| 2005/0086135 A1 | 4/2005 | Lu ..................................... 705/30 |
| 2005/0088359 A1 | 4/2005 | Lynch et al. |
| 2005/0091576 A1 | 4/2005 | Relyea et al. |
| 2005/0097465 A1 | 5/2005 | Giesen et al. |
| 2005/0097511 A1 | 5/2005 | Bergman et al. |
| 2005/0108348 A1 | 5/2005 | Lee |
| 2005/0108734 A1 | 5/2005 | Need et al. |
| 2005/0114778 A1 | 5/2005 | Bronson et al. ............... 715/711 |
| 2005/0114781 A1 | 5/2005 | Brownholtz et al. |
| 2005/0117179 A1 | 6/2005 | Ito et al. ....................... 358/1.15 |
| 2005/0132010 A1 | 6/2005 | Muller |
| 2005/0132053 A1 | 6/2005 | Roth et al. ..................... 709/227 |
| 2005/0137873 A1 | 6/2005 | Liu |
| 2005/0138552 A1 | 6/2005 | Venolia |
| 2005/0138576 A1 | 6/2005 | Baumert et al. ............... 715/862 |
| 2005/0144157 A1 | 6/2005 | Moody et al. |
| 2005/0144241 A1 | 6/2005 | Stata et al. |
| 2005/0144284 A1 | 6/2005 | Ludwig et al. |
| 2005/0144560 A1 | 6/2005 | Gruen et al. |
| 2005/0144568 A1 | 6/2005 | Gruen et al. ................... 715/822 |
| 2005/0144572 A1 | 6/2005 | Wattenberg et al. |
| 2005/0154765 A1 | 7/2005 | Seitz et al. |
| 2005/0172262 A1 | 8/2005 | Lalwani ......................... 717/109 |
| 2005/0177789 A1 | 8/2005 | Abbar et al. |
| 2005/0183008 A1 | 8/2005 | Crider et al. .................. 715/517 |
| 2005/0185920 A1 | 8/2005 | Harper et al. |
| 2005/0188043 A1 | 8/2005 | Cortright et al. |
| 2005/0198573 A1 | 9/2005 | Ali et al. |
| 2005/0203975 A1 | 9/2005 | Jindal et al. ................... 707/204 |
| 2005/0216863 A1 | 9/2005 | Schumacher et al. ........ 715/827 |
| 2005/0222985 A1 | 10/2005 | Buchheit et al. |
| 2005/0223057 A1 | 10/2005 | Buccheit et al. |
| 2005/0223066 A1 | 10/2005 | Buchheit et al. |
| 2005/0223329 A1 | 10/2005 | Schwartz et al. ............. 715/711 |
| 2005/0234910 A1 | 10/2005 | Buchheit et al. |
| 2005/0240902 A1 | 10/2005 | Bunker et al. ................. 717/114 |
| 2005/0251757 A1 | 11/2005 | Farn |
| 2005/0256867 A1 | 11/2005 | Walther et al. .................... 707/5 |
| 2005/0278656 A1 | 12/2005 | Goldthwaite et al. ........ 715/810 |
| 2005/0289109 A1 | 12/2005 | Arrouye et al. |
| 2005/0289156 A1 | 12/2005 | Maryka et al. ................ 707/100 |
| 2005/0289158 A1 | 12/2005 | Weiss et al. |
| 2005/0289159 A1 | 12/2005 | Hadley et al. |
| 2006/0015816 A1 | 1/2006 | Kuehner et al. ............... 715/744 |
| 2006/0020962 A1 | 1/2006 | Stark .............................. 725/32 |
| 2006/0026033 A1 | 2/2006 | Brydon et al. |
| 2006/0026145 A1 | 2/2006 | Beringer et al. |
| 2006/0026213 A1 | 2/2006 | Yaskin et al. |
| 2006/0026242 A1 | 2/2006 | Kuhlmann et al. |
| 2006/0036580 A1 | 2/2006 | Stata ................................. 707/3 |
| 2006/0036945 A1 | 2/2006 | Radtke et al. ................. 715/708 |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. .................. 715/777 |
| 2006/0041545 A1 | 2/2006 | Heidloff et al. .................. 707/4 |
| 2006/0047644 A1 | 3/2006 | Bocking et al. |
| 2006/0053383 A1 | 3/2006 | Gauthier et al. |
| 2006/0059035 A1 | 3/2006 | Kraft et al. |
| 2006/0061738 A1 | 3/2006 | Rizzo |
| 2006/0064434 A1 | 3/2006 | Gilbert et al. |
| 2006/0069604 A1 | 3/2006 | Leukart et al. |
| 2006/0069684 A1 | 3/2006 | Vadlamani et al. |
| 2006/0069686 A1 | 3/2006 | Beyda et al. |
| 2006/0074844 A1 | 4/2006 | Frankel et al. |
| 2006/0080303 A1 | 4/2006 | Sargent et al. |
| 2006/0080363 A1 | 4/2006 | Vadlamani et al. |
| 2006/0080468 A1 | 4/2006 | Vadlamani et al. |
| 2006/0085502 A1 | 4/2006 | Sundararajan et al. |
| 2006/0095865 A1 | 5/2006 | Rostom ......................... 715/810 |
| 2006/0101051 A1 | 5/2006 | Carr et al. ..................... 707/102 |
| 2006/0101350 A1 | 5/2006 | Scott ............................. 715/779 |
| 2006/0111931 A1 | 5/2006 | Johnson et al. ................. 705/1 |
| 2006/0117249 A1 | 6/2006 | Hu et al. ........................ 715/255 |
| 2006/0117302 A1 | 6/2006 | Mercer et al. ................. 717/131 |
| 2006/0129937 A1 | 6/2006 | Shafron ......................... 715/733 |
| 2006/0132812 A1 | 6/2006 | Barnes et al. |
| 2006/0155689 A1 | 7/2006 | Blakeley et al. |
| 2006/0161849 A1 | 7/2006 | Miller et al. ................... 715/744 |
| 2006/0161863 A1 | 7/2006 | Gallo ............................. 715/810 |
| 2006/0165105 A1 | 7/2006 | Shenfield et al. |
| 2006/0168522 A1 | 7/2006 | Bala |
| 2006/0173824 A1 | 8/2006 | Bensky ............................. 707/3 |
| 2006/0173961 A1 | 8/2006 | Turski et al. |
| 2006/0184867 A1 | 8/2006 | Shpigel |
| 2006/0184896 A1 | 8/2006 | Foucher et al. |
| 2006/0200432 A1 | 9/2006 | Flinn et al. |
| 2006/0200455 A1 | 9/2006 | Wilson |
| 2006/0218500 A1 | 9/2006 | Sauve et al. ................... 715/767 |
| 2006/0224946 A1 | 10/2006 | Barrett et al. |
| 2006/0242557 A1 | 10/2006 | Nortis, III ..................... 715/234 |
| 2006/0242575 A1 | 10/2006 | Winser ........................... 715/530 |
| 2006/0242591 A1 | 10/2006 | Van dok et al. |
| 2006/0248012 A1 | 11/2006 | Kircher et al. |
| 2006/0253830 A1 | 11/2006 | Rajanala et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |
| 2006/0282784 A1 | 12/2006 | Taylor et al. |
| 2006/0282817 A1 | 12/2006 | Darst et al. |
| 2006/0294452 A1 | 12/2006 | Matsumoto ................... 715/236 |
| 2006/0294526 A1 | 12/2006 | Hambrick et al. ............ 719/315 |
| 2006/0294528 A1 | 12/2006 | Lund et al. |
| 2007/0006075 A1 | 1/2007 | Lection et al. |
| 2007/0006206 A1 | 1/2007 | Dhanjal et al. |
| 2007/0006327 A1 | 1/2007 | Lal |
| 2007/0011258 A1 | 1/2007 | Koo |
| 2007/0016857 A1 | 1/2007 | Polleck et al. |
| 2007/0033250 A1 | 2/2007 | Levin et al. ................... 709/204 |
| 2007/0050182 A1 | 3/2007 | Sneddon et al. .................. 704/2 |
| 2007/0050401 A1 | 3/2007 | Young et al. .................. 707/102 |

(56) References Cited

U.S. PATENT DOCUMENTS

| | | |
|---|---|---|
| 2007/0050469 A1 | 3/2007 | Gupta et al. |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061705 A1 | 3/2007 | Ammerlaan et al. |
| 2007/0061738 A1 | 3/2007 | Taboada et al. |
| 2007/0083813 A1 | 4/2007 | Lui |
| 2007/0094230 A1 | 4/2007 | Subramaniam et al. |
| 2007/0094597 A1 | 4/2007 | Rostom |
| 2007/0094608 A1 | 4/2007 | Getsch |
| 2007/0101299 A1 | 5/2007 | Shaw et al. |
| 2007/0106951 A1 | 5/2007 | McCormack et al. ........ 715/764 |
| 2007/0124696 A1 | 5/2007 | Mullender |
| 2007/0130276 A1 | 6/2007 | Zhang et al. |
| 2007/0143662 A1 | 6/2007 | Carlson et al. ............... 715/507 |
| 2007/0143671 A1 | 6/2007 | Paterson et al. ............. 715/209 |
| 2007/0156519 A1 | 7/2007 | Agassi et al. |
| 2007/0179841 A1 | 8/2007 | Agassi et al. |
| 2007/0180040 A1 | 8/2007 | Etgen et al. |
| 2007/0185826 A1 | 8/2007 | Brice et al. ........................ 707/1 |
| 2007/0186212 A1 | 8/2007 | Mazzaferri et al. |
| 2007/0203991 A1 | 8/2007 | Fisher et al. |
| 2007/0209008 A1 | 9/2007 | Mori et al. |
| 2007/0234223 A1 | 10/2007 | Leavitt et al. |
| 2007/0234290 A1 | 10/2007 | Ronen et al. |
| 2007/0240057 A1 | 10/2007 | Satterfield et al. ........... 715/705 |
| 2007/0260996 A1 | 11/2007 | Jakobson ...................... 715/781 |
| 2007/0266017 A1 | 11/2007 | Held et al. |
| 2007/0279417 A1 | 12/2007 | Garg et al. .................... 345/440 |
| 2007/0282956 A1 | 12/2007 | Staats ........................... 709/206 |
| 2007/0283287 A1 | 12/2007 | Taylor et al. |
| 2007/0300168 A1 | 12/2007 | Bosma et al. ................ 715/820 |
| 2008/0005247 A9 | 1/2008 | Khoo |
| 2008/0005249 A1 | 1/2008 | Hart |
| 2008/0005274 A1 | 1/2008 | Subbanna et al. |
| 2008/0005686 A1 | 1/2008 | Singh |
| 2008/0034304 A1 | 2/2008 | Feuerbacher et al. ........ 715/764 |
| 2008/0040682 A1 | 2/2008 | Sorenson et al. ............. 715/777 |
| 2008/0046518 A1 | 2/2008 | Tonnison et al. |
| 2008/0046828 A1 | 2/2008 | Bibliowicz et al. |
| 2008/0052670 A1 | 2/2008 | Espinosa et al. |
| 2008/0077571 A1 | 3/2008 | Harris et al. ........................ 707/5 |
| 2008/0098229 A1 | 4/2008 | Hartrell et al. |
| 2008/0104505 A1 | 5/2008 | Keohane et al. |
| 2008/0109787 A1 | 5/2008 | Wang et al. |
| 2008/0134138 A1 | 6/2008 | Chamieh et al. ............. 717/105 |
| 2008/0141156 A1 | 6/2008 | Reik et al. |
| 2008/0141242 A1 | 6/2008 | Shapiro ......................... 717/174 |
| 2008/0155555 A1 | 6/2008 | Kwong .......................... 719/315 |
| 2008/0168146 A1 | 7/2008 | Fletcher |
| 2008/0178110 A1 | 7/2008 | Hill et al. ...................... 715/771 |
| 2008/0182651 A1 | 7/2008 | Marshall et al. |
| 2008/0209316 A1 | 8/2008 | Zandstra |
| 2008/0216014 A1 | 9/2008 | Kurtenbach et al. |
| 2008/0244440 A1 | 10/2008 | Bailey |
| 2008/0263462 A1 | 10/2008 | Mayer-ullmann et al. |
| 2009/0007003 A1 | 1/2009 | Dukhon et al. ............... 715/778 |
| 2009/0012984 A1 | 1/2009 | Ravid et al. |
| 2009/0031295 A1 | 1/2009 | Zhao et al. |
| 2009/0034618 A1 | 2/2009 | Fu et al. |
| 2009/0064090 A1 | 3/2009 | Anonsen et al. |
| 2009/0083656 A1 | 3/2009 | Dukhon et al. ............... 715/781 |
| 2009/0100009 A1 | 4/2009 | Karp |
| 2009/0106375 A1 | 4/2009 | Carmel et al. ................ 709/206 |
| 2009/0144651 A1 | 6/2009 | Sprang et al. |
| 2009/0152349 A1 | 6/2009 | Bonev et al. |
| 2009/0158173 A1 | 6/2009 | Palahnuk et al. |
| 2009/0163183 A1 | 6/2009 | O'donoghue et al. |
| 2009/0192845 A1 | 7/2009 | Gudipaty et al. |
| 2009/0205013 A1 | 8/2009 | Lowes |
| 2009/0217192 A1 | 8/2009 | Dean et al. .................... 715/777 |
| 2009/0217263 A1 | 8/2009 | Gebhart et al. |
| 2009/0222763 A1 | 9/2009 | Dukhon et al. ............... 715/808 |
| 2009/0249339 A1 | 10/2009 | Larsson et al. |
| 2009/0259950 A1 | 10/2009 | Sullivan et al. |
| 2009/0319619 A1 | 12/2009 | Affronti |
| 2009/0319911 A1 | 12/2009 | McCann |
| 2010/0011310 A1 | 1/2010 | Rainisto ........................ 715/769 |
| 2010/0011319 A1 | 1/2010 | Gourdol et al. |
| 2010/0060645 A1 | 3/2010 | Garg et al. |
| 2010/0146478 A1 | 6/2010 | Head et al. |
| 2010/0159967 A1 | 6/2010 | Pounds et al. |
| 2010/0180226 A1 | 7/2010 | Satterfield et al. |
| 2010/0191818 A1 | 7/2010 | Satterfield et al. |
| 2010/0199261 A1 | 8/2010 | Shenfield et al. |
| 2010/0211889 A1 | 8/2010 | Durazo et al. |
| 2010/0223575 A1 | 9/2010 | Leukart et al. |
| 2010/0239470 A1 | 9/2010 | Pham-huu et al. |
| 2010/0293470 A1 | 11/2010 | Zhao et al. |
| 2011/0041092 A1 | 2/2011 | Zhang |
| 2011/0055673 A1 | 3/2011 | Teng et al. |
| 2011/0055690 A1 | 3/2011 | Wason |
| 2011/0072396 A1 | 3/2011 | Giesen et al. ................. 715/841 |
| 2011/0138273 A1 | 6/2011 | Radtke et al. ................ 715/256 |
| 2011/0225249 A1 | 9/2011 | Forstall et al. |
| 2011/0296322 A1 | 12/2011 | Dhanjal et al. ............... 715/760 |
| 2011/0307798 A1 | 12/2011 | Lezama Guadarrama et al. |
| 2012/0179993 A1 | 7/2012 | Himberger et al. |
| 2012/0215866 A1 | 8/2012 | Satterfield et al. |
| 2012/0324394 A1 | 12/2012 | Harris et al. |
| 2013/0014048 A1 | 1/2013 | Satterfield et al. |
| 2013/0159879 A1 | 6/2013 | Affronti et al. |
| 2013/0283207 A1 | 10/2013 | Dukhon et al. |
| 2013/0305141 A1 | 11/2013 | Wason |
| 2014/0019896 A1 | 1/2014 | Satterfield et al. |
| 2014/0115526 A1 | 4/2014 | Hartwell et al. |
| 2014/0132609 A1 | 5/2014 | Garg et al. |
| 2014/0258933 A1 | 9/2014 | Dukhon et al. |
| 2015/0220263 A1 | 8/2015 | Zhao et al. |
| 2015/0309679 A1 | 10/2015 | Dean et al. |
| 2015/0339281 A1 | 11/2015 | Dukhon et al. |
| 2015/0370771 A1 | 12/2015 | Dukhon et al. |
| 2016/0117069 A1 | 4/2016 | Harris et al. |
| 2017/0075952 A1 | 3/2017 | Hartwell et al. |
| 2017/0205971 A1 | 7/2017 | Himberger et al. |
| 2017/0212877 A1 | 7/2017 | Dukhon et al. |
| 2017/0262810 A1 | 9/2017 | McCann et al. |
| 2017/0337715 A1 | 11/2017 | Garg et al. |
| 2017/0357392 A1 | 12/2017 | Satterfield et al. |
| 2019/0197037 A1 | 6/2019 | Hartwell et al. |

FOREIGN PATENT DOCUMENTS

| | | |
|---|---|---|
| AU | 2006287408 B2 | 5/2011 |
| AU | 2007255043 | 8/2012 |
| AU | 2010216342 | 7/2014 |
| BR | PI0503986 | 3/2006 |
| CA | 2512047 A1 | 2/2006 |
| CA | 2750422 A1 | 8/2010 |
| CA | 2 650 016 | 9/2014 |
| CA | 2 512 036 | 11/2015 |
| CN | 1553377 | 12/2004 |
| CN | 1746914 | 3/2006 |
| CN | 1755599 A | 4/2006 |
| CN | 1790243 A | 6/2006 |
| CN | 101604243 A | 12/2009 |
| CN | 102422255 A | 4/2012 |
| CN | 101243439 | 6/2012 |
| CN | 102067166 | 6/2013 |
| CN | 102317897 | 7/2013 |
| CN | 102077163 | 10/2013 |
| CN | 102077199 B | 1/2014 |
| CN | 102422255 B | 11/2014 |
| CN | 201080021957.4 | 11/2014 |
| EP | 587394 | 3/1994 |
| EP | 0715247 A1 | 6/1996 |
| EP | 0774722 A2 | 5/1997 |
| EP | 0851368 A2 | 7/1998 |
| EP | 0 910 007 | 4/1999 |
| EP | 1 077 405 A2 | 2/2001 |
| EP | 1 104 151 | 5/2001 |
| EP | 1 672 518 | 6/2001 |

(56) References Cited

FOREIGN PATENT DOCUMENTS

| | | |
|---|---|---|
| EP | 1 223 503 | 7/2002 |
| EP | 1 376 337 | 2/2004 |
| EP | 1394713 | 3/2004 |
| EP | 1 462 999 A2 | 9/2004 |
| EP | 1462951 A1 | 9/2004 |
| EP | 1 542 133 A2 | 6/2005 |
| EP | 1 564 652 | 8/2005 |
| EP | 1 628 197 | 2/2006 |
| EP | 1 628 198 | 2/2006 |
| EP | 1 628 199 | 2/2006 |
| EP | 1 645 972 | 4/2006 |
| EP | 1 835 434 A1 | 9/2007 |
| EP | 1 915 001 | 4/2008 |
| EP | 0 584 269 B1 | 7/2014 |
| GB | 2 329 813 | 3/1999 |
| GB | 2 382 683 A | 6/2003 |
| GB | 2382683 | 6/2003 |
| GB | 2 391 148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | 06-342357 | 12/1994 |
| JP | 08255066 A | 10/1996 |
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2000-353130 A | 12/2000 |
| JP | 2000353130 | 12/2000 |
| JP | 2001-034775 | 2/2001 |
| JP | 2001056741 A | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2002-324055 A | 11/2002 |
| JP | 2002324055 | 11/2002 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2003-316630 A | 11/2003 |
| JP | 2004-078512 | 3/2004 |
| JP | 2004-086893 | 3/2004 |
| JP | 2004086896 A | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005115914 | 4/2005 |
| JP | 2005-115914 A | 5/2005 |
| JP | 2005-182353 | 7/2005 |
| JP | 2005322082 | 11/2005 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2008-117019 B | 5/2008 |
| JP | 2009-507311 | 2/2009 |
| JP | 2005-236089 | 9/2011 |
| JP | 4832024 | 9/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5480894 | 2/2014 |
| JP | 5486595 | 2/2014 |
| JP | 5559817 | 6/2014 |
| JP | 5559845 | 6/2014 |
| JP | 5597698 | 8/2014 |
| JP | 06202842 A | 9/2014 |
| JP | 5970466 B2 | 8/2016 |
| KR | 20010008081 A | 2/2001 |
| KR | 10-2001-0091344 A | 10/2001 |
| KR | 20010091344 A | 10/2001 |
| KR | 1020010091344 | 10/2001 |
| KR | 1020020004723 A | 1/2002 |
| KR | 1020020011415 A | 2/2002 |
| KR | 20020037560 A | 5/2002 |
| KR | 1020020066643 | 8/2002 |
| KR | 1020020072039 A | 9/2002 |
| KR | 10-0359378 | 10/2002 |
| KR | 100359378 | 10/2002 |
| KR | 10-2003-0070685 | 2/2003 |
| KR | 10-0388254 B1 | 6/2003 |
| KR | 100388254 | 6/2003 |
| KR | 2003-0072539 A | 9/2003 |
| KR | 1020030072539 | 9/2003 |
| KR | 10-2004-0071813 | 8/2004 |
| KR | 20040071813 | 8/2004 |
| KR | 100450881 B1 | 10/2004 |
| KR | 10-2005-0023805 A | 3/2005 |
| KR | 10-2005-0036702 A | 4/2005 |
| KR | 20060023005 A | 3/2006 |
| KR | 10-2006-0046735 | 5/2006 |
| KR | 10-2007-0000506 | 1/2007 |
| KR | 1020070116957 A | 12/2007 |
| KR | 10-2008-0002811 A | 1/2008 |
| KR | 1020080021262 A | 3/2008 |
| KR | 10-2008-0042852 A | 5/2008 |
| KR | 20080041211 A | 5/2008 |
| KR | 10-2008-0041234 A | 8/2008 |
| KR | 1020080072073 A | 8/2008 |
| KR | 10-1130421 | 3/2012 |
| KR | 101129221 B1 | 3/2012 |
| KR | 10-1149960 | 5/2012 |
| KR | 10-1149990 | 5/2012 |
| KR | 10-1159334 | 6/2012 |
| KR | 101161564 B1 | 7/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MX | 315932 | 12/2013 |
| MX | 322458 | 4/2014 |
| MX | 323275 | 9/2014 |
| MX | 323276 | 9/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |
| RU | 2001-122576 A | 9/2003 |
| RU | 2216119 C2 | 11/2003 |
| RU | 2222045 C2 | 1/2004 |
| RU | 2242050 C1 | 12/2004 |
| RU | 2004108142 A | 8/2005 |
| RU | 2005103645 | 7/2006 |
| RU | 2005-116667 | 11/2006 |
| RU | 2005/120362 | 1/2007 |
| RU | 2322687 | 4/2008 |

(56) References Cited

FOREIGN PATENT DOCUMENTS

| | | |
|---|---|---|
| RU | 2327205 C2 | 6/2008 |
| RU | 2328034 | 6/2008 |
| RU | 2332728 C2 | 8/2008 |
| RU | 2347261 C2 | 2/2009 |
| RU | 2005-130357 | 5/2014 |
| RU | 2537776 C2 | 1/2015 |
| TW | 420953 | 2/2001 |
| TW | 460839 | 10/2001 |
| TW | 490652 | 6/2002 |
| TW | 527812 | 4/2003 |
| TW | 2003-05097 | 10/2003 |
| TW | 569122 | 1/2004 |
| TW | 200514018 A | 4/2005 |
| TW | I254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| TW | 201424755 A | 7/2014 |
| TW | I512591 | 12/2015 |
| WO | 92/21091 | 11/1992 |
| WO | 9517732 A1 | 6/1995 |
| WO | WO 96/10231 | 4/1996 |
| WO | WO 96/39654 | 12/1996 |
| WO | WO 98/20410 | 5/1998 |
| WO | 99/04353 | 1/1999 |
| WO | WO 99/04353 A1 | 1/1999 ............ G06F 17/60 |
| WO | WO 99/27495 | 6/1999 |
| WO | WO 01/055894 | 8/2001 |
| WO | 0177795 A2 | 10/2001 |
| WO | WO 02/091162 A3 | 11/2002 |
| WO | WO 03/003240 A2 | 1/2003 |
| WO | 3058519 | 7/2003 |
| WO | WO 03/058519 A2 | 7/2003 |
| WO | WO 03/098500 | 11/2003 |
| WO | 2004/027672 | 4/2004 |
| WO | 2004056250 | 7/2004 |
| WO | WO 94/20921 | 9/2004 |
| WO | 2004086250 A1 | 10/2004 |
| WO | WO 2004/056250 A1 | 10/2004 |
| WO | 2005103900 A1 | 11/2005 |
| WO | 2007001636 | 1/2007 |
| WO | 2007/030696 | 3/2007 |
| WO | 2007/030727 A3 | 3/2007 |
| WO | WO 07/033159 A | 3/2007 |
| WO | 2007/036762 A1 | 4/2007 |
| WO | 2007064480 | 6/2007 |
| WO | WO 07/027737 A1 | 8/2007 |
| WO | 2008/027477 | 3/2008 |
| WO | WO 08/121718 A1 | 9/2008 |
| WO | 2009123801 A1 | 10/2009 |
| WO | WO 2009/158151 | 12/2009 |
| WO | WO 2009/158171 | 12/2009 |
| WO | WO 2009/158172 | 12/2009 |
| ZA | 2010/07809 | 2/2012 |
| ZA | 2010/07810 | 2/2012 |
| ZA | 201007875 | 2/2012 |
| ZA | 2011/04850 | 12/2012 |

OTHER PUBLICATIONS

Russel et al., (hereinafter "Russel"); "Special Edition Using Microsoft® Office Outlook ® 2003"; Que publishing on Sep. 25, 2003, 71 pgs.
Israeli Office Action dated May 3, 2012 cited in Appln No. 169718.
Taiwan Office Action dated May 14, 2012 cited in Appln No. 94122180, with Eng Lang Summary.
Mexican Office Action dated Jun. 6, 2012 cited in Appln No. MX/a/2008/014849.
Chinese Second Office Action dated Jun. 18, 2012 in Appln No. 200910148820.4.
Chinese Office Action dated Jul. 2, 2012 in Appln No. 200980124944.7.
U.S. Official Action dated Jun. 6, 2012 in U.S. Appl. No. 12/777,287.
U.S. Official Action dated Jun. 19, 2012 in U.S. Appl. No. 12/769,787.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-2012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
"NEO Pro—the total "find that email" solution!"; http://www.caelo.com/products/learn/, 2004.
"VisNetic MailFlow"; http://www.deerfield.com/products/visnetic-mailflow/, 2005.
"Look and Layout", retrieved at <<http://liv.ac.uk/csd/email/outlook/layout.htm>>, University of Liverpool, 9 pgs, retrieved Mar. 2008.
"Preview Pane on Conversation: 4 Pane View", 2005, Zimbra Inc., 3 pgs, retrieved Mar. 2008.
"Reading Pane in Conversation View", retrieved at <<http://www.zimbra.com/forums/users/5918-reading-pane-conversation-view.html>>, 5 pgs, retrieved Mar. 2008.
Microsoft Windows XP Professional, Version 2002, Service Pack 2, 4 pgs.
Camarda, Using Microsoft Word 97, Copyright 1997, CUE Corporation, pp. 412, 869.
Padwick, Gordon, Using Microsoft Outlook 2000, Que, Sp. Ed., May 1999; 3 pgs.
International Search Report dated Nov. 30, 2009, Application No. PCT/US2009/044059.
International Search Report dated Dec. 24, 2009, Application No. PCT/US2009/044292.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Chinese Decision on Reexamination dated Feb. 1, 2012 cited in Appln No. 200510089514.X.
Mexican Office Action dated Feb. 3, 2012 cited in Appln No. MX/a/2008/002889 with summary.
Israeli Office Action dated Feb. 23, 2012 cited in Appln No. 170668.
Japanese Notice of Rejection dated May 11, 2012 cited in Appln No. 2009-513223.
U.S. Official Action dated May 8, 2012 in U.S. Appl. No. 12/144,642.
Redmond, Tony; Excerpt from Book; Microsoft Exchange Server 2003; Published 2003; 14 pgs.
Chinese Office Action dated Jul. 12, 2012 in Appln No. 201080008789.5, no translation.
Chinese Decision on Rejection dated Jul. 31, 2012 cited in Appln No. 200680018095.3, no translation.
Chinese Office Action dated Aug. 2, 2012 in Appln No. 200980124945.1, no translation.
U.S. Appl. No. 13/427,939, filed Mar. 23, 2012 entitled "An Improved User Interface for Displaying a Gallery of Formatting Options Applicable to a Selected Object".
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.

(56) References Cited

OTHER PUBLICATIONS

"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
The Discussion Board Component of Blackboard: An Instructor's Guide; Aug. 2004; 23 pgs.
Hock, "Yahoo! to the Max"; May 10, 2005; 5 excerpted pgs.
Homeworking Forum; archived Dec. 6, 2004; 11 pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Douglas et al., "Dynamic Popup Menu Titles"; IP.Com Journal, IP.Com Inc., West Henrietta, NY, Aug. 1, 1992, 2 pgs.
Haden et al.; "Scrollable Popup Menu with Selection Tracking Display of Graphical Objects"; IP.Com Journal, IP.Com Inc., West Henrietta, NY, Aug. 1, 1994, 6 pgs.
"Index Card Metaphor for Multiple Property Sheets Associated with A Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Supplementary European Search Report dated Jun. 9, 2009 cited in EP Application No. 07795391.7-1225.
Israeli Office Action dated Oct. 12, 2009 cited in Appln No. 170668.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
PCT Written Opinion and Search Report dated Nov. 29, 2010 cited in International Application No. PCT/US2010/034277.
Mexican Office Action dated Jan. 6, 2011 cited in Appln No. PA/a/2005/008354.
Australian OA dated Jan. 17, 2011 cited in Application No. 2006287408.
Chinese Second Office Action dated Apr. 7, 2011 cited in Application No. 200680032789.2, w/translation.
Mexican Office Action dated May 26, 2011 cited in Appln. No. MX/a/2009/004151.
Mexican Office Action Summary, dated Sep. 22, 2011 cited in Appln. No. MX/A/2008/003342.
Japanese Notice of Rejection dated Nov. 25, 2011 cited in Appln. No. 2008-531249.
Korean Notice of Rejection dated Jan. 30, 2012 cited in Appln No. 10-2004-0048176.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
Japanese Notice of Rejection dated Feb. 3, 2012 cited in Appln No. 2008-530218.
Taiwan Office Action dated Feb. 8, 2012 cited in Appln No. 94123640, with Eng Lang Summary.
European Search Report dated Feb. 10, 2012 cited in Appln No. 05107153.8.
European Search Report dated Feb. 15, 2012 cited in Appln No. 05107157.9.
European Search Report dated Feb. 28, 2012 cited in Appln No. 05107184.3.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
Taiwan Search Report dated Mar. 14, 2012 cited in Appln No. 094123420.
European Search Report dated Mar. 16, 2012 cited in Appln No. 05107186.6.
Taiwan Notice of Allowance dated Mar. 29, 2012 cited in Appln No. 10120306600.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.
India First Examination Report dated Mar. 30, 2012 cited in Appln No. 1817/DEL/2005.
Japanese Notice of Allowance dated Apr. 11, 2012 cited in Appln No. 2008-530229.
Chinese Fourth Office Action dated Apr. 27, 2012 cited in Appln No. 200680018095.3.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Nov. 26, 2010 in U.S. Appl. No. 12/753,923.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jan. 26, 2012 in U.S. Appl. No. 12/464,584.
U.S. Official Action dated Feb. 27, 2012 in U.S. Appl. No. 12/372,386.
U.S. Official Action dated Mar. 14, 2012 in U.S. Appl. No. 12/142,927.
U.S. Official Action dated Apr. 5, 2012 in U.S. Appl. No. 12/163,758.
U.S. Official Action dated Apr. 19, 2012 in U.S. Appl. No. 13/102,633.
U.S. Official Action dated Apr. 26, 2012 in U.S. Appl. No. 11/782,059.
U.S. Appl. No. 11/154,278, filed Jun. 16, 2005 entitled "Cross Version and Cross Product User Interface Compatibility".

(56) References Cited

OTHER PUBLICATIONS

U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
U.S. Appl. No. 12/028,797, filed Feb. 9, 2008 entitled "Side-by-Side Shared Calendars".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999, 5 pp.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4,PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 869.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.

(56) References Cited

OTHER PUBLICATIONS

Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: $A_3D$ Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.onmigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
"Creating Charts: An Introduction," Excel for Chemists: . A Comprehensive Guide, E. Joseph Billo. http://www.ahut.edu.cn/yxsz/ahk/Teaching/Excel%for%20Chemists/ChQ2.pdf.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
"TeeChart for .NET Charting Control," TeeChart for NET Steema Software. http:/Iwww.teechart.net.
Oracle Discoverer Desktop User's Guide; 10g (9.0.4) for Windows; Part No. B10272-01; published 2003; http://download-uk.oracle.com/docs/ed/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
"Convert to Word 2007," http://www.regencytraining.com/word-2007-conversion.html, *Regency Training and Consulting*, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," *Natural Language Engineering*, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," *Herschel CSDT Meeeting*, pp. 1-21 (Sep. 2007).
Krill, P., "Microsoft's Ribbon Interface Draws Frowns, Smiles," *Info World*, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Perronne et al. "Building Java Enterprise Systems with J2EE", Publisher: Sams, Pub Date: Jun. 7, 2000 (pp. 1-8).
Screendumps—Microsoft Office (Microsoft Corporation, Microsoft Office Professional Edition 2003; 16 pages).
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.
Australian Search Report dated Jan. 16, 2007 cited in Singapore Application No. 200504474-8.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 dated Feb. 12, 2007.
International Search Report dated Oct. 17, 2007 cited in International Application No. PCT/US2006/012724.
International Search Report dated Nov. 27, 2007 in PCT/US2007/012573, 9 pages.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.
Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.

(56) References Cited

OTHER PUBLICATIONS

Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
Supplementary European Search Report dated May 28, 2009 cited in EP Application No. 07795391.7-1225.
Chinese Office Action dated Apr. 3, 2009 cited in Appln No. 200510089514.X.
Mexican Office Action dated Jun. 19, 2009 cited in Appln. No. PA/a/2005/007073.
Chinese Third Office Action dated Jun. 19, 2009 cited in Appln No. 200510092139.4.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 14, 2009 cited in Appln. No. 07795391.7-1225.
European Communication dated Sep. 28, 2009 cited in Appln No. 09006972.5-2211.
Chinese Office Action dated Oct. 16, 2009 cited in Appln No. 200510092142.6.
Russian Office Action dated Oct. 26, 2009 cited in Appln No. 2005120363/09(023023).
Russian Office Action dated Dec. 28, 2009 cited in Appln No. 2005125836/09(029010).
PCT Search Report and Written Opinion dated Dec. 29, 2009 cited in International Application No. PCT/US2009/046344.
Chilean Second Office Action dated Jan. 29, 2010 cited in Appln No. 1769-2005.
U.S. Official Action dated Dec. 23, 2003 in U.S. Appl. No. 09/896,384.
U.S. Official Action dated Apr. 27, 2006 in U.S. Appl. No. 10/800,056.
U.S. Final Official Action dated Oct. 19, 2006 in U.S. Appl. No. 10/800,056.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jul. 26, 2006 in U.S. Appl. No. 10/741,407.
U.S. Final Official Action dated Jan. 23, 2007 in U.S. Appl. No. 10/741,407.
U.S. Official Action dated Jan. 4, 2007 in U.S. Appl. No. 10/607,020.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 22, 2008 in U.S. Appl. No. 11/445,393.
U.S. Final Official Action dated Apr. 15, 2008 in U.S. Appl. No. 10/955,942.
U.S. Final Official Action dated Apr. 16, 2008 in U.S. Appl. No. 10/955,967.
U.S. Official Action dated Apr. 29, 2008 in U.S. Appl. No. 10/955,941.
U.S. Official Action dated May 28, 2008 in U.S. Appl. No. 10/982,073.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 20, 2008 in U.S. Appl. No. 10/955,928.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.
U.S. Official Action dated Oct. 8, 2008 in U.S. Appl. No. 11/445,393.
U.S. Final Official Action dated Oct. 28, 2008 in U.S. Appl. No. 11/151,686.
U.S. Official Action dated Nov. 25, 2008 in U.S. Appl. No. 11/154,278.
U.S. Official Action dated Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Appl. No. 12/725,605, filed Mar. 17, 2010 entitled "Improved User Interface for Displaying Selectable Software Functionality Controls that are Relevant to a Selected Object".
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.x1.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.

(56) References Cited

OTHER PUBLICATIONS

"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Chinese Office Action dated Jan. 22, 2010 cited in Appln No. 200680032564.7.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Feb. 20, 2008 in U.S. Appl. No. 10/848,774.
U.S. Official Action dated Feb. 21, 2008 in U.S. Appl. No. 10/851,442.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Action dated Apr. 15, 2010 in U.S. Appl. No. 11/823,999.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
U.S. Official Action dated Sep. 15, 2009 in U.S. Appl. No. 11/217,071.
U.S. Official Action dated Mar. 30, 2010 in U.S. Appl. No. 11/217,071.
U.S. Official Action dated May 5, 2010 in U.S. Appl. No. 10/851,506.
U.S. Official Action dated May 25, 2010 in U.S. Appl. No. 10/607,020.
Microsoft Press, Microsoft Computer Dictionary, Microsoft Press, Fifth Edition, 2002, pp. 374, 382.
ScreenShot of MS_Office_2003; (Microsoft Corporation, Microsoft Office Professional Edition 2003; 6 pages).
PCT Written Opinion and Search Report dated Jan. 9, 2007 cited in International Application No. PCT/US2006/033809.
European Office Action dated Mar. 9, 2009, cited in Appln No. 06790087.8.
Australian Office Action dated May 28, 2010 cited in Appln No. 2005202717.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
Mexican Office Action dated May 4, 2010 cited in Appln No. 2005/008354.
U.S. Official Action dated Sep. 21, 2010 in U.S. Appl. No. 11/217,071.
U.S. Official Action dated Sep. 27, 2010 in U.S. Appl. No. 10/836,154.
European Search Report dated Nov. 25, 2008 cited in Application EP 06 79 0087.
Israeli Office Action dated Jul. 5, 2010 cited in Appln No. 169718.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 12/954,952, filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
U.S. Appl. No. 13/027,289, filed Feb. 15, 2011 entitled "Floating Command Object".
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Feb. 11, 2011 in U.S. Appl. No. 11/401,470.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Appl. No. 13/102,633, filed May 6, 2011 entitled "Markup Based Extensibility for User Interfaces".
Japanese Notice of Rejection dated May 6, 2011 cited in Appln. No. 2005-236089.
Japanese Notice of Rejection dated May 6, 2011 cited in Appln. No. 2005-23608.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Seo et al, "Hangul Office 2000 Tutoring Book", Sep. 15, 2000, 16 pgs.
Office 2007, Microsoft, Released on Nov. 6, 2006, 23 pgs.

(56) References Cited

OTHER PUBLICATIONS

Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
U.S. Official Action dated Jun. 9, 2011 in U.S. Appl. No. 12/464,584.
Japanese Office Action dated Jun. 10, 2011 cited in JP Application No. 2008-530229, w/translation.
Chinese Third Office Action dated Jun. 21, 2011 cited in Appln No. 200680030421.2.
Chinese Decision on Rejection dated Jul. 21, 2011 cited in Appln No. 20068032789.2.
U.S. Official Action dated Jun. 7, 2011 in U.S. Appl. No. 11/332,822.
U.S. Official Action dated Jul. 8, 2011 in U.S. Appl. No. 11/401,470.
U.S. Official Action dated Jul. 8, 2011 in U.S. Appl. No. 12/163,784.
Ohmori, Yasuo et al., "Eigyo Mind—A Sales Support Tool," PFU Tech. Rev., vol. 10, No. 1, pp. 32-38, PFU Limited, May 1, 1999.
Chinese Second Office Action dated Jul. 14, 2011 cited in Appln No. 20680018095.3.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Aug. 3, 2011 in U.S. Appl. No. 12/142,927.
U.S. Official Action dated Sep. 13, 2011 in U.S. Appl. No. 12/372,386.
U.S. Official Action dated Sep. 14, 2011 in U.S. Appl. No. 12/163,758.
Mexican Office Action dated Oct. 3, 2011 cited in Appln. No. MX/a/2008/014849.
U.S. Official Action dated Oct. 25, 2011 in U.S. Appl. No. 12/144,642.
U.S. Official Action dated Nov. 2, 2011 cited in U.S. Appl. No. 10/836,154.
Dr. Dobb's Journal; "Windows 95 Common Controls"; May 1, 1995; 12 pgs.
Korean Notice of Rejection dated Nov. 3, 2011 cited in Appln No. 10-2005-0067257.
Japanese Notice of Rejection dated Nov. 4, 2011 cited in Appln No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
Miser, "Special Edition Using Mac OS X v10.2"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Israeli Office Action dated Jun. 3, 2012 cited in Appln No. 189293.
Israeli Office Action dated Aug. 29, 2012 in Appln No. 169717.
Malaysian Substantive Examination Report dated Oct. 31, 2012 cited in Appln No. PI 20053260, 2 pgs.
Canadian Office Action dated Nov. 29, 2012 cited in Appln No. 2,511,101 3 pgs.
Mexican Office Action dated Jan. 22, 2013 cited in Appln No. MX/a/2008/003342.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Mexican Office Action dated Mar. 22, 2013 in Appln No. PA/a/2005/008350.
EP Search Report dated Apr. 18, 2013 in Appln No. PCT/US2006/012724, 12 pgs.
Chinese Fourth Office Action dated Apr. 23, 2013 cited in Appln No. 200980124944.7, 7 pgs.
Philippines Substantive Examination Report dated Apr. 25, 2013 cited in Appln No. 1-2005-000495.
EP Search Report dated May 10, 2013 cited in Appln No. PCT/US2009/044292.
Russian Office Action dated May 13, 2013 cited in Appln No. 2010-151922.
Korean Final Notice of Preliminary Rejection dated May 20, 2013 cited in Appln No. 10-2008-7005939.
Mexican Office Action dated May 23, 2013 in Appln No. MX/a/2008/003342.
Chinese Notice on Third Office Action dated Jun. 5, 2013 cited in Appln No. 200980124644.9.
Mexican Office Action dated Jun. 11, 2013 in Appln No. PA/a/2005/008351.
Israeli Office Action dated Jun. 18, 2013 cited in Appln No. 170668.
Mexican Office Action dated Jun. 20, 2013 in Appln No. MX/a/2010-014056.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
U.S. Official Action dated May 23, 2013 in U.S. Appl. No. 11/401,470, 101 pgs.
U.S. Official Action dated Jun. 3, 2013 in U.S. Appl. No. 13/102,622, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.

(56) References Cited

OTHER PUBLICATIONS

U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
Mexican Office Action dated Jul. 9, 2013 in Appln No. MX/a/2008/002889.
Israeli Office Action dated Oct. 17, 2013 cited in Appln No. 1611334.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
Chinese Third Office Action dated Dec. 4, 2013 in Appln No. 200680032789.2.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
U.S. Appl. No. 13/769,598, filed Feb. 18, 2013 entitled "Automatic Conversation Techniques".
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
Mexican Office Action dated Feb. 25, 2013 in Appln No. MX/a/2008/002889, 11 pgs.
U.S. Official Action dated Mar. 1, 2013 in U.S. Appl. No. 11/430,562, 66 pgs.
Inoue; "Let's Learn PowerPoint Using Actual Samples"; Nikkei PC21, Japan, Nikkei Business Publications, Inc., Apr. 1, 2008, vol. 13, No. 7, 5 pgs.—No English Translation.
Japanese Office Action dated Jan. 9, 2014 cited in JP Application No. 2012-510906 w/translation.
Malaysian Substantive Examination Report dated Jan. 15, 2014 in Appln No. PI 20080508.
Canadian Office Action dated Jan. 28, 2014 in Appln No. 2,511,101, 4 pgs.
EP Communication dated Feb. 11, 2014 cited in Appln No. 09 798 374.6.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
U.S. Official Action dated Jan. 29, 2014 in U.S. Appl. No. 12/777,287, 44 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
U.S. Appl. No. 14/226,421, filed Mar. 24, 2014 entitled "Exposing Non-Authoring Features Through Document Status Information in an Out-Space User Interface".
EP Communication dated Jan. 27, 2014 in Appln No. 09 767 2208, 7 pgs.
Norway Office Action dated Feb. 10, 2014 in Appln No. 20053655, 4 pgs.
Norway Office Action dated Feb. 10, 2014 in Appln No. 20053658, 4 pgs.
India First Examination Report dated Mar. 19, 2014 in Appln No. 1818/DEL/2005, 1 pg.
Chilean Office Action dated Mar. 30, 2014 in Appln No. 2804-2011, 7 pgs.
Chinese Third Office Action dated Apr. 3, 2014 in Appln No. 201080021957.4, 6 pgs.
U.S. Official Action dated Apr. 18, 2014 in U.S. Appl. No. 11/782,059, 42 pgs.
Malaysian Notice of Allowance Received in Patent Application No. PI 20080400, dated Sep. 13, 2013, Filed Date: Aug. 29, 2006, 2 Pages.
Notice of Allowance Received for Korea Republic of (KR) Patent Application No. 10-2008-7005939, dated Nov. 20, 2013, Filed Date: Sep. 12, 2006, 2 Pages.
Japanese Office Action Issued in Patent Application No. 2011-550149, dated Jan. 20, 2014, Filed Date: Jan. 22, 2010, 5 Pages.
Australian Office Action Issued in Patent Application No. 2010216342, dated Mar. 14, 2014, Filed Date: Jan. 22, 2010, 3 Pages.
Mexican Notice of Allowance Received in Patent Application No. MX/a/2008/002889, dated Apr. 1, 2014, Filed Date: Aug. 29, 2006, 1 Page. (w/o English Translation).
Russian Notice of Allowance Issued in Patent Application No. 2011134380, dated Apr. 5, 2014, Filed Date: Jan. 22, 2010, 22 Pages.
Australian Notice of Allowance Received for Australia Patent Application No. 2009262833, dated Apr. 16, 2014, Filed Date: Jun. 5, 2009, 2 Pages.
Taiwan Search Report dated May 7, 2014 cited in Appln No. 098117357, 13 pgs.
Japanese Notice of Allowance Issued in Patent Application No. 2011-550149, dated May 8, 2014, Filed Date: Jan. 22, 2010, 4 Pages.
Australian Second Office Action Issued in Patent Application No. 2010216342, dated May 12, 2014, Filed Date: Jan. 22, 2010, 3 Pages.
Taiwan Search Report dated May 12, 2014 cited in Appln No. 098119245, 11 pgs.
Notice of Allowance Issued in Chinese Patent Application No. 200680032789.2, dated May 15, 2014, Filed Date: Sep. 8, 2006, 3 Pages.
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
Mexican Office Action Received in Patent Application No. MX/a/2010/013566, dated Jun. 12, 2013, 3 Pages.
Israeli Office Action Received in Patent Application No. 209011, dated Sep. 10, 2013, 5 Pages.
Chilean Office Action Received in Patent Application No. 2804-2011, dated Apr. 4, 2014, 7 Pages. (w/o English Translation).

(56) References Cited

OTHER PUBLICATIONS

U.S. Official Action dated Sep. 10, 2014 in U.S. Appl. No. 12/954,952, 52 pgs.
U.S. Official Action dated Sep. 18, 2014 in U.S. Appl. No. 11/782,059, 41 pgs.
U.S. Official Action dated Sep. 30, 2014 in U.S. Appl. No. 13/595,084, 185 pgs.
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
U.S. Official Action dated Sep. 11, 2012 in U.S. Appl. No. 12/163,784.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
Mexican Office Action dated Aug. 20, 2013 in Appln No. MX/a/2011/011749.
Canadian Office Action dated Dec. 5, 2013 in Appln No. 2,618,169.
Chinese Decision on Rejection dated Jan. 13, 2014 in Appln No. 200980124644.9.
U.S. Official Action dated Dec. 6, 2013 in U.S. Appl. No. 10/851,506, 25 pgs.
U.S. Official Action dated Jan. 16, 2014 in U.S. Appl. No. 13/102,633, 45 pgs.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888.
Canadian Office Action dated Jan. 18, 2013 in Appln No. 2,512,155.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
Ringel et al., "Automated Message Prioritization: Making Voicemail Retrieval More Efficient"; In CHI'02 Extended Abstracts on Human Factors in Computing Systems; Apr. 20, 2002; pp. 592-593.
Kumar et al., "A personal agent application for the semantic web"; In AAAI Fall Symposium on Personalized Agents; 2002; pp. 1-8.
Gorniak, Peter; "Sorting email messages by topic"; 1998; 1 pg.
Maes et al., "Learning Interface Agents"; In AAAI (vol. 93); 1993; pp. 459-465.
Russian Notice of Allowance Issued in Patent Application No. 2010152843, dated Feb. 20, 2014, 16 Pages.
Israeli Office Action dated Feb. 28, 2014 in Appln No. 209012, 6 pgs.
Mexican Office Action Received for Mexican Patent Application No. PA/a/2005/008349, dated Mar. 14, 2014, Filed Date: Aug. 5, 2005, 12 Pages. (w/o English Translation).
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
U.S. Official Action dated Aug. 25, 2014 in U.S. Appl. No. 13/102,633, 117 pgs.
U.S. Official Action dated Sep. 11, 2014 in U.S. Appl. No. 13/427,939, 133 pgs.
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/032,094, filed Sep. 19, 2013 entitled "User Interface for Displaying Selectable Software Functionality Controls that are Relevant to a Selected Object", Satterfield et al.
Mexican Office Action dated Jun. 11, 2013 cited in Appln. No. MX/a/2008/003342.
Canadian Office Action dated Sep. 18, 2013 in Appln No. 2,512,036.
Japanese Notice of Rejection dated Sep. 19, 2013 in Appln No. 2012-153634.
Mexican Office Action dated Sep. 27, 2013 in Appln No. MX/a/2008/014849.
EP Communications to Attend Oral Proceedings dated Oct. 4, 2013 in Appln No. 09 006 972.5.
Canadian OA dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln. No. MX/a/2010/013566.
Korean Notice of Preliminary Rejection dated Nov. 12, 2012 cited in KR-10-2008-7005939.
Chilean Second Office Action dated Nov. 21, 2012 cited in Appln No. 1559-2010.
Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
Ramamritham et al., Scheduling Algorithms and Operating Systems Support for Real-Time Systems; © 1994; IEEE; 13 pages.
Zweben et al., Scheduling and Rescheduling with Iterative Repair, © 1993; IEEE; 9 pages.
Taiwan Office Action dated Mar. 17, 2014 in Appln. No. 98118252, 10 pgs.
Canadian Office Action dated Apr. 25, 2014 in Appln No. 2,512,155, 9 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30 2014 in Appln No. 2010247882, 3 pgs.
EP Search Report dated Jun. 2, 2014 in Appln No. PCT/US2010/034277, 6 pgs.
U.S. Official Action dated Apr. 25, 2014 in U.S. Appl. No. 12/028,797, 42 pgs.
U.S. Official Action dated May 14, 2014 in U.S. Appl. No. 13/615,668, 34 pgs.
U.S. Official Action dated May 30 2014 in U.S. Appl. No. 13/027,289, 188 pgs.
U.S. Official Action dated Jun. 2, 2014 in U.S. Appl. No. 12/144,642, 32 pgs.
U.S. Appl. No. 14/816,844, filed Aug. 3, 2015 entitled "Accessing an Out-Space User Interface for a Document Editor Program".

(56) References Cited

OTHER PUBLICATIONS

U.S. Appl. No. 14/841,698, filed Aug. 31, 2015 entitled "Accessing an Out-Space User Interface for a Document Editor Program".
Mexican Office Action Issued in Mexico Patent Application No. MX/a/2011/011749, dated Aug. 2, 2013, 6 Pages. (w/o English Translation).
Japanese Office Action Issued in Japan Patent Application No. 2012-510906, dated Jan. 16, 2014, 4 Pages.
Japanese Notice of Allowance Issued in Patent Application No. 2012-510906, dated Jul. 10, 2014, 3 Pages.
Israeli Office Action dated Mar. 2, 2015 in Appln No. 213908, 5 pgs.
Korean Notice of Allowance Issued in Patent Application No. 10-2010-7029199, dated Apr. 24, 2015, 2 Pages. (w/o English Translation).
Israeli Office Action Issued in Patent Application No. 215418, dated Apr. 28, 2015, 3 Pages.
India First Examination Report dated May 6, 2015 cited in Appln No. 1979/DELNP/2008, 2 pgs.
EP Communication dated May 18, 2015 cited in 10 775 348.5, 7 pgs.
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Canadian Office Action dated May 26, 2015 cited in Appln No. 2,618,169, 4 pgs.
Canadian Notice of Allowance dated Jun. 2, 2015 in Appln No. 2,512,036, 1 pg.
Malaysia Substantive Examination Report dated Jun. 30, 2015 in Appln No. PI 2010005439, 2 pgs.
Chinese Notice on Reexamination dated Jul. 8, 2015 cited in Appln No. 200980124644.9, 8 pgs.
Canadian Office Action dated Jul. 14, 2015 in Appln No. 2,725,046, 5 pgs.
Norwegian Office Action dated Jul. 27, 2015 in Appln No. 20053655, 3 pgs.
Chinese Fourth Office Action dated Aug. 3, 2015 in Appln No. 200910148820.4, 6 pgs.
Canadian Office Action dated Aug. 3, 2015 in Appln No. 2,724,201, 5 pgs.
Korean Notice of Preliminary Rejection dated Sep. 30, 2015 in Appln No. 10-2010-7028097, 7 pgs.
Canadian Office Action Issued in Application No. 2,848,700, dated Oct. 15, 2015, 4 Pages.
Canadian Office Action dated Oct. 16, 2015 in Appln No. 2,724,681, 7 pgs.
Korean Notice of Preliminary Rejection dated Oct. 19, 2015 in Appln No. 10-2010-7028989, 7 pgs. (No English Language Translation).
U.S. Official Action dated Jun. 12, 2015 in U.S. Appl. No. 13/615,668, 26 pgs.
U.S. Official Action dated Jun. 19, 2015 in U.S. Appl. No. 14/150,531, 135 pgs.
U.S. Official Action dated Jun. 24, 2015 in U.S. Appl. No. 13/769,598, 20 pgs.
U.S. Official Action dated Jun. 30, 2015 in U.S. 11/782,059, 30 pgs.
Notice of Allowance dated Jul. 28, 2015 in U.S. Appl. No. 13/595,084, 15 pgs.
U.S. Official Action dated Sep. 14, 2015 in U.S. Appl. No. 12/142,927, 31 pgs.
U.S. Official Action dated Oct. 1, 2015 in U.S. Appl. No. 13/427,939, 25 pgs.
U.S. Official Action dated Nov. 10, 2015 in U.S. Appl. No. 14/150,531, 31 pgs.
Notice of Allowance dated Nov. 20, 2015 in U.S. Appl. No. 13/769,598, 15 pgs.
Microsoft Office XP/2002, Wikipedia, http://en.wikipedia.org/wiki/Microsoft_Office_XP, May 31, 2001 (May 31, 2001); 3 pgs.
Akamatsu, "Touch with a Mouse, A Mouse Type Interface Device with Tactile and Force Display"; © IEEE; 1995; 5 pgs.
Israeli Office Action dated Mar. 6, 2014 in Appln No. 194785, 5 pgs.
Canadian Office Action dated Sep. 4, 2014 in Appln No. 2,512,036, 3 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Chinese Decision on Reexamination dated Nov. 18, 2014 in Appln. No. 200910148820.4, 15 pgs.
U.S. Official Action dated Oct. 10, 2014 in U.S. Appl. No. 11/332,822, 47 pgs.
U.S. Official Action dated Oct. 24, 2014 in U.S. Appl. No. 13/615,668, 35 pgs.
U.S. Appl. No. 14/665,112, filed Mar. 23, 2015 entitled "Hierarchically-Organized Control Galleries".
U.S. Appl. No. 14/635,605, filed Mar. 2, 2015 entitled "Command User Interface for Displaying Selectable Software Functionality Controls".
"Microsoft Office 2003 Editions Product Guide", Published on: Sep. 2003, Available at: tp://www.google.ca/url?sa=t&rct=j&q=&esrc=s&frm=1&source=web&cd=3&ved=0CCoQFjAC&url=http%3A%2F%2Fdownload.microsoft.com%2Fdownload%2F0%2Ff%2F1%2F0f1d5b1f-53bc-47c3-bf6f-ac6d67cf9766%2FOffice2003Guide.doc&ei=CKTkVPBCgb-xBL6qgvAH&usg=AFQjCNEpNk4IFH6m27BXr48IKv1kRXo_xA, 167 pgs.
Baker; "Configuring the Pages Pane in Acrobat"; Apr. 22, 2004; Planet PDF; 4 pgs.
Murray; First Look 2007 Microsoft Office System; Jun. 21, 2006; Microsoft Press; 16 pgs.
Schwartz, Microsoft Office 2007 for Windows: Visual QuickStart Guide, 11 pgs.
Lyons et al., The Oval Menu-Evolution and Evaluation of a Wedget, © 1996; IEEE; 8 pgs.
Malaysian Substantive Examination Report dated Jan. 30, 2015 in Appln No. PI 2010005439, 3 pgs.
Malaysian Modified Substantive Examination Report dated Jan. 30, 2015 in Appln No. PI 2010005558, 3 pgs.
Notice of Allowance dated Mar. 19, 2015 in U.S. Appl. No. 13/464,572, 40 pgs.
U.S. Official Action dated Mar. 27, 2015 in U.S. Appl. No. 12/142,927, 68 pgs.
Notice of Allowance dated Apr. 16, 2015 in U.S. Appl. No. 13/595,084, 19 pgs.
U.S. Official Action dated Apr. 23, 2015 in U.S. Appl. No. 11/332,822, 40 pgs.
U.S. Official Action dated Apr. 29, 2015 in U.S. Appl. No. 13/427,939, 43 pgs.
Norwegian Office Action Received for Patent Application No. 20053656, dated Nov. 19, 2014, 2 pgs.
Indonesian Office Action Issued in Patent Application No. P00200500444, dated Jan. 16, 2015, 3 Pages.
Chinese Third Office Action dated Feb. 2, 2015 in Appln No. 200910148820.4, 12 pgs.
Israeli Office Action Issued in Patent Application No. 213908, dated Feb. 3, 2015, 3 pages.
Chinese Fourth Office Action dated Feb. 15, 2015 in Appln No. 200780020312.7, 9 pgs.
India Examination Report dated Feb. 17, 2015 in Appln No. 1568/DEL/2005, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
U.S. Official Action dated Feb. 24, 2015 in U.S. Appl. No. 13/769,598, 33 pgs.
U.S. Official Action dated Feb. 24, 2015 in U.S. Appl. No. 11/782,059, 37 pgs.
Embedding and Linking Excel Worksheets into Word; 2001, The McGraw-Hill Companies, Inc, 6 pgs.
India First Examination Report Issued in Patent Application No. 1820/DEL/2005, dated Mar. 20, 2014, 1 Page.
Israeli Office Action dated May 15, 2014 in Appln No. 209047, 6 pgs.

(56) References Cited

OTHER PUBLICATIONS

Israeli Office Action dated May 15, 2014 in Appln No. 209048, 15 pgs.
Canadian Office Action Issued for Patent Application No. 2618169, dated Sep. 9, 2014, 4 pgs.
Taiwan Office Action and Search Report Issued in Patent Application No. 98145363, dated Oct. 2, 2014, 25 Pages.
Chilean Office Action dated Oct. 24, 2014 in Appln No. 2804-2011, 5 pgs. (w/o English Translation).
Israel Office Action Issued in Patent Application No. 169717, dated Oct. 29, 2014, 1 Page; (w/o English Translation).
Malaysian Substantive Examination Report dated Nov. 14, 2014 in Appln No. PI 2010005637, 3 pgs.
Norwegian Office Action dated Nov. 29, 2014 in Appln No. 20053658 4 pgs.
Norwegian Office Action dated Nov. 29, 2014 in Appln No. 20053655, 3 pgs.
India First Examination Report dated Dec. 23, 2014 in Appln No. 1819/del/2005, 2 pgs.
U.S. Official Action dated Dec. 24, 2014 in U.S. Appl. No. 13/102,633, 42 pgs.
U.S. Official Action dated Jan. 15, 2015 in U.S. Appl. No. 12/028,797, 47 pgs.
U.S. Appl. No. 14/981,404, filed Dec. 28, 2015 entitled "Command User Interface for Displaying Selectable Software Functionality Controls".
Inoue, Risako, "Learn from Demonstration How to Use Power Point", In Nikkei PC21, Nikkei Business Publications, vol. 13, Issue 7, Apr. 1, 2008, pp. 168-171 (No English Translation provided).
Japanese Office Action Issued in Patent Application No. 2014-163396, dated Oct. 21, 2015, 5 Pages.
Canadian Office Action Issued in Patent Application No. 2,512,155, dated Nov. 30, 2015, 7 Pages.
Chinese Fifth Office Action dated Dec. 16, 2015 in Appln No. 200910148820.4, 6 pgs.
Korean Notice of Preliminary Rejection Issued in Patent Application No. 10-2011-7018813, dated Jan. 8, 2016, 4 Pages.
Norway Office Action dated Jan. 22, 2016 in Appln No. 20054097, 1 pg.
U.S. Official Action dated Jan. 4, 2016 in U.S. Appl. No. 13/615,668, 28 pgs.
U.S. Official Action dated Jan. 29, 2016 in U.S. Appl. No. 14/142,132, 149 pgs.
U.S. Appl. No. 11/332,822, Notice of Allowance dated Aug. 26, 2016, 9 pgs.
U.S. Appl. No. 14/226,421, Notice of Allowance dated Aug. 31, 2016, 7 pgs.
U.S. Appl. No. 13/615,668, Office Action dated Sep. 1, 2016, 18 pgs.
Canadian Office Action in Application 2512155, dated Aug. 26, 2016, 4 pgs.
Chilean Office Action in Application 200501770, dated Sep. 2, 2016, 2 pgs. (no English translation).
Chilean Office Action in Application 200501769, dated Sep. 2, 2016, 2 pgs. (no English translation).
"2007 Microsoft Office System is Golden", Microsoft News Center, Nov. 6, 2006, 23 Pages.
"User Interface Architecture", Retrieved from <<http://www.datamaster2003.com/uiarchitecture.htm>>, 2003, 2 Pages.
Australia Notice of Allowance Issued in Patent Application No. 2010216342, dated Jun. 25, 2014, 2 Pages.
Australian Notice of Allowance Issued in Patent Application No. 2005203411, dated Jul. 15, 2010, 3 Pages.
Barr, Jim, "Gmail Tips—The Complete Collection", Retrieved Date: Dec. 15, 2004, https://web.archive.org/web/20041215091758/http://g04.com/misc/GmailTipsComplete.html, 18 pgs.
Bateman, et al., "Towards Constructive Text, Diagram, and Layout Generation for Information Presentation", In Association for Computational Linguistics, vol. 27, Issue 3, Sep. 2001, pp. 409-449.
Canada Notice of Allowance Issued in Patent Application No. 2,848,667, dated Oct. 6, 2015, 1 Page.
Canadian Notice of Allowance Issued in Patent Application No. 2512047, dated Oct. 2, 2014, 1 Page.
Chile Office Action Issued in Patent Application No. 1770-2005, dated Feb. 9, 2010, 7 Pages. (W/out English translation).
Chile Office Action Issued in Patent Application No. 1770-2005, dated Mar. 13, 2009, 10 Pages, with English translation.
Chilean Office Action in Appln. No. 2005-01769, dated Jul. 15, 2005, 11 pgs. (with English translation).
Chinese Notice of Allowance Issued in Patent Application No. 200510092142.6, dated Jun. 18, 2010, 4 Pages.
Communication Pursuant to Rule 69 EPC Issued in European Patent Application 05107153.8, dated Apr. 2, 2012, 1 Page.
Egyptian Office Action Issued in Patent Application No. 3712005, dated Apr. 9, 2010, 4 Pages.
European Office Action in Appln. No. 05107157.9, dated Jul. 20, 2016, 6 pgs.
European Office Action Issued in Patent Application 05107153.8, dated Apr. 2, 2012, 1 Page.
European Search Report Issued in Patent Application No. 09727331.2, dated Aug. 1, 2014, 1 Page.
Feiner, Steven, "A Grid-Based Approach to Automating Display Layout", In Book Readings in Intelligent User Interfaces, Morgan Kaufmann Publishers Inc., pp. 249-254.
Fifth Office Action Issued in Chinese Patent Application 200980112454.5, dated Apr. 2, 2014, 19 Pages.
First Office Action Issued in Chinese Patent Application 200980112454.5, dated Aug. 26, 2011, 9 Pages.
Furman, et al., "Positioning HTML Elements with Cascading Style Sheets", W3C Working Draft, Aug. 19, 1997, 14 Pages.
Gajos, et al., "Supple: Automatically Generating User Interfaces", In Proceedings of the 9th International Conference on Intelligent User Interfaces, Jan. 13, 2004, pp. 1-8.
Israel Office Action in Application 169718, dated Oct. 17, 2013, 4 pages. (with English translation).
Israel Office Action in Application 233533, dated May 31, 2016, 2 pgs. (W/out English Translation).
Israel Office Action Issued in Patent Application No. 169717, dated Oct. 26, 2009, 2 Pages.
Jacobs, et al., "Adaptive Grid-Based Document Layout", In Proceedings of ACM transactions on Graphics, SIGGRAPH 2003, vol. 22, Issue 3, Jul. 2003, 11 Pages.
Japanese Notice of Allowance Issued in Patent Application No. 2005-236089, dated Aug. 23, 2011, 6 Pages.
Japanese Office Action Issued in Patent Application No. 2005-236089, dated Sep. 20, 2011, 2 Pages.
Kim, et al., "Migrating Legacy Software Systems to CORBA based Distributed Environments through an Automatic Wrapper Generation Technique", In Proceedings SCI 2000 and the 6th International Conference on Information Systems Analysis and Synthesis ISAS 2000, vol. 10, Aug. 9, 2001, 6 Pages.
Korean Notice of Allowance Issued in Patent Application No. 10-2005-0067411, dated Mar. 12, 2012, 2 Pages. (Without English Translation).
Louw, et al., "Extensible Web Browser Security", In Proceedings of the 4th International Conference on Detection of Intrusions and Malware, and Vulnerability Assessment, Jul. 12, 2007, 20 Pages.
Malaysian Notice of Allowance Issued in Patent Application No. PI20053258, dated Oct. 15, 2012, 2 Pages.
Mexican Notice of Allowance Issued in Patent Application No. PA/a/2005/008349, dated Dec. 16, 2014, 1 Page. (No English translation).
New Zealand Application No. 541299, Examination Report dated Nov. 8, 2006, 1 page.
Non-Final Office Action Issued in U.S. Appl. No. 10/780,547, dated Oct. 4, 2007, 16 Pages.
Norway Notice of Allowance Issued in Patent Application No. 20053656, dated Jun. 22, 2015, 2 Pages. (W/out English Translation).
Norway Office Action dated Sep. 15, 2015 in Appln. No. 20053658, 1 page (no English translation).

(56) References Cited

OTHER PUBLICATIONS

Norway Office Action Issued in Patent Application No. 20053656, dated Feb. 22, 2014, 5 Pages.
Office Action Issued in Mexican Patent Application No. MX/a/2011/008461, dated May 19, 2016, 10 Pages. (No English Translation).
Office Action Issued in Philippines Patent Application 1200500404, dated Apr. 12, 2011, 1 Page.
Office Action Issued in Russian Patent Application 200512583709, dated Oct. 30, 2009, 5 Pages. (English translation).
Parry, Dominic Charles, "CREWS: A Component-Driven, Run-Time Extensible Web Service Framework", In Thesis Submitted in fulfilment of the requirements for the Degree of Master of Science, Rhodes University, Dec. 2003, 103 Pages.
Philippines Office Action Issued in Patent Application No. PH12005405, dated Jan. 19, 2006, 1 Page.
Russian Notice of Allowance Issued in Patent Application No. 2005125837, dated Jul. 10, 2010, 23 Pages.
Selca, et al., "Customizing the Office Fluent User interface in Access 2007", Retrieved from <<http://msdn.microsoft.com/en-us/library/bb187398(printer).aspx>>, Dec. 2006, 22 Pages.
Shih, et al., "A Stepwise Refinement Approach to Multimedia Presentation Designs", In IEEE International Conference on Systems, Man, and Cybernetics Computational Cybernetics and Simulation, vol. 1, Oct. 12, 1997, pp. 117-122.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
Supplementary Search Report Issued in European Patent Application 09727331.2, dated Jul. 16, 2014, 6 Pages.
Supplementary Search Report Issued in European Patent Application 09767220.8, dated Jan. 30, 2013, 8 Pages.
Supplementary Search Report Issued in European Patent Application 09798374.6, dated May 10, 2013, 6 Pages.
Taiwan Notice of Allowance Issued in Patent Application No. 102112935, dated Aug. 31, 2015, 4 Pages.
Taiwan Notice of Allowance Issued in Patent Application No. 94123640, dated Mar. 12, 2013, 4 Pages. (with English translation).
Taiwan Notice of Allowance Issued in Patent Application No. 98145363, mailed Aug. 13, 2015, 4 Pages.
Thailand Notice of Allowance in Application 0501003162, dated Sep. 13, 2016, 1 pages. No English translation.
U.S. Appl. No. 10/780,547, Office Action dated Jun. 14, 2007, 6 Pages.
U.S. Appl. No. 10/800,056, Advisory Action dated Feb. 14, 2007, 3 pgs.
U.S. Appl. No. 10/955,967, Notice of Allowance dated Apr. 10, 2012, 18 Pages.
U.S. Appl. No. 12/372,386 Notice of Allowance dated Mar. 10, 2015, 3 Pages.
U.S. Appl. No. 12/372,386, Notice of Allowance dated Mar. 23, 2015, 5 Pages.
U.S. Appl. No. 13/427,939, Office Action dated Sep. 13, 2016, 13 pgs.
U.S. Appl. No. 14/032,094, Notice of Allowance dated Sep. 30, 2016, 9 pgs.
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.
U.S. Appl. No. 11/332,822, Notice of Allowance dated Sep. 14, 2016, 2 pgs.
U.S. Notice of Allowance dated Apr. 10, 2007 in U.S. Appl. No. 10/741,407, 8 pgs.
U.S. Notice of Allowance dated Aug. 24, 2004 in U.S. Appl. No. 09/896,384, 9 pgs.
U.S. Notice of Allowance dated Jul. 5, 2007 in U.S. Appl. No. 10/607,020, 6 pgs.
Korean Notice of Allowance Issued in Application 10-2011-7026740, dated Sep. 8, 2016, 2 Pages. (w/o English Translation).
European Notice of Allowance in Application 05107184.3, dated Aug. 31, 2016, 7 pgs.
Taiwan Notice of Allowance in Appln No. 101133155, dated Sep. 4, 2015, 4 pgs.
U.S. Appl. No. 11/332,822, Notice of Allowance dated Nov. 8, 2016, 3 pgs.
U.S. Appl. No. 11/332,822, Notice of Allowance dated Dec. 12, 2016, 2 pgs.
U.S. Appl. No. 14/150,531, Notice of Allowance dated Nov. 29, 2016, 5 pgs.
U.S. Appl. No. 14/226,421, Notice of Allowance dated Nov. 30, 2016, 8 pgs.
U.S. Appl. No. 13/925,523, Notice of Allowance dated Dec. 6, 2016, 5 pgs.
Yaser, "Microsoft Office Word 2003", Retrieved from: <<http://www.just.edu.jo/~yaser/courses/cs98/slides/Microsoft%20Office%20Word%202003.ppt>>, 2003, 49 Pages.
Word 2003 Introduction, Retrieved from: <<http://www.photoshoplondon.com/www/training-manuals/Word2003Intro.pdf>>, The Mouse Training Company, Sep. 9, 1999, 166 Pages.
Canadian Office Action Issued in Patent Application No. 2724681, dated Apr. 15, 2016, 5 Pages.
Canadian Office Action Issued in Patent Application No. 2848700, dated May 2, 2016, 4 Pages.
Malaysian Substantive Examination Adverse Report in Application PI 2011004990, dated Mar. 15, 2016, 3 pgs.
U.S. Appl. No. 14/226,421, Office Action dated May 6, 2016, 18 pgs.
U.S. Appl. No. 14/150,531, Office Action dated May 20, 2016, 22 pgs.
U.S. Appl. No. 13/427,939, Office Action dated May 25, 2016, 18 pgs.
U.S. Appl. No. 11/332,822, Notice of Allowance dated Jul. 6, 2016, 9 pgs.
U.S. Appl. No. 14/032,094, Notice of Allowance dated Jun. 24, 2016, 8 pgs.
European Office Action in Application 05107186.8, dated Jul. 27, 2016, 6 pgs.
European Office Action in Application 05107153.8, dated Jul. 22, 2016, 6 pgs.
Canadian Notice of Allowance in Application 2750422, dated Mar. 10, 2016, 1 page.
Chilean Notice of Allowance in Application 201101987, dated Mar. 30, 2016, 2 pgs; (w/o English translation).
Korean Office Action in Patent Application No. 10-2011-7018813, dated Jul. 29, 2016, 3 pgs; w/o English translation).
U.S. Appl. No. 14/142,132, Notice of Allowance dated Aug. 3, 2016, 17 pgs.
U.S. Appl. No. 11/332,822, Amendment and Response filed Aug. 11, 2016, 7 pgs.
U.S. Appl. No. 14/226,421, Amendment and Response filed Aug. 5, 2016, 8 pgs.
U.S. Appl. No. 13/925,523, Office Action dated Aug. 2, 2016, 7 pgs.
U.S. Appl. No. 13/615,668, Amendment and Response filed Jun. 2, 2016, 12 pgs.
U.S. Appl. No. 14/032,094, Notice of Allowance dated Aug. 9, 2016, 2 pgs.
U.S. Appl. No. 13/427,939, Amendment and Response filed Aug. 3, 2016, 14 pgs.
U.S. Appl. No. 12/028,797, Notice of Allowance dated Feb. 27, 2015, 14 pgs.
EP Communication dated Mar. 23, 2016 in Appln No. 06 790 087.8, 6 pgs.
European Extended Search Report in Application No. 10775348.5, dated Jun. 2, 2014, 6 Pages.
Israeli Office Action Issued in Patent Application No. 221792, dated Feb. 16, 2016, 4 pgs.
Korean Notice of Final Rejection in Application 10-2010-7028097, dated Apr. 28, 2016, 4 pgs. (No English translation).
Korean Notice of Final Rejection in Application 10-2010-7028989, dated Apr. 28, 2016, 4 pgs. (No English translation).
Korean Office Action in Application 10-2011-7026740, dated Mar. 11, 2016, 4 Pages.

(56) References Cited

OTHER PUBLICATIONS

Malaysian Adverse Report in Application PI 2011003348, dated Mar. 15, 2016, 3 pgs.
Norway Office Action dated in Appln No. 20053655, dated Mar. 2, 2016, 3 pgs.
Notice of Allowance dated Mar. 15, 2016 in U.S. Appl. No. 14/032,094, 30 pgs.
U.S. Appl. No. 12/142,927, Office Action dated Apr. 7, 2016, 21 pgs.
U.S. Appl. No. 14/032,094, Notice of Allowance dated Apr. 18, 2016, 2 pgs.
U.S. Appl. No. 13/769,598, Notice of Allowance dated Apr. 7, 2016, 4 pgs.
U.S. Appl. No. 12/142,927, Notice of Allowance dated Jan. 9, 2017, 10 pgs.
U.S. Appl. No. 13/615,668, Notice of Allowance dated Jan. 9, 2017, 10 pgs.
U.S. Appl. No. 14/032,094, Notice of Allowance dated Jan. 6, 2017, 9 pgs.
U.S. Appl. No. 12/142,927, Notice of Allowance dated Jan. 30, 2017, 7 pgs.
U.S. Appl. No. 13/427,939, Notice of Allowance dated Jan. 17, 2017, 9 pgs.
U.S. Appl. No. 12/142,927, Notice of Allowance dated Mar. 3, 2017, 2 pgs.
U.S. Appl. No. 10/607,020, Notice of Allowance dated Feb. 28, 2017, 20 pgs.
U.S. Appl. No. 13/615,668, Notice of Allowance dated Feb. 21, 2017, 2 pgs.
U.S. Appl. No. 14/032,094, Notice of Allowance dated Mar. 16, 2017, 2 pgs.
U.S. Appl. No. 13/427,939, Notice of Allowance dated Feb. 9, 2017, 2 pgs.
U.S. Appl. No. 13/427,939, Notice of Allowance dated Feb. 22, 2017, 3 pgs.
U.S. Appl. No. 14/226,421, Notice of Allowance dated Mar. 13, 2017, 8 pgs.
U.S. Appl. No. 14/150,531, Notice of Allowance dated Feb. 17, 2017, 5 pgs.
Canadian Office Action in Application 2848700, dated Jan. 26, 2017, 4 pgs.
Korean Notice of Allowance in Application 10-2016-7034274, dated Jan. 31, 2017, 2 pgs. (No English translation).
Brazilian Office Action Issued in Patent Application No. PI0505014-6, dated Jan. 5, 2017, 6 Pages. (with English translation).
European Office Action in Application 06814334.6, dated Jan. 31, 2017, 5 pgs.
European Summons to Attend Oral Hearing in Application 05105584.6, mailed Jul. 22, 2016, 6 pgs.
Indian Office Action in Application 01489/DELNP/2008, dated Aug. 31, 2015, 3 pgs.
European Decision to Refuse and Minutes in Oral Proceeding in Application 05105584.6, dated Mar. 28, 2017, 20 pgs.
U.S. Appl. No. 13/615,668, Notice of Allowance dated Apr. 13, 2017, 2 pgs.
U.S. Appl. No. 14/032,094, Notice of Allowance dated Apr. 13, 2017, 2 pgs.
U.S. Appl. No. 13/427,939, Notice of Allowance dated Apr. 7, 2017, 2 pgs.
Indian Office Action in Application 08037/CHENP/2010, dated Mar. 29, 2017, 7 pgs.
U.S. Appl. No. 14/150,531, Notice of Allowance dated Apr. 19, 2017, 2 pgs.
U.S. Appl. No. 12/142,927, Notice of Allowance dated May 3, 2017, 2 pgs.
U.S. Appl. No. 14/032,094, USPTO Responses after Amendment after Allowance dated Apr. 14, 2017, 2 pgs.
U.S. Appl. No. 14/635,605, Ex Parte Quayle Action mailed May 4, 2017, 8 pgs.
Brazilian Office Action Issued in Patent Application No. PI0506116-4, dated Apr. 20, 2017, 5 Pages. (with English Summary).
U.S. Appl. No. 13/615,668, USPTO Response to Amendment after Allowance dated May 16, 2017, 2 pgs.
European Office Action Issued in Patent Application No. 06803424.8, dated Aug. 17, 2017, 12 Pages.
Woody Leonhard, et al., "Saving Time with Google", In Book-Windows XP Timesaving Techniques for Dummies, Wiley Publishing Inc., Jan. 13, 2005, pp. 229-238.
U.S. Appl. No. 14/226,421, Office Action dated Nov. 2, 2017, 8 pgs.
U.S. Appl. No. 14/665,112, USPTO Response after 312 Amendment dated Oct. 4, 2017, 2 pgs.
U.S. Appl. No. 14/981,404, Office Action dated Nov. 1, 2017, 16 pgs.
European Decision to Refuse in Application 09767220.8, dated Sep. 18, 2017, 4 pages.
U.S. Appl. No. 12/163,758, Notice of Allowance dated Apr. 4, 2013, 7 Pages.
Chinese Notice of Allowance Issued in Chinese Patent Application No. 200980124945.1, dated Jun. 26, 2013, 4 Pages.
Russian Notice of Allowance Issued in Russian Patent Application No. 2010153223, dated May 23, 2013, 20 Pages.
Japanese Notice of Allowance Issued in Japanese Patent Application No. 2011-516400, dated Apr. 2, 2013, 6 Pages.
Canadian Notice of Allowance Issued in Canadian Patent Application No. 2725298, dated Oct. 27, 2015, 1 Page.
Canadian Office Action Issued in Canadian Patent Application No. 2725298, dated Jun. 30, 2014, 1 Page.
Taiwan Notice of Allowance Issued in Taiwan Patent Application No. 98119245, dated Oct. 15, 2014, 4 Pages.
Canadian Office Action Issued in Canadian Patent Application No. 2848700, dated Sep. 29, 2017, 4 Pages.
Brazilian Office Action Issued in Brazil Patent Application No. PI0506081-8, dated Sep. 19, 2017, 5 Pages.
U.S. Appl. No. 14/816,844, Office Action dated Dec. 5, 2017, 27 pages.
Jensen Harris, "Picture This: A New Look for Office", Mar. 9, 2006; blogs.msdn.microsoft.com; pp. 1-91.
Scott Lowe, "An introduction to the Microsoft Office 2007 ribbon interface", Dec. 11, 2006; TechRepublic; pp. 1-11.
U.S. Appl. No. 14/841,698, Office Action dated Dec. 4, 2017, 29 pages.
"Neo Pro—the total "find that email" solution!", Retrieved from «http://www.caelo.com/products/learn/», Retrieved Date: Sep. 15, 2005, 1 Page.
VisNetic Mail Flow, Retrieved from: «https://web.archive.org/web/20050924035746/http://www.deerfield.com/products/visnelic-mailflow/», Retrieved Date: Sep. 15, 2005, 1 Page.
PCT International Search Report and Written Opinion Issued in PCT Application No. PCT/US2009/044059, dated Nov. 30, 2009, 11 Pages.
PCT International Search Report & Written Opinion Issued in PCT Application No. PCT/US2009/044292, dated Dec. 24, 2009, 14 Pages.
Israel Office Action Issued in Israel Patent Application No. 209011, dated Dec. 25, 2013, 5 Pages.
European Supplementary Search Report Issued in European Patent Application No. 09770706.1, dated Nov. 14, 2017, 8 Pages.
European Summons to Attend Oral Proceedings in Application 09798374.6, mailed Jun. 1, 2017, 11 pgs.
U.S. Appl. No. 14/150,531, Notice of Allowance dated May 26, 2017, 2 pgs.
U.S. Appl. No. 13/615,668, Notice of Allowance dated May 26, 2017, 2 pgs.
U.S. Appl. No. 14/032,094, Notice of Allowance dated May 25, 2017, 2 pgs.
U.S. Appl. No. 14/150,531, Notice of Allowance dated Jul. 7, 2017, 2 pgs.
U.S. Appl. No. 14/226,421, Notice of Allowance dated Jul. 6, 2017, 8 pgs.
Brazilian Office Action in Application PI0506081-8, dated Jun. 21, 2017, 7 pages.

(56) References Cited

OTHER PUBLICATIONS

Notice of Allowance Issued in U.S. Appl. No. 11/430,562, dated Sep. 5, 2013, 25 Pages.
U.S. Appl. No. 14/635,605, Response to Ex Parte Quayle Action filed Aug. 4, 2017, 3 pgs.
U.S. Appl. No. 14/635,605, Notice of Allowance dated Aug. 25, 2017, 9 pgs.
Notice of Allowance Issued in Malaysian Patent Application No. PI20053259, dated Oct. 15, 2012, 2 Pages.
Chinese Notice of Allowance Issued in Chinese Patent Application No. 200680033212.3, dated May 26, 2011, 4 Pages.
European Office Action Issued in European Patent Application No. 06803424.8, dated Mar. 20, 2017, 2 Pages.
Notice of Allowance Issued in Japanese Patent Application No. 2008-531249, dated Aug. 24, 2012, 6 Pages.
U.S. Appl. No. 14/635,605, Notice of Allowance dated Sep. 12, 2017, 2 pgs.
U.S. Appl. No. 14/665,112, Notice of Allowance dated Sep. 8, 2017, 16 pgs.
Thailand Office Action in Application 0501003163, dated Aug. 22, 2017, 3 pgs.
Thailand Office Action in Application 0501003164, dated Aug. 22, 2017, 3 pgs.
European Summons to Attend Oral Proceedings in Application 05107157.9, mailed Sep. 15, 2017, 7 pgs.
Notice of Allowance in U.S. Appl. No. 10/955,942, dated Oct. 14, 2011, 7 pgs.
Notice of Allowance in U.S. Appl. No. 10/955,942, dated Jun. 23, 2011, 17 pgs.
Notice of Allowance in U.S. Appl. No. 10/955,942, dated Mar. 15, 2011, 8 pgs.
Notice of Allowance in U.S. Appl. No. 10/955,942, dated Jan. 11, 2011, 10 pgs.
Notice of Allowance in U.S. Appl. No. 10/955,942, dated Dec. 3, 2010, 13 pgs.
Notice of Allowance in Australian Patent Application 2005203412, dated May 19, 2010, 3 pages.
Notice of Allowance Issued in Chinese Patent Application No. 200510092139.4, dated Oct. 16, 2009, 4 Pages.
Notice of Allowance Issued in Russian Patent Application No. 2005125836, dated Jun. 22, 2010, 21 Pages.
Notice of Allowance and Search Report Issued in Taiwan Patent Application No. 94123421, dated Mar. 29, 2012, 6 Pages.
"Final Official Action Issued in U.S. Appl. No. 12/414,317", dated Aug. 29, 2012, 30 Pages.
"Non-Final Office Action Issued in U.S. Appl. No. 12/414,317", dated Jan. 25, 2013, 29 Pages.
"Non-Final Official Action Issued in U.S. Appl. No. 12/414,317", dated Jan. 17, 2012, 24 Pages.
"Office Action Issued in U.S. Appl. No. 12/414,317", dated Mar. 22, 2011, 40 Pages.
"Office Action Issued in Canadian Patent Application No. 2,617,182.", dated Sep. 16, 2013, 2 Pages.
"Office Action Issued in Canadian Patent Application No. 2,617,182", dated Sep. 30, 2014, 3 Pages.
"Office Action Issued in Canada Patent Application No. 2512036", dated Sep. 4, 2014, 3 Pages.
"Office Action Issued in Israeli Patent Application No. 170668", dated Dec. 25, 2014, 2 Pages.
"Second Office Action Issued in Canadian Patent Application No. 2,482,182", dated Feb. 20, 2015, 8 Pages.
"Office Action Issued in Canadian Patent Application No. 2,482,182", dated Jun. 27, 2014, 4 pages.
"Non-Final Official Action Issued in U.S. Appl. No. 12/814,084", dated Jan. 19, 2012, 35 Pages.
"Office Action Issued in U.S. Appl. No. 12/954,952", dated Sep. 10, 2014, 52 Pages.
"Office Action Issued in Philippines Patent Application No. 1-2005-000405", dated Aug. 19, 2008, 1 Page.
"Office Action Issued in Philippines Patent Application No. 12005000495.", dated Apr. 23, 2009, 2 Pages.
Venolia, et al. "Supporting Email Workflow", In Microsoft Research Technical Report MSR-TR-2001-88, Sep. 1, 2001, 11 Pages.
"Office Action Issued In U.S. Appl. No. 13/102,633", dated Jun. 3, 2013, 29 Pages.
"International Search Report & Written Opinion Issued in PCT Patent Application No. PCT/US2006/12724.", dated Oct. 17, 2007, 11 Pages.
"Office Action Issued in Canadian Patent Application No. 2,482,182", dated Nov. 26, 2013, 6 pages.
"Office Action Issued in Canadian Patent Application No. 2,482,182", dated Feb. 26, 2016, 8 Pages.
"Office Action Issued in Israel Patent Application No. 194785", dated Jul. 29, 2015, 2 Pages.
"Office Action Issued in Israel Patent Application No. 194785", dated Feb. 28, 2012, 4 Pages.
"Non-Final Office Action Issued in U.S. Appl. No. 13/464,572", dated Aug. 25, 2014, 16 Pages.
"Final Office Action Issued in U.S. Appl. No. 13/769,598", dated Jun. 2, 2014, 12 Pages.
"Non-Final Office Action Issued in U.S. Appl. No. 13/769,598", dated Nov. 29, 2013, 11 Pages.
"Office Action Issued in India Patent Application No. 1921/DEL/2004", dated Sep. 12, 2014, 2 Pages.
"Final Office Action Issued In U.S. Appl. No. 14/226,421", dated Apr. 27, 2018, 7 Pages.
"Final Office Action Issued in U.S. Appl. No. 14/816,844.", dated Apr. 18, 2018, 22 Pages.
"Final Office Action Issued in U.S. Appl. No. 14/841,698", dated Apr. 18, 2018, 27 Pages.
"Office Action Issued in Chilean Patent Application No. 1559-2010", dated Apr. 18, 2012, 7 Pages.
"Office Action Issued In Chile Patent Application No. 1560-2010", dated Dec. 24, 2010, 5 Pages.
"Office Action Issued in Chilean Patent Application No. 1560-2010", dated Apr. 18, 2012, 7 Pages.
"Office Action Issued in Chilean Patent Application No. 1770-2005", dated Mar. 28, 2008, 7 Pages.
"Office Action Issued in Brazilian Patent Application No. PI0503986-0", dated Apr. 27, 2018, 7 Pages.
"Office Action Issued In Russian Patent Application No. 2010140069", dated Dec. 7, 2012, 8 Pages.
"Office Action Issued In Russian Patent Application No. 2010140069", dated Aug. 12, 2013, 5 Pages.
Hepfner, Troy "New SOCET GXP Interface Improves Usability", Available at: http://www.geospatialexploitationproducts.com/mosaic/200809_gxp-mosaic.php, Sep. 2008, 5 pages.
"Canadian Office Action Issued in Patent Application No. 2848667", dated Feb. 19, 2015, 5 Pages.
"Office Action Issued In Russian Patent Application No. 2010151922", dated May 13, 2013, 7 Pages.
Halvorson, Michael, et al. "Microsoft Office XP Professional Official Manual", Jul. 23, 2001, 13 Pages.
"Office Action Issued In Mexican Patent Application No. PA/a/2005/008354", dated Apr. 24, 2012, 20 Pages.
"Supplementary European Search Report Issued in European Patent Application No. EP06790087", dated Dec. 2, 2008, 7 Pages.
"Office Action Issued in Brazilian Patent Application No. PI0404376-6", dated Mar. 6, 2017, 6 pages.
"Office Action Issued In Chile Patent Application No. 201101987", dated Jun. 3, 2014, 12 Pages.
"Office Action Issued In Patent Application No. 201101987", dated Jul. 29, 2013, 12 Pages.
"Office Action Issued in Brazilian Patent Application No. PI0404376-6", dated Jul. 15, 2016, 4 Pages.
Agha, Gul A.., et al. "Modular heterogeneous system development: a critical analysis of Java", In Proceedings of the Seventh Heterogeneous Computing Workshop 1998 (HCW 98), Mar. 30,1998, 12 Pages.
"Office Action Issued in Taiwan Patent Application No. 98119245", dated May 20, 2014, 11 Pages.

(56) References Cited

OTHER PUBLICATIONS

"Office Action and Search Report Issued in Taiwan Patent Application No. 98118252", dated Mar. 24, 2014, 12 Pages.
"Office Action Issued In Indian Patent Application No. 8936/DELNP/2010", dated May 16, 2018, 7 Pages.
"Office Action Issued in Russian Patent Application No. 2512-2005", dated May 20, 2009, 4 Pages.
"Office Action issued in Israeli Patent Application No. 252770.", dated May 8, 2018, 2 Pages.
"Examination Report Issued in New Zealand Patent Application No. 541301", dated Nov. 8, 2006, 1 Page.
"Office Action Issued in Canadian Patent Application No. 2724201", dated Aug. 3, 2015, 5 Pages.
"Canadian Office Action Issued in Patent Application No. 2848700", dated Feb. 19, 2015, 4 Pages.
"Office Action Issued in Canadian Patent Application No. 2,848,700.", dated May 2, 2016, 4 Pages.
"Office Action Issued in Japanese Patent Application No. 2004-188926", dated May 21, 2010, 3 Pages.
"Office Action Issued In Chinese Patent Application No. 200980124644.9", dated Dec. 17, 2012, 10 Pages.
"Third Office Action Issued in Chinese Patent Application No. 200980112454.5", dated Jul. 18, 2013, 7 Pages.
"Office Action Issued in Chile Patent Application No. 200501769", dated Jul. 15, 2005, 11 Pages.
"Fourth Office Action Issued in Chinese Patent Application No. 200980112454.5", dated Dec. 4, 2013, 10 Pages.
"Office Action Issued In Patent Application No. 200501770", dated May 27, 2008, 2 Pages.
"Final Office Action Issued in Chinese Patent Application No. 200980112454.5", dated Jun. 5, 2012, 8 Pages.
"Office Action Issued in Russian Patent Application No. 2005120363", dated Oct. 21, 2009, 12 Pages.
"Office Action Issued in Russian Patent Application No. 2005120363", dated Jun. 24, 2009, 8 Pages.
Office Action Issued in Brazil Patent Application No. PI06152376, dated Apr. 2, 2018, 14 Pages.
"Office Action Issued in Russian Patent Application No. 200512036328", dated Jul. 24, 2009, 8 Pages.
"Office Action Issued in Australian Patent Application No. 2009232301", dated Nov. 22, 2013, 3 Pages.
Piperoglou, Stephanos "The DIV and SPAN Elements", Retrieved from https://web.archive.org/web/20150922205526/http://www.webreference.com/html/tutorial5/9.html, Aug. 20, 1998, 3 Pages.
"Office Action Issued in Chinese Patent Application No. 200910148820.4", dated Oct. 30, 2014, 14 Pages.
"Office Action Issued in Norweign Patent Application No. 20053658", dated Dec. 16, 2014, 4 Pages.
"Office Action Issued in Russian Patent Application No. 2005125836", dated Oct. 9, 2009, 10 Pages.
"Notice of Rejection Issued in Japanese Patent Application No. 2008529218", dated Dec. 16, 2011, 3 Pages.
"Office Action Issued In Brazilian Patent Application No. PI0615782-3", dated Dec. 20, 2017, 5 Pages.
"Office Action Issued In Norway Patent Application No. 20084584", dated Dec. 19, 2017, 4 Pages.
"Office Action Issued in Norway Patent Application No. 20054097.", dated May 11, 2015, 6 Pages.
"Office Action Issued in Australian Patent Application No. 200800522-5", dated Apr. 15, 2009, 4 Pages.
"Second Office Action Issued in Chinese Patent Application No. 200680030421.2", dated Oct. 18, 2010, 11 Pages.
"Office Action Issued in Chinese Patent Application No. 200680030421.2", dated Apr. 3, 2009, 7 Pages.
"Office Action Issued in Norweign Patent Application No. 20053655", dated Dec. 16, 2014, 3 Pages.
"Office Action Issued in Norway Patent Application No. 20053655", dated Jul. 16, 2015, 2 Pages.
"Office Action Issued in Mexican Patent Application No. MX/a/2011/011749", dated Aug. 2, 2013, 6 Pages.
"Office Action Issued in Mexican Patent Application No. MX/a/2010/014056", dated Feb. 6, 2013, 2 Pages.
"Office Action Issued in Mexican Patent Application No. MX/a/2010/010506", dated Apr. 24, 2013, 3 Pages.
"Office Action Issued in Mexican Patent Application No. MX/a/2010/010506", dated Nov. 20, 2015, 7 Pages.
"Office Action Issued in Mexican Patent Application No. MX/a/2008/014849", dated Jan. 20, 2014, 6 Pages.
"Office Action Issued in Philippines Patent Application No. PH12005405", dated Aug. 19, 2008, 1 Page.
"Office Action Issued In Mexican Patent Application No. MX/a/2008/014849", dated May 3, 2017, 20 Pages.
"Office Action Issued in Mexican Patent Application No. PA/a/2005/008349", dated Dec. 3, 2009, 5 Pages.
"Office Action Issued In Mexican Patent Application No. MX/a/2008/014849", dated Jan. 25, 2012, 4 Pages.
"Office Action Issued In Mexican Patent Application No. MX/a/2008/014849", dated Sep. 12, 2012, 4 Pages.
"Office Action Issued in Mexican Patent Application No. MX/a/2008/014849", dated May 14, 2013, 5 Pages.
"Office Action Issued in Mexican Patent Application No. PA/a/2005/008350", dated Dec. 4, 2009, 4 Pages.
"Office Action Issued In Mexican Patent Application No. MX/a/2008/003342", dated Jan. 22, 2013, 4 Pages.
"Office Action Issued in Mexican Patent Application No. MX/a/2008/003342", dated May 7, 2012, 4 Pages.
"Office Action Issued in Mexican Patent Application No. MX/a/2008/003342", dated May 31, 2013, 6 Pages.
"Office Action Issued in Mexican Patent Application No. MX/a/2008/003342", dated Jan. 28, 2014, 4 Pages.
"Office Action Issued in Mexican Patent Application No. MX/a/2008/003342", dated Jan. 10, 2013, 4 Pages.
"Office Action Issued in U.S Appl. No. 14/981,404", dated Jul. 30, 2018, 11 Pages.
"Office Action Issued In Mexican Patent Application No. MX/a/2008/002889", dated Sep. 20, 2012, 11 Pages.
"Office Action Issued in Mexican Patent Application No. PA/a/2005/008350", dated Jun. 11, 2013, 24 Pages.
"Office Action Issued in Mexican Patent Application No. PA/a/2005/008351", dated Dec. 1, 2009, 4 Pages.
"Office Action Issued in Mexican Patent Application No. PA/a/2005/008351", dated Mar. 26, 2013, 27 Pages.
"Office Action Issued in Philippines Patent Application No. PH12005405", dated Apr. 21, 2008, 1 Page.
"Office Action Issued in European Patent Application No. 09767220.8", dated Apr. 11, 2017, 9 Pages.
"Search Report Issued in European Patent Application No. 09770705.3", dated Dec. 14, 2017, 8 Pages.
"Office Action Issued in European Patent Application No. 09798374.6", dated Jan. 19, 2018, 2 Pages.
"Office Action and Search Report Issued in Taiwan Patent Application No. 098117357", dated May 15, 2014, 13 Pages.
"Office Action and Search Report Issued in Taiwan Patent Application No. 098119245", dated May 20, 2014, 11 Pages.
"Final Office Action Issued in U.S. Appl. No. 12/414,317", dated Aug. 6, 2013, 26 Pages.
"Final Office Action Issued in U.S. Appl. No. 10/780,547", dated May 14, 2008, 16 Pages.
"Office Action Issued in U.S. Appl. No. 10/780,547", dated Feb. 20, 2009, 20 Pages.
"Office Action Issued in U.S. Appl. No. 10/780,547", dated Sep. 15, 2009, 20 Pages.
"Office Action Issued in U.S. Appl. No. 10/780,547", dated Mar. 3, 2010, 20 Pages.
"Office Action Issued in Indonesian Patent Application No. W00200800746", dated Sep. 7, 2009, 2 Pages.
Whitechapel, Andrew "Microsoft Visual Studio 2005 Tools for the 2007 Microsoft Office System Beta Tutorial", Retrieved from: http://download.microsoft.com/download/3/2/d/32db7049-bc04-4c79-a91b-7f62eaae754a/VSTO2005SE_Tutorial.doc, Sep. 2006, 19 Pages.
"Non-Final Office Action Issued in U.S. Appl. No. 10/836,154", dated Jul. 24, 2008, 17 Pages.

(56) References Cited

OTHER PUBLICATIONS

"Non-Final Office Action Issued in U.S. Appl. No. 12/142,927", dated Jan. 6, 2011, 10 Pages.
"Non Final Office Action Issued in U.S. Appl. No. 12/142,927", dated Apr. 7, 2016, 21 Pages.
"Office Action Issued in U.S. Appl. No. 12/059,644", dated Sep. 29, 2014, 37 Pages.
"Office Action Issued in Indian Patent Application No. 1017/DEL2004", dated Oct. 21, 2013, 2 Pages.
"Non Final Office Action Issued in U.S. Appl. No. 12/059,644", dated Aug. 29, 2012, 19 Pages.
"Office Action Issued in U.S. Appl. No. 12/059,644", dated Jul. 22, 2015, 35 Pages.
"Office Action Issued in Korean Patent Application No. 10-2010-7024459", dated May 18, 2015, 4 Pages.
"Office Action Issued in Korean Patent Application No. 10-2010-7024459", dated Nov. 25, 2015, 10 Pages.
"Notice of Allowance Issued in Korean Patent Application No. 10-2010-7028097", dated Oct. 12, 2016, 3 Pages.
"Non Final Rejection Issued in U.S. Appl. No. 12/059,644", dated Feb. 16, 2016, 29 Pages.
"Office Action Issued in Korean Patent Application No. 10-2011-7026740", dated Mar. 11, 2016, 4 Pages.
"Non Final Office Action Issued in U.S. Appl. No. 12/059,644", dated Feb. 14, 2014, 21 Pages.
"Office Action Issued in Korean Patent Application No. 10-2016-7024123", dated Nov. 18, 2016, 6 Pages.
"Office Action Issued in Korean Patent Application No. 10-2016-7024123", dated May 31, 2017, 12 Pages.
"Office Action Issued in European Patent Application No. 10744106.5", dated Jan. 10, 2013, 8 Pages.
"Non Final Office Action Issued in U.S. Appl. No. 12/059,644", dated Jun. 7, 2011, 15 Pages.
"Office Action Issued in European Patent Application No. 10775348.5", dated Nov. 2, 2015, 7 Pages.
"Office Action Issued in European Patent Application No. 10775348.5", dated Mar. 3, 2015, 3 Pages.
"Office Action Issued in U.S. Appl. No. 11/154,278", dated Nov. 13, 2009, 32 Pages.
"Final Office Action Issued in U.S. Appl. No. 11/823,999", dated Jan. 5, 2011, 12 Pages.
"Final Office Action Issued in U.S. Appl. No. 12/059,644", dated Jan. 25, 2012, 16 Pages.
"Final Office Action Issued in U.S. Appl. No. 12/059,644", dated Jun. 21, 2013, 19 Pages.
"Adobe Photoshop 7.0 for Windows Student Edition Complete", Retrieved from https://www.salford.ac.uk/library/help/workbooks/photoshop7.pdf, 335 Pages.
"Google Desktop Search", Retrieved from http://web.archive.org/web/20100924031219/http://www.pandia.com/resources/desktop.html, Sep. 22, 2010, 6 Pages.
"Microsoft Office", Screendump—Microsoft Office Professional Edition 2003, Microsoft Corporation, 2003, 13 Pages.
"International Search Report and Written Opinion Issued in PCT Application No. PCT/US2006/035079", dated Feb. 26, 2007, 10 Pages.
"Office Action Issued in European Patent Application No. 09727331.2", dated Mar. 19, 2018, 4 Pages.
"Office Action Issued in European Patent Application No. 09727331.2", dated Jan. 5, 2016, 4 Pages.
"Office Action Issued in Philippines Patent Application No. PH/1/2005/404", dated Jan. 23, 2006, 1 Page.
"Search Report Issued in European Patent Application No. 090069725", dated Sep. 15, 2009, 5 Pages.
"International Search Report & Written Opinion Issued in PCT Application No. PCT/US2011/037458", dated Feb. 9, 2012, 3 Pages.
"Microsoft Office XP", Retrieved from http://en.wikipedia.org/wiki/Microsoft_Office_XP, May 31, 2001, 3 Pages.

"International Search Report & Written Opinion Issued in PCT Application No. PCT/US2009/34618", dated Aug. 7, 2009, 12 Pages.
"MSN Desktop Search (beta)", Retrieved From: http://www.pcmag.com/article2/0,1759,1771841,00.asp, Mar. 2, 2005, 2 Pages.
"Office 11 and Office Family Pre Release Program Installation Instructions", In Letter by Microsoft on Beta, 2002, 6 Pages.
"Search Report Issued in European Patent Application No. 06814358.5", dated Apr. 7, 2010, 4 Pages.
"Run for the Border: Using Borders in Word", Retrieved on: Feb. 7, 2014, Retrieved from https://web.archive.org/web/20040324224844/http://word.mvps.org/FAQs/TbIsFldsFms/Borders.htm, 5 Pages.
"Screen Dumps—Microsoft Office", Microsoft Corporation, Microsoft Office Professional Edition 2003, 2003, 16 Pages.
"Screen Dumps of Microsoft Windows 5.1", Microsoft Corporation, 2001, 13 Pages.
"Screen Shot of MS Office 2003", Microsoft Office Professional Edition 2003, 2003, 6 Pages.
"Screendumps—Microsoft Ofiice Outlook", Microsoft Corporation, Microsoft Office Outlook Professional Edition 2003, 2 Pages.
"Software License Use Management (XSLM)", Retrieved From: http://pubs.opengroup.org/onlinepubs/9691999399/toc.pdf, Mar. 1999, 286 Pages.
"Office Action Issued in European Patent Application No. 06790087.8", dated Jul. 22, 2016, 5 Pages.
"The New Office 2007 User Interface", Microsoft Corporation, 2005, 32 Pages.
"Office Action Issued in Philippines Patent Application No. PH/1/2005/406", dated Sep. 12, 2008, 21 Pages.
"Office Action Issued in European Patent Application No. 06814334.6", dated Sep. 26, 2012, 10 Pages.
"Office Action Issued in Thailand Patent Application No. 0401003526", dated Aug. 31, 2016, 2 Pages.
"Search Report Issued in European Patent Application No. 04021618.6", dated May 24, 2005, 5 Pages.
"Office Action Issued in European Patent Application No. 06814358.5", dated Sep. 18, 2017, 6 Pages.
"Office Action issued in European Patent Application No. 04102463.9", dated May 31, 2006, 15 Pages.
"Office Action Issued In Thailand Patent Application No. 0501002670.", dated Jun. 13, 2018, 2 Pages.
"Office Action Issued in European Patent Application No. 051071518", dated Jul. 3, 2017, 6 pages.
"Search Report Issued in European Patent Application No. 05107184.3", dated Mar. 7, 2012, 8 Pages.
"Search Report Issued in European Patent Application No. 05107186.8", dated Mar. 26, 2012, 8 Pages.
"First Office Action Issued in Indian Patent Application No. 05584/CHENP/2010", dated Mar. 23, 2018, 7 Pages.
"Office Action Issued In Indian Patent Application No. 06296/CHENP/2008", dated Jul. 13, 2016, 9 Pages.
"Office Action Issued in European Patent Application No. 06740575.3", dated Apr. 18, 2013, 12 Pages.
"Office Action Issued in European Patent Application No. 06790087.8", dated Mar. 23, 2016, 6 Pages.
"First Examination Report Issued in Indian Patent Application No. 8262/CHENP/2010", dated Jul. 19, 2018, 7 pages.
Inoue, Risako "Let's Learn Power Point Using Actual Samples", in Nikkei PC21, Japan, Nikkei Business Publications, Inc., Apr. 1, 2008, vol. 13, Issue 07, 5 Pages.
"Final Office Action Issued in U.S. Appl. No. 14/816,844", dated Jan. 18, 2019, 20 Pages.
"Maintain Merriam Webster's Collegiate Dictionary", In the book of Merriam Webster's Collegiate Dictionary, 1997, 10th Edition, pp. 702.
"Office Action Issued in Thailand Patent Application No. 0501003163", dated Oct. 8, 2018, 4 Pages.
"Office Action Issued in Thailand Patent Application No. 0501003164", dated Oct. 11, 2018, 3 Pages.
"Office Action Issued in European Patent Application No. 09770706.1", dated Feb. 27, 2019, 5 Pages.
"Notice of Allowance Issued in Korean Patent Application No. 10-2004-0048176", dated Jul. 12, 2013, 3 Pages.

(56) References Cited

OTHER PUBLICATIONS

"Non Final Office Action Issued in U.S. Appl. No. 14/816,844", dated Apr. 22, 2019, 19 Pages.
"Non Final Office Action Issued in U.S. Appl. No. 14/816,844", dated Nov. 5, 2018, 19 Pages.
"Notice of Allowance Issued in U.S. Appl. No. 14/981,404", dated Sep. 26, 2018, 10 Pages.
"Non Final Office Action Issued in U.S. Appl. No. 15/359,575", dated Oct. 2, 2018, 12 Pages.
"Non Final Office Action Issued in U.S. Appl. No. 15/476,220", dated Mar. 21, 2019, 7 Pages.
"Non Final Office Action Issued in U.S. Appl. No. 15/670,765", dated Oct. 17, 2018, 11 Pages.
"First Examination Report issued in Indian Patent Application No. 5323/CHENP/2011", dated Mar. 8, 2019, 7 Pages.
"First Examination Report issued in Indian Patent Application No. 8285/CHENP/2011", dated Mar. 15, 2019, 7 Pages.
Shoup, Richard, "Menu-Driven User Interfaces for Videographics", In Proceedings of 17th Annual SMPTE Television Conference, Feb. 4, 1983, 3 Pages.
"Getting Results with Microsoft Office 97", Published by Microsoft, 1997, 8 Pages.
"Non Final Office Action Issued in U.S. Appl. No. 15/605,004", dated May 2, 2019, 17 Pages.
"Office Action Issued in Brazilian Patent Application No. PI0914960-0", dated May 27, 2019, 5 Pages.
"Office Action Issued in Brazilian Patent Application No. PI0913024-1", dated Jul. 7, 2019, 5 Pages. No translation.
"Office Action Issued in Brazilian Patent Application No. PI0914946-5", dated Jun. 13, 2019, 5 Pages. No translation.
"Non Final Office Action Issued in U.S. Appl. No. 15/796,216", dated Jun. 11, 2019, 25 Pages.
"Non Final Office Action Issued in U.S. Appl. No. 15/631,842", dated May 30, 2019, 14 Pages.
"Non Final Office Action Issued in U.S. Appl. No. 15/483,901", dated Jul. 10, 2019, 14 Pages.

* cited by examiner

| | | |
|---|---|---|
| FOLDER NAME | | |
| ARRANGED BY: FOLDER | NEWEST ON TOP ▽ | |
| FOLDER: APPLICATION TEAM | | |
| BOB | TODAY 3:49 PM | |
| SARAH | TODAY 1:15 PM | |
| FOLDER: PICNIC MAIL | | |
| JOE | TODAY 1:30 PM | |
| BOB | MON 12:20 PM | |
| FOLDER: TESTING TEAM | | |
| RALPH | TODAY 3:00 PM | |
| JIM | WED 10:15 AM | |

Fig. 7

AUTOMATIC GROUPING OF ELECTRONIC MAIL

RELATED APPLICATIONS

This application is a Continuation of U.S. application Ser. No. 12/753,923 entitled "Automatic Grouping of Electronic Mail" filed Apr. 5, 2010, which is a Continuation of copending U.S. application Ser. No. 10/848,774 entitled "Automatic Grouping of Electronic Mail" filed May 19, 2004, now U.S. Pat. No. 7,707,255, which claims benefit under 35 U.S.C. § 119(e) of U.S. Provisional Patent Application No. 60/484,437, entitled "Combined Outlook Bar and Folder List, Automatic Grouping, Adaptive Multi-Line View, Threaded View with Easier Access to All New Email, Search Folders" filed Jul. 1, 2003, which are incorporated herein by reference.

FIELD OF THE INVENTION

The present invention generally relates to electronic mail systems. More particularly, the present invention relates to automatic grouping of electronic mail in an electronic mail system.

BACKGROUND

With the advent of the computer age, computer software users have grown accustomed to user-friendly software applications that help them write, calculate, organize, prepare presentations, send and receive electronic mail, make music, and the like. For example, modem electronic mail programs allow users to send and receive electronic mail to and from other users. Modem electronic mail programs also allow users to store sent or received mail in a variety of user-established storage folders.

Prior electronic mail systems typically provide a user interface through which a user may see and select received mail, sent mail, or stored mail. Such user interfaces may be used to display a listing of all electronic mail received, sent or stored in one or more user-established mail storage folders. A user may sort listed mail items using a number of sorting properties. For example, mail may be sorted by date received or date sent. Mail may be sorted by the name of the party from which mail is received or by the name of the party to which mail is sent. Mail may be sorted according to other sorting properties such as size of individual mail items or subject matter of mail items.

Electronic mail users often have large numbers of mail items in their received mail, sent mail and/or various mail folders. In order to find a particular mail item in any of the these mail categories, the user may scroll up or down through all mail items in a given category (e.g., received, sent, selected folder), or the user may first sort the mail, as described above, and then scroll up or down as desired. For example, if a user is looking for a particular mail item from her colleague, Bob, she may first sort her received mail based on a "received from" sorting property, followed by scrolling through all mail received from Bob to find the particular mail item. Unfortunately, if she has received numerous mail items from Bob, her task of locating the desired mail item may be time consuming, inefficient and cumbersome.

There is a need for an improved electronic mail user interface and mail viewing model that allows electronic mail to be automatically sorted and grouped into mail categories or arrangements that allow a user to more easily and efficiently locate desired mail items. It is with respect to these and other considerations that the present invention has been made.

SUMMARY

Embodiments of the present invention solve the above and other problems by providing automatic sorting and grouping of electronic mail items in an electronic mail system. According to aspects of the invention, an automatic mail grouping property may be selected for electronic mail received, sent or stored in a variety of storage folders. For a given mail location (e.g., received mail, sent mail, or a given mail storage folder), a selected automatic grouping property causes mail to be displayed to the user in one or more categories that make location of specific mail items easier and more efficient. Visible dividers with optional headings may be provided between mail categories to quickly draw a user's attention to a given mail category and to separate large numbers of mail into logical groupings to make location of specific mail items more manageable.

According to one aspect of the invention, a user may automatically group mail items that are received, sent, or stored according to date. Mail selected for automatic grouping according to date may be divided into logical groupings such as mail received today, mail received yesterday, mail received earlier this week, mail received last week, and so on. Thus, if a user knows that a given mail item was received from her colleague yesterday, she may select automatic grouping by date and quickly go to mail items received yesterday to find the desired item.

According to another aspect of the invention, a user may automatically group mail items that are received, sent or stored according to the party from which the mail items were received or to which the mail items were sent. Mail is divided into logical groupings such as mail received from a first party, mail received from a second party, mail received from a third party, and the like. Likewise, mail grouped according to the party to which mail was sent may be divided into logical groupings such as mail sent to a first party, mail sent to a second party, mail sent to a third party, and the like. Easy to read headings may be provided above each grouping to allow the user to quickly locate a desired mail item according to the identity of the party from which the mail received was received or to which the mail was sent.

Other automatic grouping categories include groupings by folder identification, groupings by mail size, groupings by mail subject, groupings by mail type, groupings by flagged mail, groupings by mail with or without attachments, groupings by importance level, or groupings according to identified mail conversation strings. For example, mail grouped by importance level may be displayed in three groupings divided by headings such as "high importance", "normal importance", and "low importance."

According to another aspect of the invention, automatic grouping categories or arrangements may be customized by a user. For example, the user may customize an automatic grouping such that mail items are first grouped or categorized according to date of receipt, followed by sub-grouping based on importance level. Thus, according to this example customized grouping, mail items are first grouped and divided according to date received or sent, followed by a further grouping within each first grouping according to importance levels associated with mail items grouped in each first grouping.

According to another aspect of the invention, processing of selected automatic mail groupings and persistence of data representing resulting mail groupings may be performed and stored at an electronic mail system server. Alternatively, some automatic grouping processing, for example, processing of automatic grouping by date or size may be performed and associated data may be persisted on a client side electronic mail system, while other automatic grouping processing and associated data may be performed and persisted on a server side electronic mail system.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 7 illustrates a computer screen display showing an electronic mail user interface for displaying mail items grouped according to storage folders to which given electronic mail items are saved.

DETAILED DESCRIPTION

As briefly described above, embodiments of the present invention are directed to automatic grouping of electronic mail items in an electronic mail system. According to embodiments of the present invention, electronic mail items received, sent or stored in a variety of mail storage folders may be automatically sorted and grouped based on a number of sorting and grouping properties such as date, size, identity of party from which mail is received or to which mail is sent, folder identification, mail subject, mail type, mail flag type, presence or absence of mail attachments, or mail importance level. Customized automatic grouping arrangements may be created and applied to electronic mail items according to user specification.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
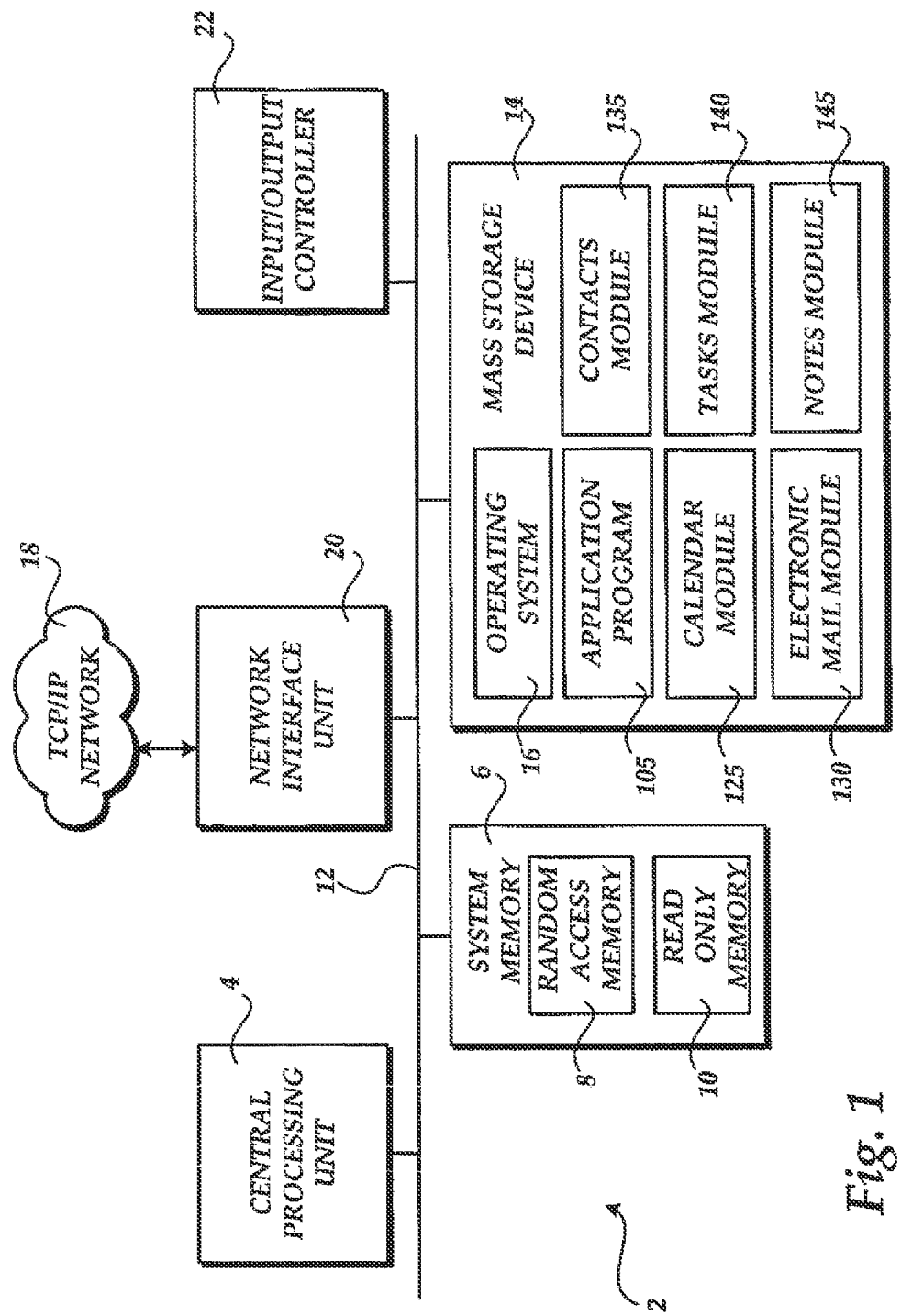
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, a desktop publishing, and the like. According to an embodiment of the present invention, the application program 105 comprises a multiple functionality software application for providing a user calendaring functionality, electronic mail functionality, contacts information functionality, electronic notes functionality, electronic journal functionality and the like. Some of the individual program modules comprising the multiple functionality program 105 include a calendar module 125, an electronic mail program 130, a contacts module 135, a tasks module 140, a notes module 145 and a journal module (not shown). An example of such a multiple functionality program 105 is OUTLOOK.®™. manufactured by Microsoft Corporation.

Figure 2:
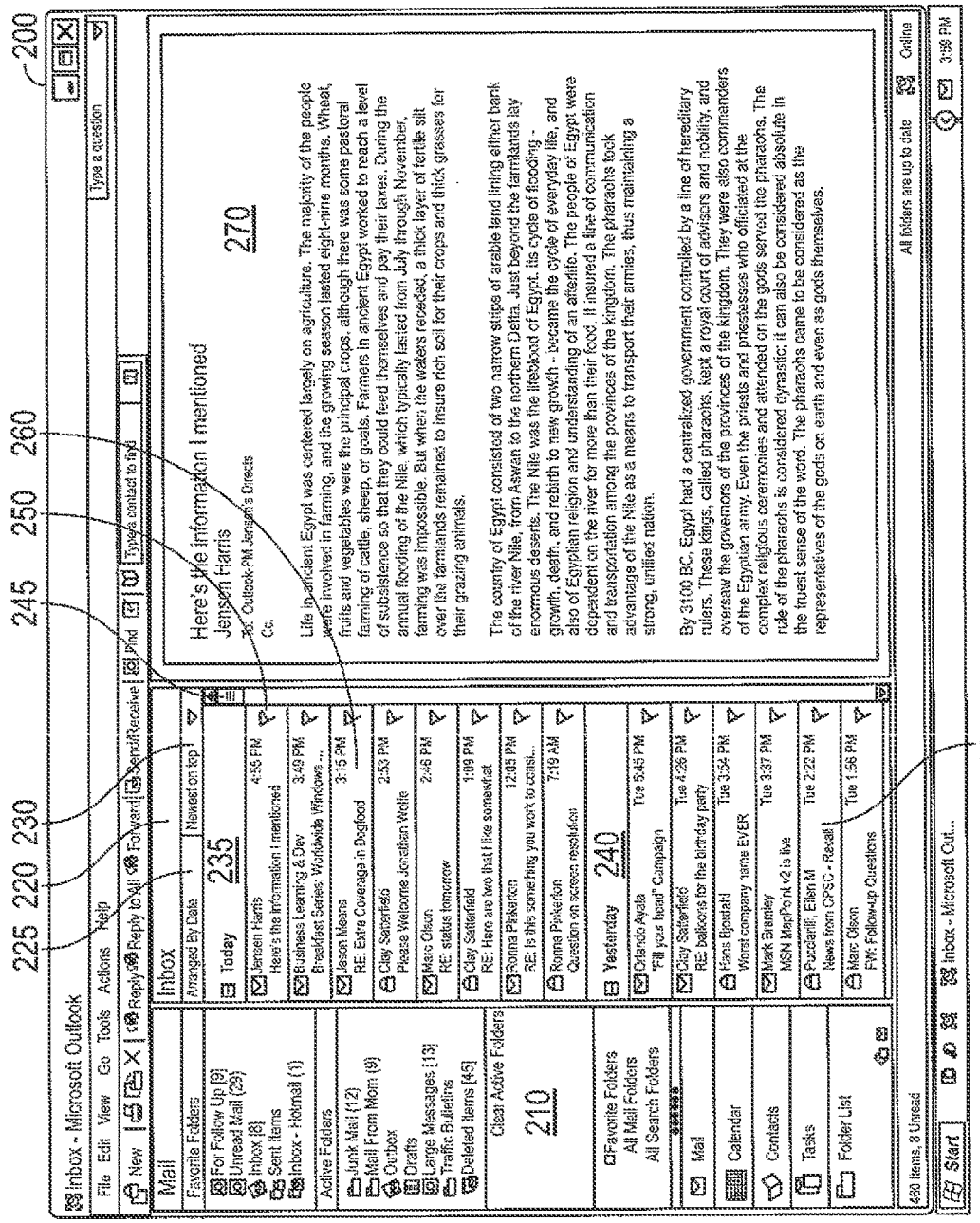
FIG. 2 illustrates a computer screen display of an electronic mail system user interface according to embodiments of the present invention.

FIG. 2 illustrates a computer screen display of an electronic mail system user interface according to embodiments of the present invention. The user interface 200 is illustrative of an electronic mail program 130 user interface for displaying electronic mail items received, sent or stored in a variety of storage folders. An example electronic mail program user interface illustrated in FIG. 2 is provided by OUTLOOK.®™. manufactured and marketed by Microsoft Corporation of Redmond, Wash.

The user interface 200 illustrated in FIG. 2 includes a combined content selection and display pane 210 through which a user may select other types of functionality provided by a multiple functionality software application (described above) through which the user's electronic mail program is provided. For example, through the combined contents selection and display pane 210, the user may select calendar functionality, contacts functionality, tasks functionality, notes functionality, and the like.

According to embodiments of the present invention, a user interface or pane 220 is provided with which the user may view a listing of electronic mail items that have been received by the user, that have been sent by the user, or which have been stored in one or more user-established storage folders. The user interface or pane 220 illustrated in FIG. 2 is illustrative of an electronic mail system inbox with which the user may display and review a listing of electronic mail items received by the user. As illustrated in FIG. 2, a number of electronic mail items such as the mail item 260 and mail item 265 are listed in the inbox pane 220. A scroll button 245 is illustrated for allowing the user to scroll up or down through mail items listed in the inbox pane 220. To the right of the inbox pane 220, a preview pane 270 is illustrated for displaying the contents of a selected mail item. As is appreciated by those skilled in the art, if the user has activated the preview pane functionality, the user may receive a preview of the contents of a selected mail item by focusing on the mail item in the inbox pane 220.

According to embodiments of the present invention, an "Arranged by" field 225 is provided along an upper edge of the inbox pane 220. When the user selects a given automatic grouping arrangement type, as described below, the selected arrangement type is identified in the "Arranged by" field. For example, referring to FIG. 2, an arrangement type of "date" has been selected by the user and is thus identified in the "Arranged by" field 225. Adjacent to the "Arranged by" field 225 is a field 230 for identifying an overall sorting property applied to mail items displayed in the pane 220. For example, if mail items displayed in the pane 220, regardless of automatic grouping arrangement type, are displayed in a newest mail item on top orientation, the text in the field 230 reads "Newest on top." Conversely, if mail items in the pane 220 are displayed according to a newest mail item at the bottom where oldest mail items are pushed to the top of the listing, the text in the field 230 may read "Newest on bottom", or "Oldest on top." Whether mail is sorted with newest items on top or oldest items on top may be selectively changed by the user by toggling the field 230 or the associated toggling switch located on the right side of the text contained in the field 230. As should be appreciated, the text utilized in the field 230 to describe the listing ordering is by way of example only and is not restrictive of the numerous text selections that may be used to describe the ordering of the text listed in the pane 220. For example, the text items contained in the pane 220 may similarly be ordered by such properties as "A on top, Z on bottom," "Unflagged on top," "Attachments on top" and the like.

As described below with reference to FIG. 4, the inbox pane 225 illustrated in FIG. 2 contains mail items received by the user automatically grouped according to date of receipt. The mail items are further grouped into logical sub-groupings to make review of the listed items for efficient and user-friendly. For example, all mail items received by the user today are listed under a visible heading 235 bearing the heading "Today." Similarly, mail items received by the user yesterday are listed under a visible heading 240 bearing the heading "Yesterday." As described below with reference to FIG. 4, additional grouping categories for grouping mail items according to date of receipt may be utilized such as "Mail received earlier this week," "Mail received last week," "Mail received last month," and so on.

Mail items contained under each sub-grouping, such as the "Today" grouping 235 and the "Yesterday" grouping 240 may be collapsed underneath the prescribed heading. For example, selection of the collapse or expand icon displayed to the left of the "Today" heading causes all mail items under the "Today" heading 235 to collapse such that only the "Today" heading 235 is displayed to the user. Similarly, all other displayed categories may likewise be collapsed if desired by the user for management of space utilized by the user interface or pane 220. For example, if the user is momentarily only interested in mail received yesterday, the user may collapse the "Today" mail category 235 in order to allow more user interface space for mail items displayed under the "Yesterday" mail category.

Figure 3:
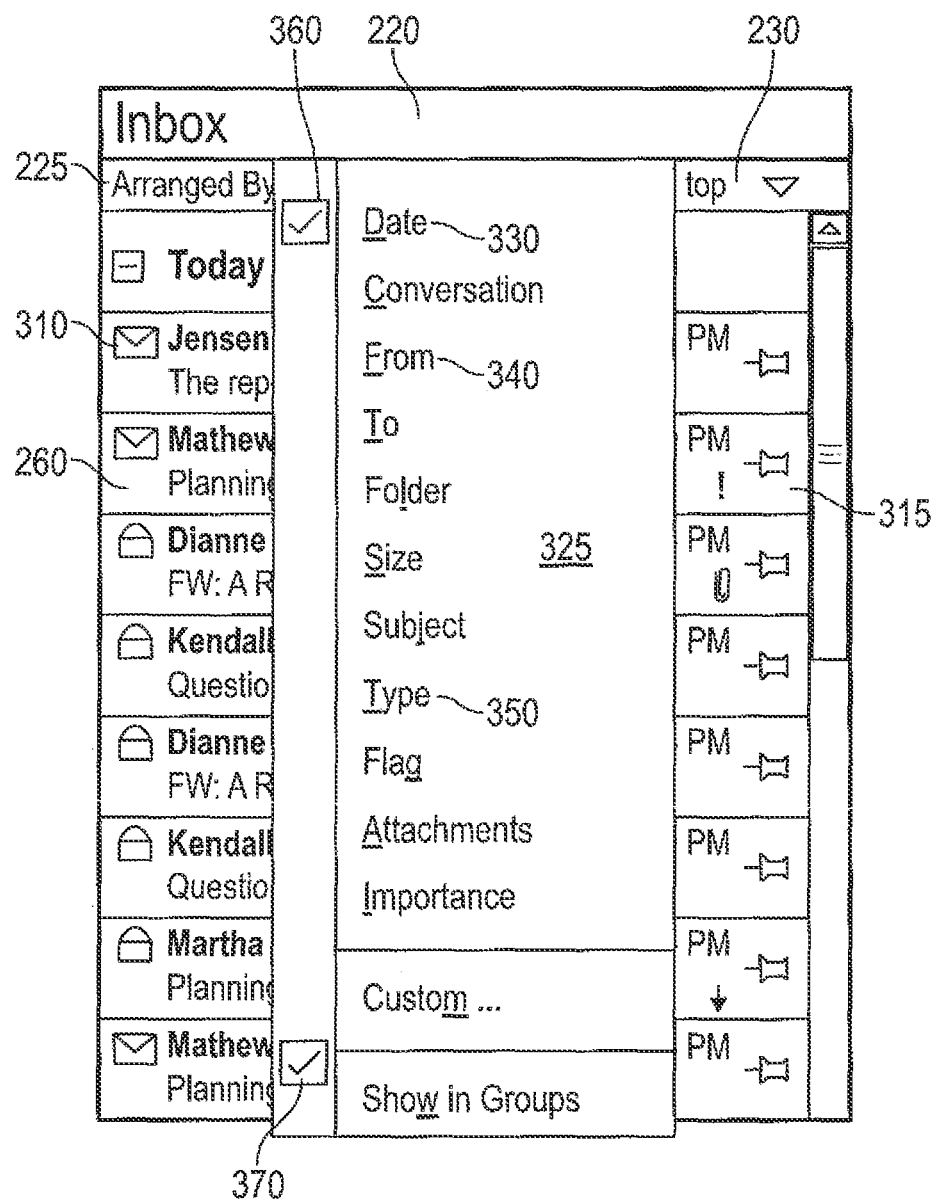
FIG. 3 illustrates a computer screen display showing an electronic mail system inbox and a drop-down user interface menu for selecting a desired automatic grouping arrangement according to embodiments of the present invention.

FIG. 3 illustrates a computer screen display showing an electronic mail system inbox and a drop-down menu for selecting a desired automatic grouping arrangement according to embodiments of the present invention. As described above with reference to FIG. 2, according to embodiments of the present invention, an electronic mail system user may select one of a number of automatic mail grouping arrangements for applying to electronic mail received by the user or sent by the user, or the user may apply one or a number of automatic grouping properties to electronic mail stored by the user in a variety of mail storage folders. Referring to FIG. 3, in order to select a given automatic mail grouping arrangement, the user may select the "Arranged by" field 225 to open a drop-down menu 325 of automatic mail grouping arrangement types. As illustrated in FIG. 3, arrangement types that may be selected by the user include a "Date" arrangement, "Conversation" arrangement, "From" arrangement, "To" arrangement, "Folder" arrangement, "Size" arrangement, "Subject" arrangement, "Type" arrangement, "Flag" arrangement, "Attachments" arrangement, "Importance" arrangement, and "Custom" arrangement.

A check box 360 is illustrated adjacent to a presently selected mail grouping arrangement type. For example, because the "Date" arrangement has been selected by the user according to the illustrated user interface in FIG. 3, the check box 360 is checked next to the "Date" arrangement type 330. If the user selects a different arrangement type, such as the "Attachments" arrangement type, the check box 360 will appear adjacent to the "Attachments" arrangement type. An additional check box 370 is disposed adjacent to the "Show in groups" arrangement type. Selection of the "Show in groups" arrangement type causes automatic grouping according to the selected arrangement type to occur. That is, if the "Show in groups" arrangement type is not selected, electronic mail will be sorted according to the selected arrangement type, but automatic grouping will not be performed. For example, if the "Date," arrangement t e is selected, but the "Show in groups" arrangement type is not selected, the electronic mail to which the "Date" arrangement type is applied will be sorted according to the date upon which electronic mail is received, but the mail will not be grouped into sub-groupings such as "Today," "Yesterday," "Earlier this week," and the like. Selection of the "show in groups" arrangement type causes the electronic mail sorted according to the selected arrangement type to be further grouped into sub-groups under the arrangement type, as described herein.

Referring still to FIG. 3, a number of additional icons such as the envelope icon 310, the paperclip icon, and the thumbtack icon may be utilized to indicate properties of listed electronic mail. For example, a closed envelope icon 310 may indicate that the associated electronic mail item has not been read. An open envelope icon may indicate that an associated electronic mail item has been read. A paperclip icon may be utilized to indicate that an attachment is associated with the selected electronic mail item, and so on. As should be appreciated by those skilled in the art, the arrangement types and property icons illustrated in FIGS. 2 through 14 are for purposes of illustration only and are not limiting of the invention as claimed herein. That is, additional electronic mail groupings and arrangement types may be utilized in accordance with embodiments of the present invention without departing from the scope or spirit of the invention claimed herein. Likewise, any number of computer-generated icons such as the envelope icon 310 may be defined for signifying one or more properties applied to or associated with a given electronic mail item.

Each mail grouping arrangement type illustrated in FIG. 3 is described below with reference to FIGS. 4 through 14. As should be appreciated, the user interface drawings illustrated in FIGS. 4 through 14 are for purposes of example only, and actual implementations of the example user interfaces may differ greatly in terms of layout, coloring and inclusion of a variety of useful user interface icons. Also, as should be understood, text selections illustrated and described herein for mail sub-grouping headings, for example "Today" or "Mail from Bob" are for purposes of example only and may be varied greatly depending on the nature of the mail items listed under a given heading. Additionally, electronic mail items grouped under a given sub-grouping heading may be sorted according to different sorting properties. As will be described with reference to FIG. 14 below, customized grouping properties may be created and used. According to an embodiment of the present invention, a default property is utilized unless otherwise changed wherein electronic mail items grouped under a given electronic mail sub-grouping heading are sorted according to date received, or date sent (for a date sent user interface).

Figure 4:
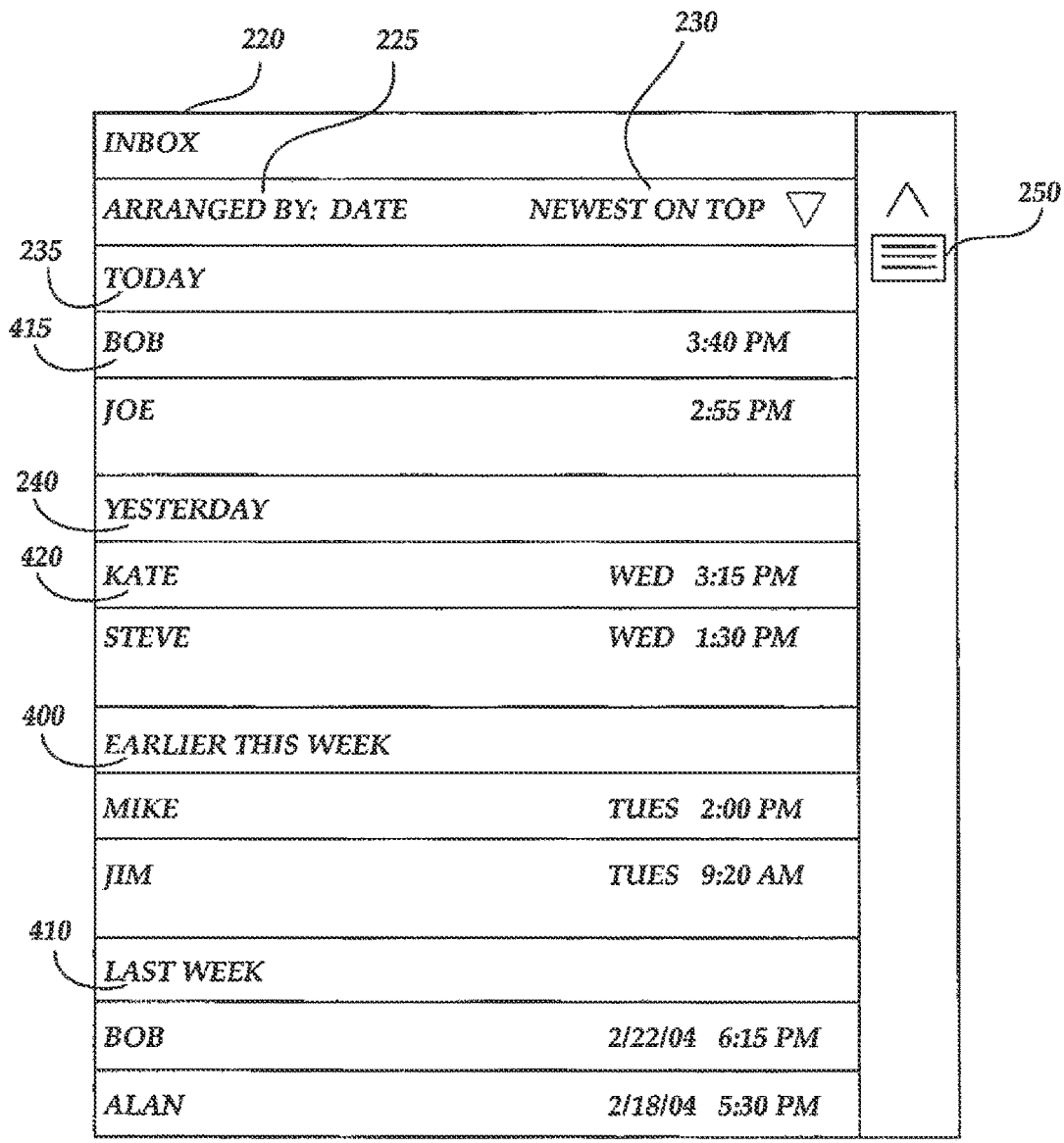
FIG. 4 illustrates a computer screen display showing an electronic mail user interface for displaying mail items grouped by date of receipt.

FIG. 4 illustrates a computer screen display showing an electronic mail user interface for displaying mail items grouped by date of receipt. According to the example inbox pane 220 illustrated in FIG. 4, a "Date" arrangement type has been selected for automatically grouping electronic mail received by the user. Likewise, the user has selected that electronic mail be shown in groups. Selection of the date arrangement type causes electronic mail received by the user to be displayed in "Date" order. As appreciated by those skilled in the art, the date ordered electronic mail may be displayed with the newest mail is displayed from the top and the oldest mail displayed at the bottom. Conversely, oldest mail may be displayed at the top with newest mail displayed at the bottom.

Referring to FIG. 4, the "Arranged by" field 225 shows the selected "Date" arrangement type. As described above, because the user has selected that electronic mail be shown in groups, a number of mail sub-group headings are displayed to further logically organize the electronic mail received by the user. For example, a "Today" heading 235 is shown over mail items 415 received by the user today. A "Yesterday" heading 240 is displayed over mail items 420 received by the user yesterday. An "Earlier this week" heading 400 is displayed over mail items received by the user earlier in the week prior to yesterday. And, a "Last week" heading 410 is displayed over electronic mail items received by the user last week. As should be appreciated, a number of other headings may be utilized such as "Last month" for mail items received last month, "Last year" for mail items received last year, and so on. Additionally, as described above with reference to FIG. 2, according to embodiments of the present invention, each sub-grouping may be collapsed such that only the group heading is displayed such that individual mail items under the collapsed heading are not visible until the collapsed group is expanded by the user.

Figure 5:
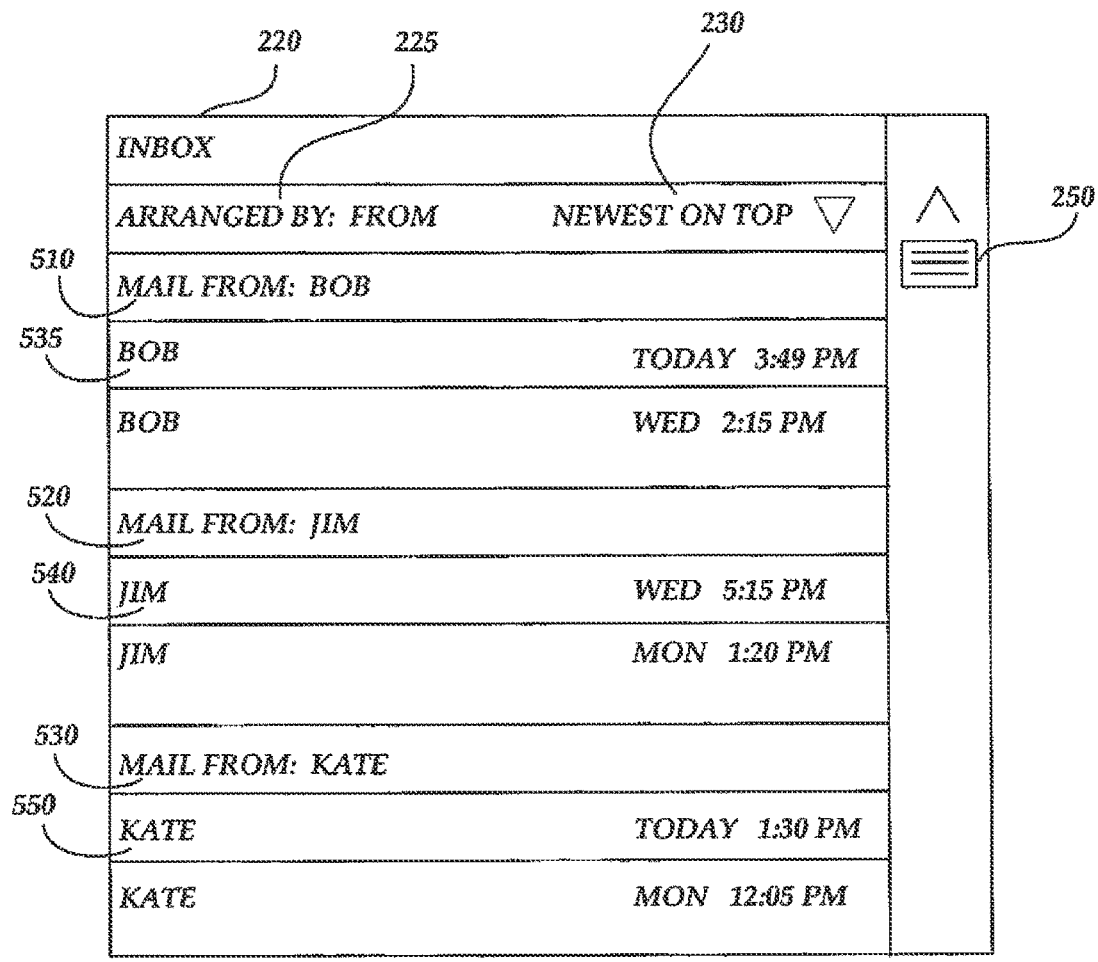
FIG. 5 illustrates a computer screen display showing an electronic mail user interface for displaying mail items grouped by identity of party from which mail is received.

FIG. 5 illustrates a computer screen display showing an electronic mail user interface for displaying mail items grouped by identity of party from which mail is received. According to the user interface or pane 220 illustrated in FIG. 5, a user has selected a "From" arrangement type for grouping the user's received electronic mail according to the party from which the mail has been received. Because the user has also selected that arranged mail should be shown in groups, the electronic mail illustrated in FIG. 5 is displayed in a number of logical sub-groupings. For example, a "Mail from Bob" heading 510 is displayed above mail items 535 received from Bob. A "Mail from Jim" heading 520 is displayed above mail items 540 received from Jim. A "Mail from Kate" heading 530 is displayed above mail items 550 received from Kate. Thus, the user of the arrangement type illustrated in FIG. 5 may quickly locate mail from a given mail sender without the need for perusing or scrolling through large numbers of mail items, and the use of the mail grouping headings 510, 520, 530 allows the user to readily locate a section of the displayed mail items of interest to the user.

Figure 6:
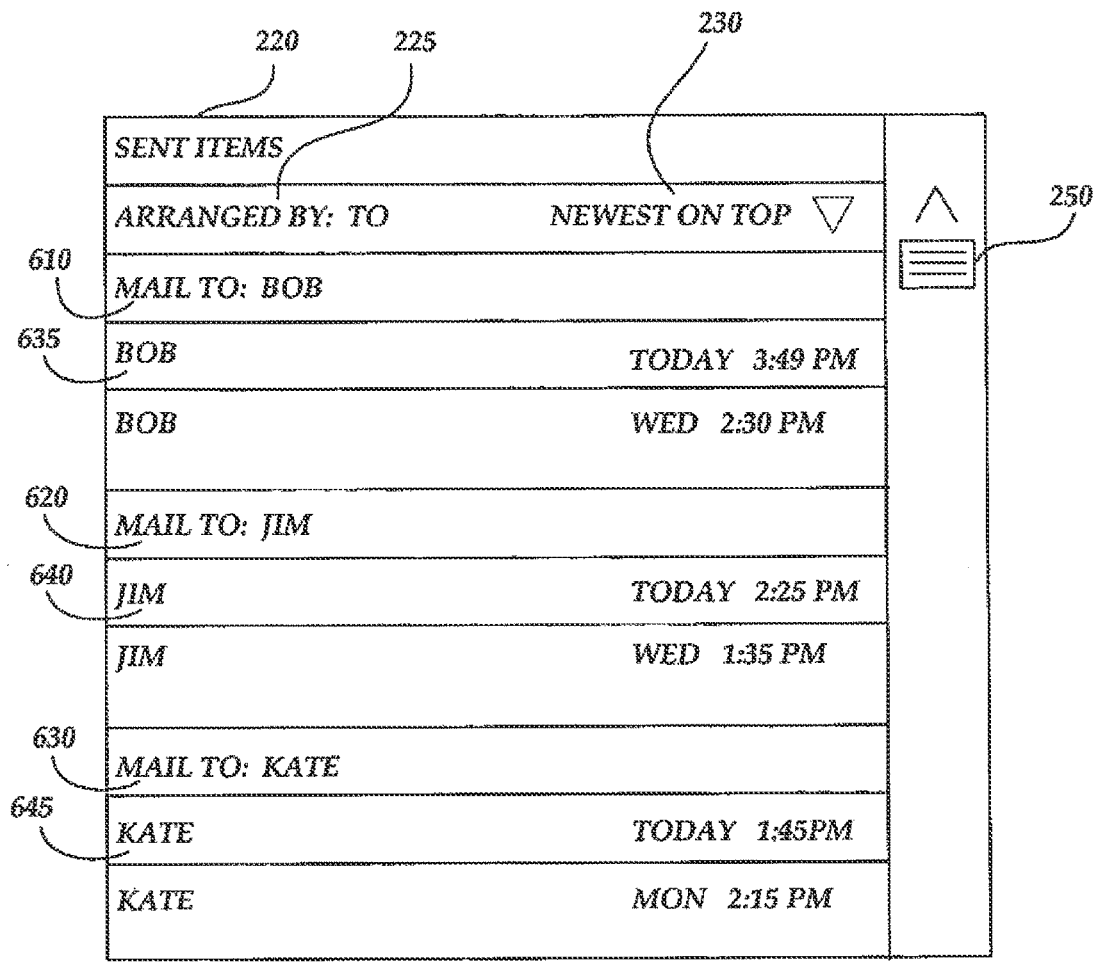
FIG. 6 illustrates a computer screen display showing an electronic mail user interface for displaying mail items grouped by identity of party to which mail is set.

FIG. 6 illustrates a computer screen display showing an electronic mail user interface for displaying mail items grouped by identity of party to which mail is sent. According to the example sent items pane 220 illustrated in FIG. 6, a user has selected that her "Sent items" mail items be arranged according to the party to which given mail items have been sent. Without the selection of the "Show in groups" arrangement type illustrated in FIG. 3, individual sent mail items would be arranged in alphabetical order in the order in which individual mail items are sent. Because the user has selected that the sent items are to be shown in groups in addition to being arranged according to the party to which the items have been sent, the user's sent items mail is arranged according to a number of sub-group headings 610, 620, 630. For example, a first heading "Mail to Bob" is displayed above mail items 635 sent to Bob. A second heading "Mail to Jim" is displayed above mail items 640 sent to Jim. A third heading "Mail to Kate" 630 is displayed above mail items sent to Kate. Thus, the user may readily locate a particular mail item sent to a particular party by locating a heading with the particular party followed by a review of mail items contained under the selected heading. The individual mail items displayed under the group headings 610, 620, 630 are listed in date order with the newest items on top. As should be appreciated, by toggling the "Newest on top" field 230, the user may reverse the ordering so that mail items listed under individual group headings are displayed with the oldest mail items on top and the newest mail items on bottom.

FIG. 7 illustrates a computer screen display showing an electronic mail user interface for displaying mail items grouped according to storage folders to which given electronic mail items are saved. According to the user interface or pane 220 illustrated in FIG. 7, the user has selected that electronic mail items be arranged by the "Folder" arrangement type. Accordingly, the "Arranged by" field 225 shows that the "Folder" arrangement type has been selected. According to this arrangement type, electronic mail received by the user or sent by the user that is stored in a number of different user-established electronic mail folders may be displayed in the pane 220 and may be grouped according to folder identification. For example, a first folder heading 710 may be displayed over electronic mail items 735 belonging to a first user folder. A second folder heading 720 may be displayed over electronic mail items 740 belonging to a second user folder. A third folder heading 730 may be displayed over electronic mail items 745 belonging to a third folder 730, and so on. By selecting the "Folder" arrangement type, the user may review in a single user interface or pane 220 all mail items across a number of user-specified mail folders, and the user may quickly review mail contained in different folders through use of the automatic grouping headings such as the headings 710, 720, 730. For a detailed description of methods of systems for viewing electronic mail items in a single user interface 220 across a number of electronic mail folders, see U.S. patent application, Ser. No. 10/741,407, entitled "Methods, Systems, and Computer-Readable Mediums For Persisting and Continuously Updating Search Folders, Applicant Reference No. 301749.01, which is incorporated herein by reference as if fully set out herein.

Figure 8:
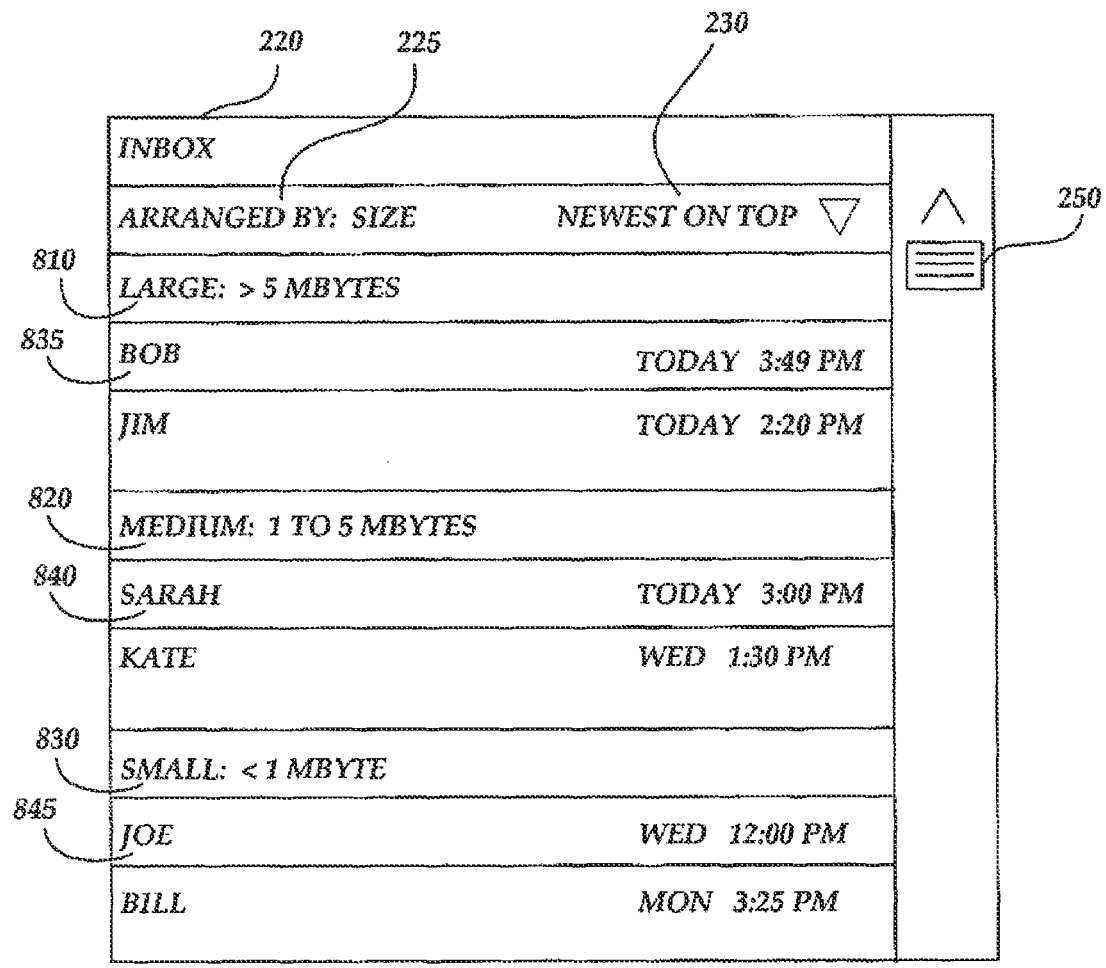
FIG. 8 illustrates a computer screen display showing an electronic mail user interface for displaying mail items grouped according to mail item size.

FIG. 8 illustrates a computer screen display showing an electronic mail user interface for displaying mail items grouped according to mail item size. According to the user interface or pane 220 illustrated in FIG. 8, a user has selected a "Size" arrangement type and the "Show in groups" arrangement type for sorting and grouping the user's electronic mail items according to the size of the electronic mail. As illustrated in FIG. 8, the "Arranged by" field 225 shows that the size arrangement type has been selected. Electronic mail items displayed in the user interface 220 are displayed in the order of size of the displayed electronic mail items. By default, the largest electronic mail items may be shown on top and the smallest electronic mail items may be shown on the bottom of the list of electronic mail items. By toggling the "Newest on top" field 230, the order of display may be reversed. Because the user has also selected that electronic mail items are to be shown in groups, the electronic mail items displayed to the user are arranged under a number of mail groupings. As should be appreciated, each mail grouping may be arranged according to a selected or default mail size. For example, a first mail grouping 810 may be displayed for mail items 835 that are five (5) megabytes or larger. A second mail grouping 820 may be displayed for mail items having a size between one (1) and five (5) megabytes. A third mail grouping 830 may be displayed for mail items having a size of less than one (1) megabyte. As should be appreciated, the size groupings illustrated in FIG. 8 are for purposes of example only, and a number of size variations for various size groupings may be utilized according to embodiments of the present invention.

Figure 9:
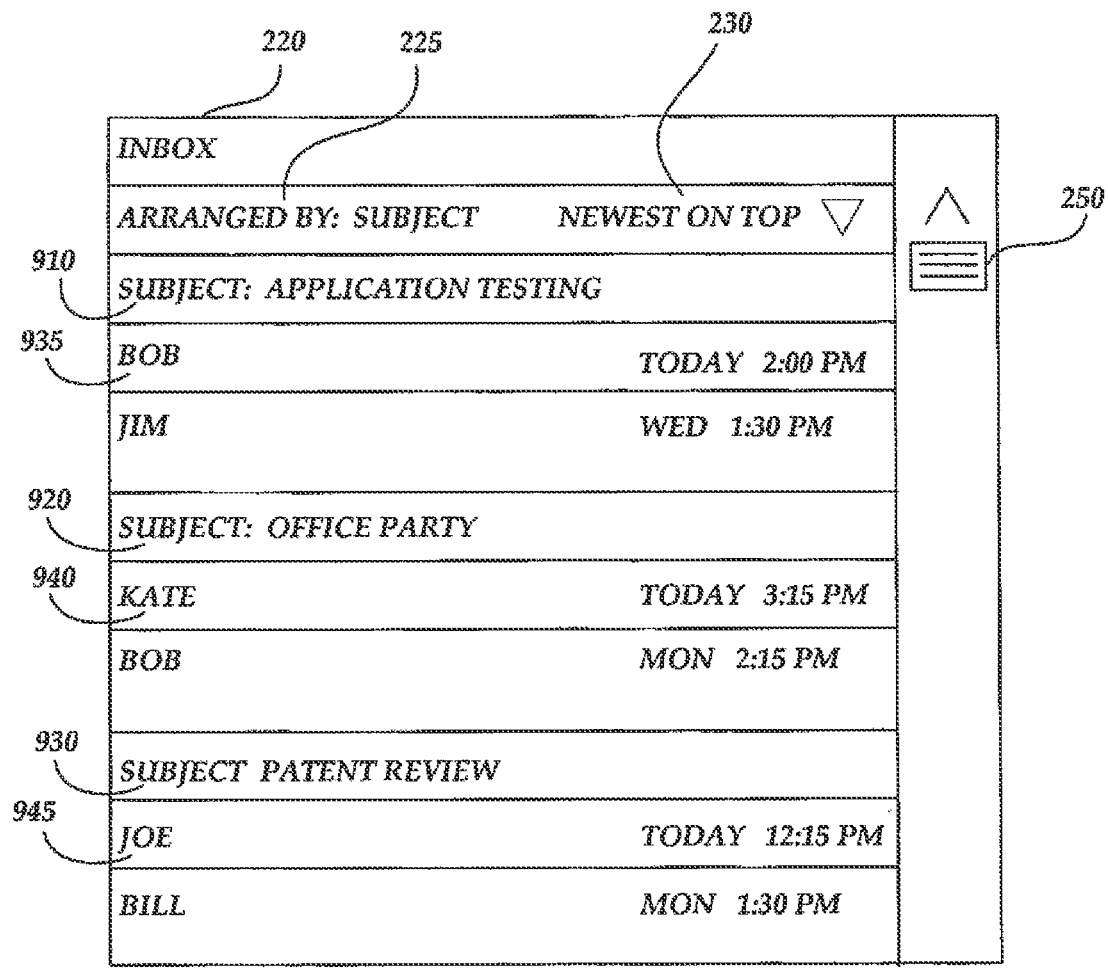
FIG. 9 illustrates a computer screen display showing an electronic mail user interface for displaying mail items grouped according to mail subject.

FIG. 9 illustrates a computer screen display showing an electronic mail user interface for displaying mail items grouped according to mail subject. According to the user interface illustrated in FIG. 9, the user has selected that her electronic mail be sorted and grouped according to the subject of the electronic mail items. As illustrated in FIG. 9, the "Arranged by" field identifies "Subject" as the arrangement type. In addition to selecting that the electronic mail be sorted by subject, the user has selected that the electronic mail be shown in groups. A first subject heading 910 is displayed above electronic mail items 935 having subjects identified by the subject heading 910. A second subject heading 920 is displayed above electronic mail items 940 having electronic mail subjects identified by the subject heading 920. A third subject heading 930 is displayed above the electronic mail items 945 having subjects identified by the heading 930. For example, the subject heading 910 includes an example subject heading of "Application Testing." Each electronic mail message received by the user having a subject of "Application Testing" is sorted and is grouped underneath the subject heading 910. Thus, the user may quickly identify and retrieve a given email message under the desired subject heading without the need for scrolling through many email messages pertaining to different subject matters.

Figure 10:
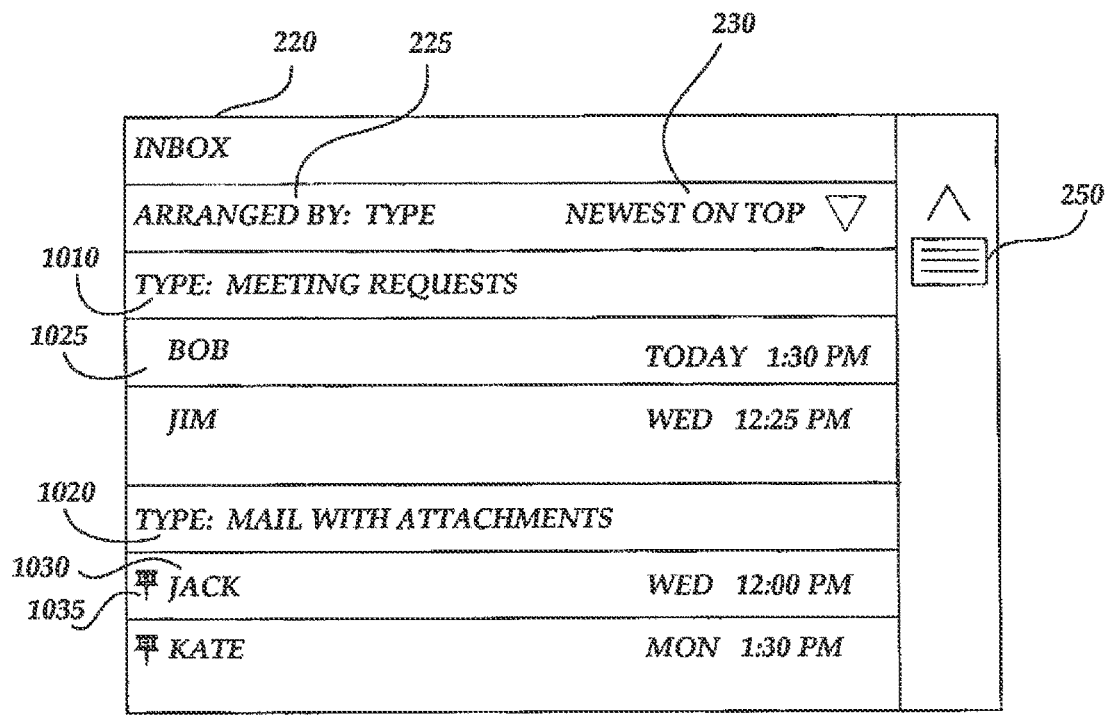
FIG. 10 illustrates a computer screen display showing an electronic mail user interface for displaying mail items grouped according to mail type.

FIG. 10 illustrates a computer screen display showing an electronic mail user interface for displaying mail items grouped according to "Mail" arrangement type. As illustrated in FIG. 10, the "Arranged by" field identifies "Type" as the arrangement type selected by the user. If the user does not specify that electronic mail items are to be shown in groups, her electronic mail may be sorted by message type and may be displayed in alphabetical order of electronic mail type. According to the example user interface illustrated in FIG. 10, the user has selected to show the sorted electronic mail in groups. Accordingly, a first electronic mail type heading 1010 is displayed above electronic mail items 1025 of the type specified by the heading type 1010. For example, the example heading 1010 identifies an electronic mail type of "Meeting Requests." Accordingly, the electronic mail messages 1025 displayed underneath the heading 1010 include electronic mail messages involving meeting requests to the user. A second heading 1020 is illustrated for grouping messages having associated attachments. Thus, electronic mail items 1030 displayed underneath the heading 1020 include electronic mail messages having attachments. For purposes of illustration, an attachment icon 1035 is illustrated next to the mail items 1030 to show an associated attachment.

Figure 11:
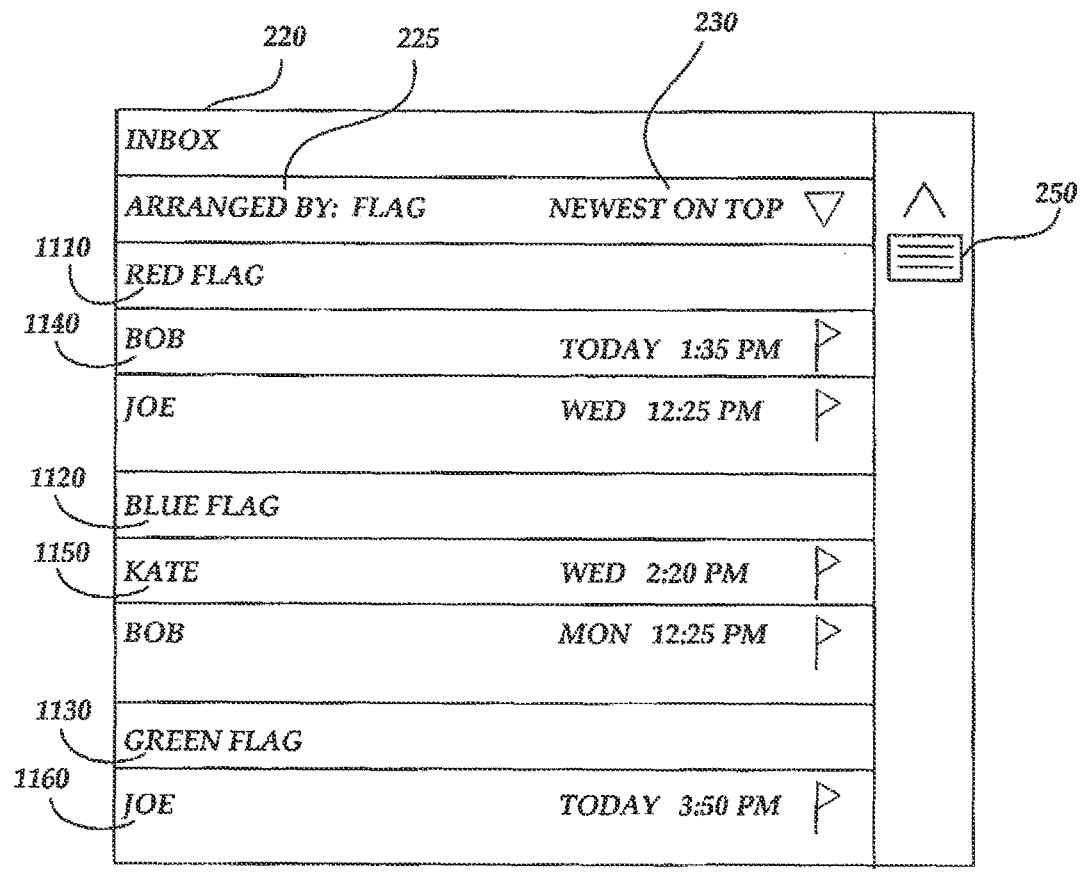
FIG. 11 illustrates a computer screen display showing an electronic mail user interface for displaying mail items grouped according to electronic mail flag type.

FIG. 11 illustrates a computer screen display showing an electronic mail user interface for displaying mail items grouped according to electronic mail flag type. According to the user interface 220 illustrated in FIG. 11, the user has selected the "Flag" arrangement type for sorting and grouping the user's electronic mail items. As should be appreciated by those skilled in the art, flags 1115, 1125, 1135 may be inserted for electronic mail messages for providing additional information to a recipient of a given electronic mail message. For example, a flag attached to or associated with an electronic message may indicate that the recipient should call the sender. A flag may indicate that the recipient should not forward a given electronic message. A flag may indicate that the recipient should follow up on a given electronic mail message. Flags associated with electronic mail messages may indicate other information including that a given electronic mail message is for the recipient's information, that the message should be forwarded, that no response to the electronic mail message is necessary, that the message should be read, that the message should be reviewed, that the message is a reply to all message, and the like.

Referring to FIG. 11, electronic mail messages sorted and grouped according to "Flag" type are illustrated. For purposes of example, a first heading 1110 is labeled "Red Flag." According to an embodiment of the present invention, colored flags may be utilized to indicate certain information. For example, a red flag 1115 associated with an electronic mail message may indicate that messages of this type should not be forwarded. As should be appreciated, the heading 1110 could also read "Do Not Forward," or the like, as a heading for electronic mail items 1140 having associated flags 1115 of this type. As should be appreciated, the particular language used for the heading 1110 may be varied according to the preferences of a developer of the electronic mail system. A second heading 1120 illustrated as "Blue Flag" may be displayed over electronic mail items 1150 bearing flag 1125 of the type associated with the blue flag heading 1120. As described above, blue flags attached to electronic mail messages may indicate certain information, for example "For Your Information," associated with an electronic mail item to which the flag 1125 is attached or associated. Thus, a user of the functionality of embodiments of the present invention may sort and group electronic mail items based on flags associated with electronic mail items. The user may then quickly and efficiently locate particular electronic mail items of a given flag type without the need for scrolling through every electronic mail item received by the user having an associated information flag.

Figure 12:
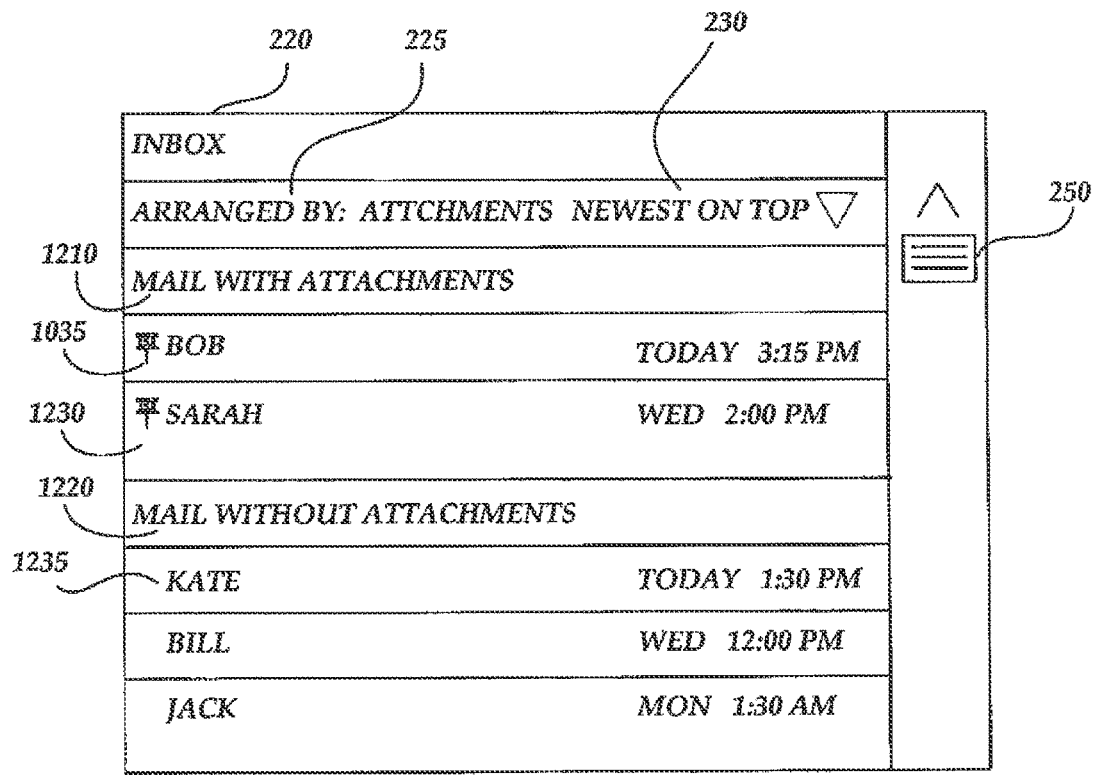
FIG. 12 illustrates a computer screen display showing an electronic mail user interface for displaying mail items grouped according to whether or not mail items include attachments.

FIG. 12 illustrates a computer screen display showing an electronic mail user interface for displaying mail items grouped according to whether or not mail items include attachments. According to the example user interface or pane 220 illustrated in FIG. 12, a user has selected an "Attachments" arrangement for sorting and grouping her electronic mail items. As illustrated in FIG. 12, the "Arranged by" field 225 identifies the "Attachments" arrangement type for sorting and grouping the user's electronic mail. Because the user has also selected that her electronic mail should be shown in groups, her electronic mail items are sorted and grouped according to whether each mail item is associated with an attachment or whether mail items are not associated with attachments. For example, a first heading 1210 bearing an example heading of "Mail With Attachments" is displayed above electronic mail items 1230 that include attached documents or files. As illustrated in FIG. 12, an attachment icon 1035 is shown for indicating that an attached file or document is associated with the mail items 1230. A second heading 1220 is displayed above mail items 1235 that do not include attached documents or files. The heading 1220 includes example language "Mail Without Attachments." Thus, if a user desires to locate a document the user recalls as having an attachment needed by the user, the user can utilize the "Attachments" arrangement type for quickly grouping together electronic mail items with attachments so that the user may quickly peruse only those electronic mail items having attachments without the need for scrolling through all electronic mail items received by the user.

Figure 13:
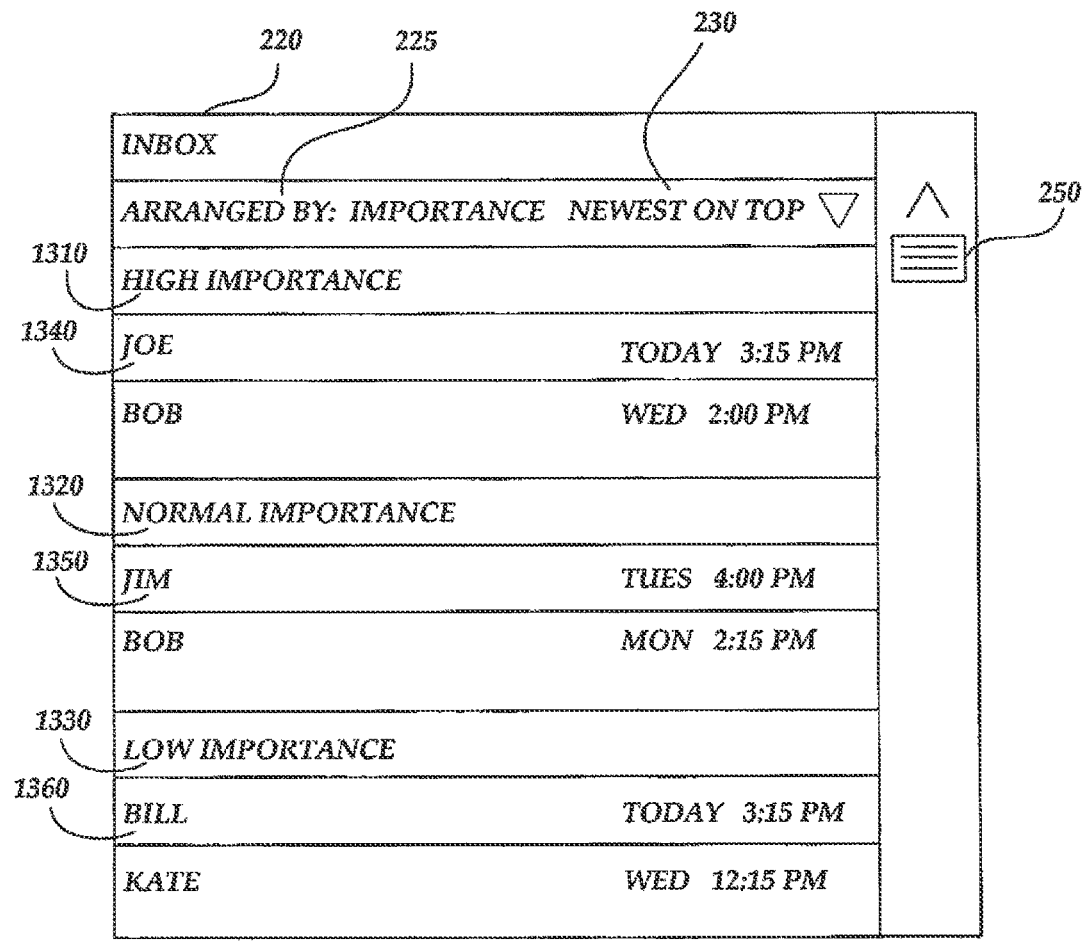
FIG. 13 illustrates a computer screen display showing an electronic mail user interface for displaying mail items grouped according to importance level.

FIG. 13 illustrates a computer screen display showing an electronic mail user interface for displaying mail items grouped according to importance level. According to the example user interface 220 illustrated in FIG. 13, a user has selected an "Importance" arrangement type whereby electronic mail items will be sorted and grouped according to an importance level associated with individual electronic mail items. As illustrated in FIG. 13, the "Arranged by" field identifies "Importance" as the selected arrangement type. As should be appreciated by those skilled in the art, electronic mail senders may attach an importance level to electronic mail messages to alert an electronic mail recipient of the importance level associated with a given electronic mail message. For example, an electronic mail sender may specify that a message is of "High" importance. Similarly, an electronic mail sender may specify that a given electronic mail message is of "Normal" importance or "Low" importance. According to some electronic mail systems, an electronic mail sender need not specify that a given electronic mail message is of "Normal" importance. Electronic mail messages may be considered of "Normal" importance by default unless specified as "High" or "Low" importance.

As illustrated in FIG. 13, electronic mail messages received by the user are illustrated as sorted and grouped according to importance level. A first grouping heading 1310 is illustrated for high importance messages and is displayed above electronic mail items 1340 that have been specified as "High" importance by their respective mail senders. A second heading 1320 for messages of "Normal" importance is displayed above electronic mail items 1350 whose importance level has been specified as "Normal" by their respective senders, or where no importance level has been specified. A third heading 1330 is displayed for messages specified as "Low" importance and is displayed over electronic mail items 1360 specified by their respective mail senders as being of "Low" importance. Thus, a user may quickly segregate messages by importance level for purposes of locating and reviewing a desired message where the user recalls that the message had a particular associated importance level.

Figure 14:
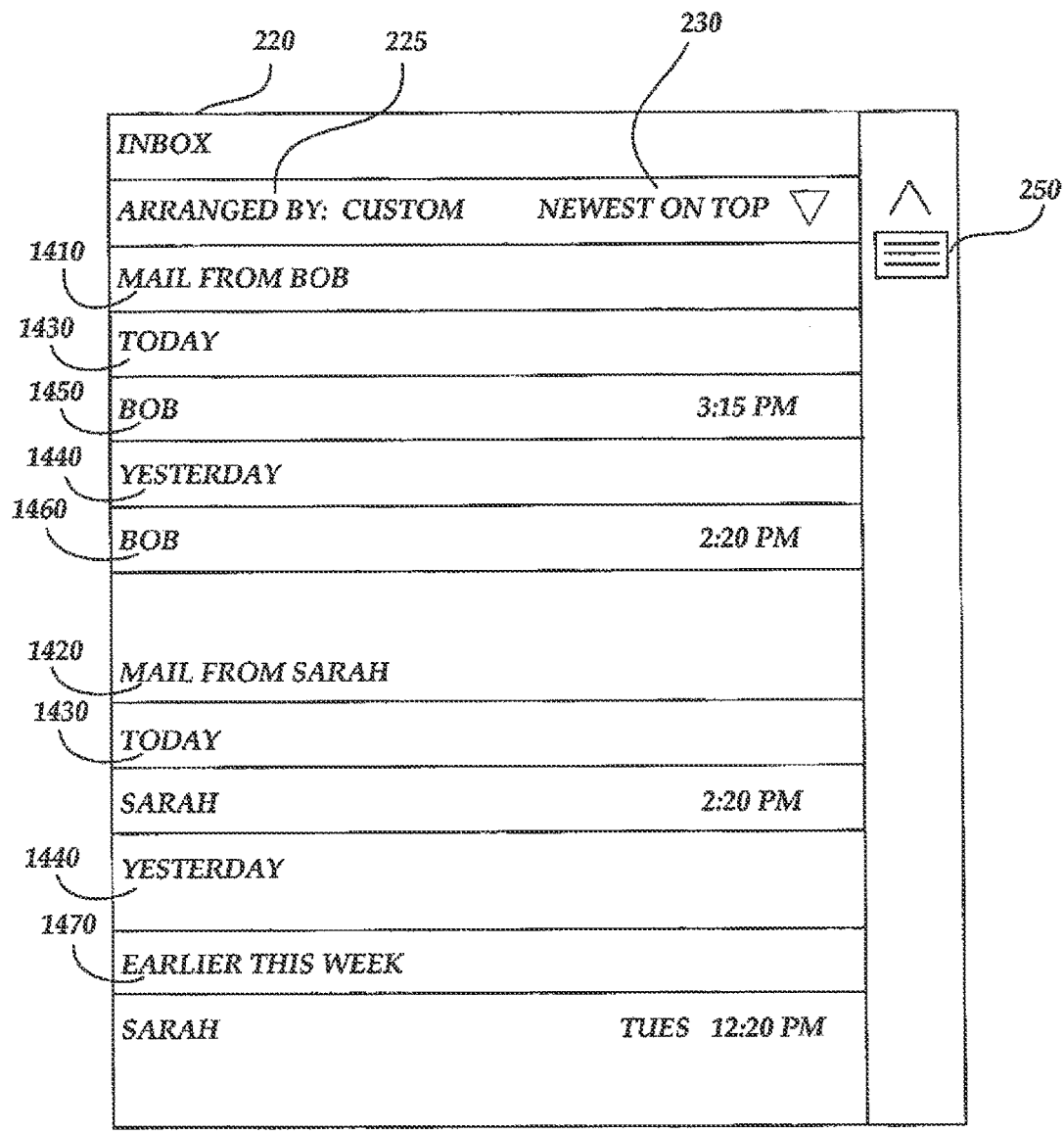
FIG. 14 illustrates a computer screen display showing an electronic mail user interface for displaying mail items grouped according to a customized automatic grouping specified by a user.

FIG. 14 illustrates a computer screen display showing an electronic mail user interface for displaying mail items grouped according to a customized automatic grouping specified by a user. As described above, according to embodiments of the present invention, a user may customize the automatic mail groupings applied to electronic mail messages received by, sent by, or stored by the user. The user may create custom automatic grouping arrangements in the form of combinations of other types of automatic grouping arrangements. For example, the user may create a customized automatic grouping arrangement whereby electronic mail is sorted and grouped based on the parties to which electronic mail items are sent combined with a sorting and grouping arrangement of electronic mail messages based on the date the messages are sent. Similarly, a user may create a customized automatic grouping arrangement whereby electronic mail items are sorted or grouped based on the date of receipt followed by a sorting and grouping of messages based on the importance level associated with particular mail items.

Referring to FIG. 14, the example user interface 220 illustrates a custom automatic grouping arrangement whereby the user has selected that electronic mail items should be sorted and grouped based on the parties from which electronic mail items have been received followed by a sorting and grouping of those electronic mail items based on the date of receipt. For example, a first group heading 1410 illustrates a heading "Mail from Bob" for grouping electronic mail items received from a particular mail sender. Underneath the heading 1410, a sub-heading 1430 of "Today" is displayed over electronic mail items received today from the particular mail sender "Bob." A second sub-heading 1440 is displayed under the primary heading 1410 bearing the heading title "Yesterday" and is displayed over a mail item 1460 received yesterday from the same electronic mail sender "Bob." Thus, by customizing the arrangement type applied to the user's electronic mail items, the user may group electronic mail messages received from particular senders in date groupings, so that the user may quickly locate particular mail items from particular mail senders received during particular timing periods. As should be appreciated by those skilled in the art, the customized arrangement type illustrated in FIG. 14 is for purposes of example only and is not limiting of the numerous combinations of arrangement types that may be applied to electronic mail items through creation of customized arrangement types.

Selection of the "Conversation" arrangement type, illustrated in FIG. 3, causes a grouping of electronic mail items associated with an electronic conversation string between two or more electronic users. An example user interface for illustration of the "Conversation" arrangement type is not described herein. For a detailed description regarding the "Conversation" automatic grouping arrangement type, see United States Patent Application, Applicant Reference No. 301753.01, which is incorporated herein by reference as if fully set out herein.

Figure 15:
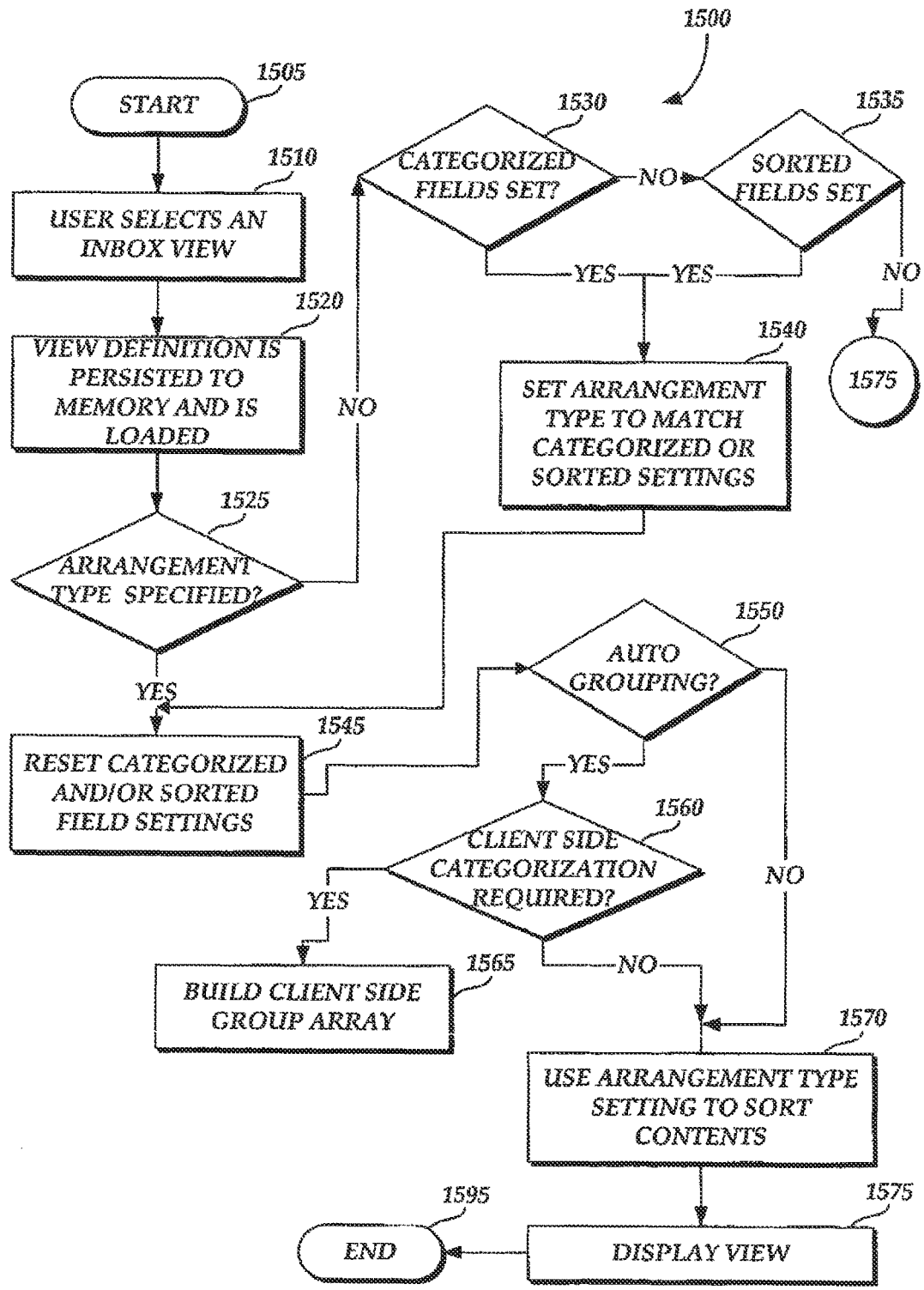
FIG. 15 is a flow diagram illustrating an illustrative routine for processing and persisting data associated with selected automatic mail groupings according to embodiments of the present invention.

As briefly described above, processing of the automatic mail grouping functionality described herein and persistence of data associated with resulting automatic grouping of electronic mail messages or items may typically be performed at an electronic mail server and may be accessible by one or more client side electronic mail software applications. According to embodiments of the present invention, some or all of the automatic mail grouping functionality may be performed at a client side electronic mail software application, or alternatively, some aspects of the automatic electronic mail grouping functionality may be performed by a client side electronic mail software application, while other aspects of the functionality may be processed at a server side electronic mail software system. FIG. 15 is a flow diagram illustrating an illustrative routine for processing and persisting data associated with selected automatic mail groupings according to embodiments of the present invention.

The routine 1500 begins at start block 1505 and proceeds to block 1510 where a user selects an "Inbox" view. For example, the user may select that an inbox user interface 220 be presented by the user's electronic mail system for reviewing received electronic mail. Alternatively, the user may select a "Sent Items" view, or one or more folder contents views. At block 1520, the view definition selected by the user is persisted to memory at a server side electronic mail system. For example, if the user has selected an "Inbox" view for reviewing the user's received electronic mail items, a view definition utilized by the electronic mail system for preparing the selected view is persisted into memory and is loaded by the server side electronic mail system.

At decision block 1525, a determination is made as to whether an automatic grouping arrangement type has been specified by the user, as described above with reference to FIGS. 3 through 14. If an arrangement type has not been specified by the user, the routine proceeds to decision block 1530, and a determination is made as to whether any grouping or category fields have been set for the user's electronic mail items. For example, the user's electronic mail system may be set to default to group electronic mail messages according to date. If no grouping or category fields are set for the electronic mail items, the routine proceeds to block 1535, and a determination is made as to whether any sorting fields are set for the electronic mail items. That is, a determination is made as to whether any default sorting settings are specified for the user's electronic mail. For example, a default sorting setting specifying that the electronic mail should be sorted based on date received may be set for the user's electronic mail messages. If no sorting properties are set for the user's electronic mail messages, the routine proceeds to block 1575, and the client side electronic mail software application is caused to display the user's electronic mail messages according to the persisted view definition without regard to any particular mail grouping categories or sorting properties.

Returning back to decision blocks 1530 and 1535, if mail groupings or categories have been set, or if sorting properties have been set for the user's electronic mail items, the routine proceeds to block 1540, and an automatic mail grouping arrangement type (as described above with reference to FIGS. 3 through 14) is set to match the mail grouping categories or sorting properties set for the user's electronic mail items. The routine then proceeds to block 1545. At block 1545, any previously set mail grouping arrangement types or mail sorting properties are reset to the values determined at block 1540, or specified by the user at block 1525. At block 1550, a determination is made as to whether automatic grouping functionality is activated for the user's electronic mail messages. If not, the routine proceeds to block 1570, and the arrangement type set for the user's electronic mail messages at block 1545 is utilized for sorting and grouping the user's electronic mail messages. The routine then proceeds to block 1575, as described above.

Referring back to block 1550, if the automatic grouping functionality of the present invention is selected, the routine proceeds to decision block 1560, and a determination is made as to whether client side processing is required. According to embodiments of the present invention, categorization and grouping of electronic mail messages according to date and/or size is processed and associated data is persisted by the client side electronic mail software application. For example, if the user has selected that electronic mail messages are to be sorted and grouped according to "Date" or "Size" arrangement types, as described above, the routine proceeds to block 1565, and a client side grouping array is built by the client side electronic mail software application for placing electronic mail messages into appropriate "Date" or "Size" mail groupings, as described above with reference to FIGS. 2, 4 and 8.

If no client side processing is required at decision block 1560, or after a client side mail grouping array is built at block 1565, the routine proceeds to block 1570. At block 1570, the arrangement type setting specified for the user's electronic mail messages is utilized by the server side electronic mail system for preparing an electronic mail view for display by the client side electronic mail software application. That is, the selected view definition is passed from the server side electronic mail system along with persisted data required by the client side software application for displaying the specified view (e.g., "Inbox" view) along with electronic mail messages sorted and grouped according to the automatic grouping properties applied to the electronic mail messages. When the client side software application receives the view definition and persisted data from the server side electronic mail system, any client side electronic mail grouping definition and/or data constructed by the client side electronic mail system, as described above with reference to blocks 1560 and 1565, is utilized by the client side application for preparing any portion of the displayed view associated with the client side mail grouping data. At block 1575, the constructed electronic mail view is displayed by the client side electronic mail application. The routine ends at block 1595.

As described herein, methods and systems are provided for automatically sorting and grouping electronic mail messages in an electronic mail system. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

What is claimed is:

1. A computer-readable storage device having a set of instructions which when executed by a computer performs a method for grouping electronic mail, the method executed by the set of instructions comprising:
    displaying electronic mail items in groups based on a default arrangement type, each group being collapsible and expandable upon user selection, the default arrangement type comprising:
        grouping, into a first group, a first subset of electronic mail items;
        representing the first group with a first header;
        grouping, into a second group, a second subset of electronic mail items; and
        representing the second group with a second header;
    receiving a selection to sort the electronic mail items within each of the groups based on a selected arrangement type;
    preparing an electronic mail view for display utilizing the selected arrangement type to sort the first and second subsets of electronic mail items within the first group and the second group; and
    displaying the electronic mail view with the electronic mail items sorted within each group based on the selected arrangement type.

2. The computer-readable storage device of claim 1, wherein displaying the electronic mail items in the groups based on the default arrangement type comprises:
    providing a header for each group, and
    listing a subset of electronic mail items underneath each header.

3. The computer-readable storage device of claim 2, further comprising:
    receiving a selection to collapse a particular group;
    removing, from display, a listing of the subset of electronic mail items associated with the particular group.

4. The computer-readable storage device of claim 2, wherein the default arrangement type further comprises:
    grouping, into a third group, a third subset of electronic mail; and
    representing the third group with a third header.

5. The computer-readable storage device of claim 1, further comprising:
    receiving a selection of a grouping property; and
    regrouping the grouped electronic mail items based on the selected grouping property.

6. The computer-readable storage device of claim 1, wherein displaying the electronic mail items in the groups based on the default arrangement type comprises displaying the electronic mail items in groups based on the default arrangement type as a server-side process.

7. The computer-readable storage device of claim 6, wherein sorting the subset of electronic mail items within each group based on the selected arrangement type comprises sorting the subset of electronic mail items as a client-side process.

8. The computer-readable storage device of claim 4, wherein sorting the electronic mail items within each group based on the selected arrangement type further comprises sorting the electronic mail items based on an importance level of each electronic mail item in its group.

9. A system for grouping electronic mail, the system comprising:
 a memory storage; and
 a processing unit coupled to the memory storage, the processing unit being configured to:
  display electronic mail items in groups based on a default arrangement type wherein the electronic mail items are grouped based on date of receipt, each group being collapsible and expandable upon user selection, wherein the default arrangement type comprises:
   group, into a first group, a first subset of electronic mail items that were received at a current date;
   represent the first group with a first header indicating the current date;
   group, into a second group, a second subset of electronic mail items that were received another day other than the current date; and
   represent the second group with a second header indicating the other day other than the current date;
  receive a selection to sort the electronic mail items within each group based on a selected arrangement type;
  determine whether automatic grouping functionality is activated;
  if automatic grouping functionality is activated, utilize the selected arrangement type to prepare an electronic mail view for display and sort the electronic mail items within each group based on the selected arrangement type; and
  display the electronic mail view with the electronic mail items sorted within each group based on the selected arrangement type.

10. The system of claim 9, wherein the processing unit being configured to display the electronic mail items in the groups based on the default arrangement type comprises the processing unit being configured to:
 provide a header for each group, and
 list a subset of electronic mail items underneath each header.

11. The system of claim 10, wherein the processing unit is further configured to:
 receive a selection to collapse a particular group; and
 remove, from display, a listing of the subset of electronic mail items associated with the particular group.

12. The system of claim 10, wherein the other day is a day before the current date and wherein the processing unit being configured to group the electronic mail items based on a date of receipt associated with each electronic mail item further comprises the processing unit being configured to:
 group, into a third group, a third subset of electronic mail items that were received a week prior to the current date; and
 represent the third group with a third header indicating the week prior to the current date.

13. The system of claim 9, wherein the processing unit further configured to:
 receive a selection of a grouping property; and
 regroup the grouped electronic mail items based on the selected grouping property.

14. The system of claim 9, wherein the processing unit being configured to display the electronic mail items in the groups based on the default arrangement type comprises the processing unit being configured to display the electronic mail items in groups based on the default arrangement type as a server-side process.

15. The system of claim 14, wherein the processing unit being configured to sort the subset of electronic mail items within each group based on the selected arrangement type comprises the processing unit being configured to sort the subset of electronic mail items as a client-side process.

16. A method for grouping electronic mail, the method comprising:
 displaying electronic mail items in groups based on a default arrangement type wherein the electronic mail items are grouped based on date of receipt, each group being collapsible and expandable upon user selection, wherein the default arrangement type comprises:
  grouping, into a first group, a first subset of electronic mail items that were received at a current date;
  representing the first group with a first header indicating the current date;
  grouping, into a second group, a second subset of electronic mail items that were received another day other than the current date; and
  representing the second group with a second header indicating the other day other than the current date;
 receiving a selection to sort the electronic mail items within each group based on a selected arrangement type;
 determining whether automatic grouping functionality is activated;
 if automatic grouping functionality is activated, utilizing the selected arrangement type to prepare an electronic mail view for display and sorting the electronic mail items within each group based on the selected arrangement type; and
 displaying the electronic mail view with the electronic mail items sorted within each group based on the selected arrangement type.

17. The method of claim 16, wherein displaying the electronic mail items in the groups based on the default arrangement type comprises:
 providing a header for each group, and
 listing a subset of electronic mail items underneath each header.

18. The method of claim 17, further comprising:
 receiving a selection to collapse a particular group; and
 removing, from display, a listing of the subset of electronic mail items associated with the particular group.

19. The method of claim 17, wherein the other day is a day before the current date and wherein grouping the electronic mail items based on a date of receipt associated with each electronic mail item further comprises:
 grouping, into a third group, a third subset of electronic mail items that were received a week prior to the current date; and
 representing the third group with a third header indicating the week prior to the current date.

20. The method of claim 16, wherein displaying the electronic mail items in the groups based on the default arrangement type comprises displaying the electronic mail items in groups based on the default arrangement type as a server-side process.

21. The method of claim 20, wherein sorting the subset of electronic mail items within each group based on the selected arrangement type comprises sorting the subset of electronic mail items as a client-side process.

* * * * *